United States Patent
Choi et al.

(10) Patent No.: US 10,390,335 B2
(45) Date of Patent: Aug. 20, 2019

(54) METHOD AND APPARATUS FOR TRANSMITTING UPLINK CONTROL INFORMATION IN CARRIER AGGREGATION SYSTEM

(71) Applicant: Samsung Electronics Co., Ltd., Suwon-si, Gyeonggi-do (KR)

(72) Inventors: Seunghoon Choi, Seongnam-si (KR); Jinyoung Oh, Seoul (KR); Jeongho Yeo, Suwon-si (KR); Youngbum Kim, Seoul (KR); Yongjun Kwak, Yongin-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/412,711

(22) Filed: Jan. 23, 2017

(65) Prior Publication Data

US 2017/0215179 A1 Jul. 27, 2017

Related U.S. Application Data

(60) Provisional application No. 62/281,357, filed on Jan. 21, 2016, provisional application No. 62/357,641, (Continued)

(51) Int. Cl.
*H04W 72/04* (2009.01)
*H04W 16/14* (2009.01)
(Continued)

(52) U.S. Cl.
CPC ....... *H04W 72/0413* (2013.01); *H04L 1/0025* (2013.01); *H04L 1/1671* (2013.01);
(Continued)

(58) Field of Classification Search
CPC .......................... H04W 16/14; H04W 72/0413
(Continued)

(56) References Cited

U.S. PATENT DOCUMENTS

2012/0113831 A1 5/2012 Pelletier et al.
2012/0275394 A1* 11/2012 Gunnarsson ........ H04W 72/082
370/329
(Continued)

OTHER PUBLICATIONS

3rd Generation Partnership Project; "Technical Specification Group Radio Access Network; Evolved Universal Terrestrial Radio Access (E-UTRA); Physical layer procedures" (Release 13); Jan. 6, 2016; TS36.213 v13.0.0.

*Primary Examiner* — Stephen J Clawson
(74) *Attorney, Agent, or Firm* — Jefferson IP Law, LLP

(57) ABSTRACT

A communication method and a system for supporting a high data transmission rate are provided. The method and system fuses 5G communication systems with IoT technology to transmit data at a high rate after 4G systems. The communication method and system are applied to intelligent services, based on 5G communication technology and IoT related technology, for example, smart homes, smart buildings, smart cities, smart cars or connected cars, health care, digital education, retail business, security, safety-related services, etc. The method for transmitting control information by a user equipment (UE) includes generating uplink control information (UCI), identifying whether a physical uplink shared channel (PUSCH) is not configured to transmit on a primary cell (PCell), identifying whether the PUSCH is configured to transmit on at least one secondary cell (SCell) for licensed band, and transmitting, to a base station, the UCI according to the identification.

8 Claims, 33 Drawing Sheets

Related U.S. Application Data filed on Jul. 1, 2016, provisional application No. 62/373,577, filed on Aug. 11, 2016.

(51) Int. Cl.
 *H04L 1/00* (2006.01)
 *H04L 1/16* (2006.01)
 *H04L 1/18* (2006.01)

(52) U.S. Cl.
 CPC ........... *H04L 1/1887* (2013.01); *H04W 16/14* (2013.01); *H04L 1/1861* (2013.01); *H04L 1/1896* (2013.01)

(58) Field of Classification Search
 USPC ......................................................... 370/329
 See application file for complete search history.

(56) References Cited

U.S. PATENT DOCUMENTS

| | | |
|---|---|---|
| 2013/0336160 A1 | 12/2013 | Yin et al. |
| 2015/0163794 A1* | 6/2015 | Liang .................. H04W 72/042 370/329 |
| 2015/0215930 A1 | 7/2015 | Kim et al. |
| 2015/0312775 A1 | 10/2015 | Yi et al. |

* cited by examiner

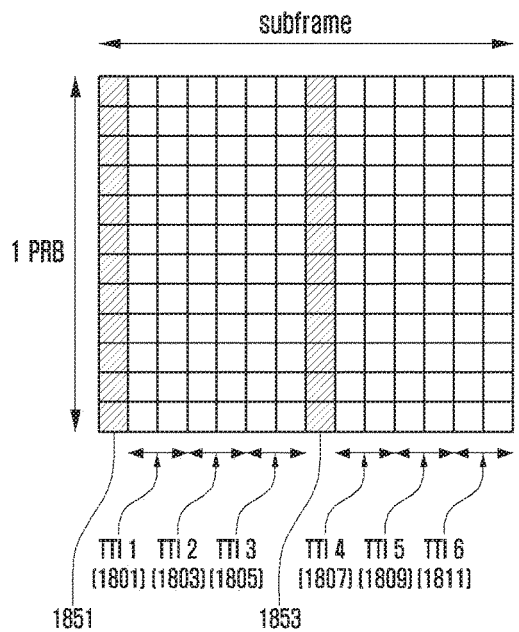
FIG. 18A
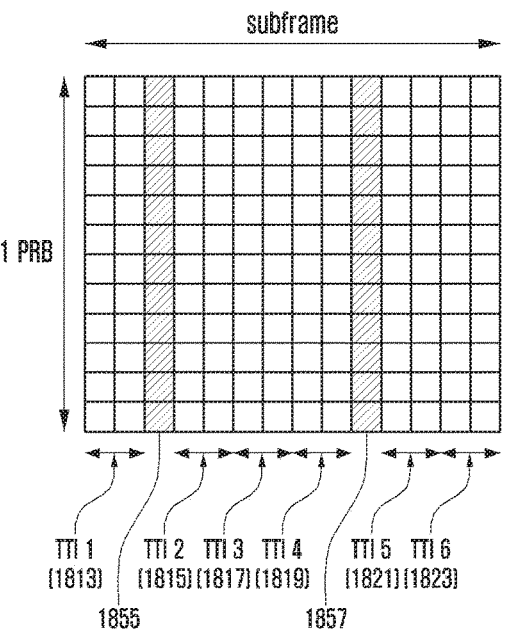
FIG. 18B
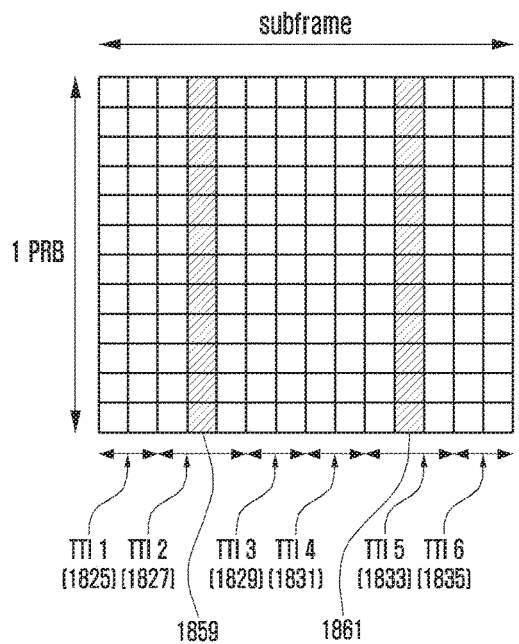
FIG. 18C
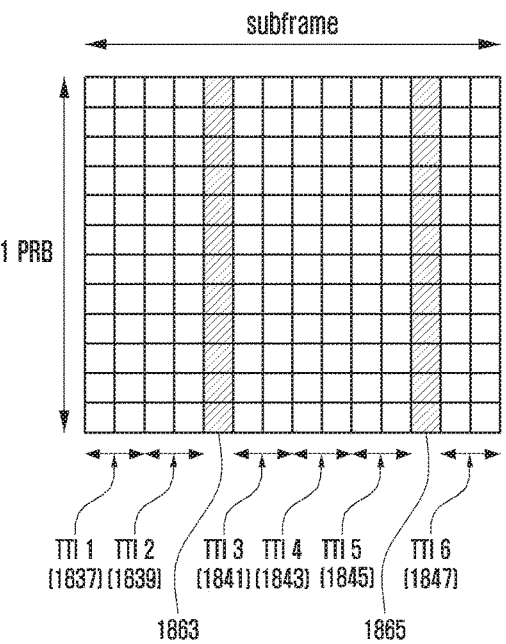
FIG. 18D
 Uplink reference signal (1800)

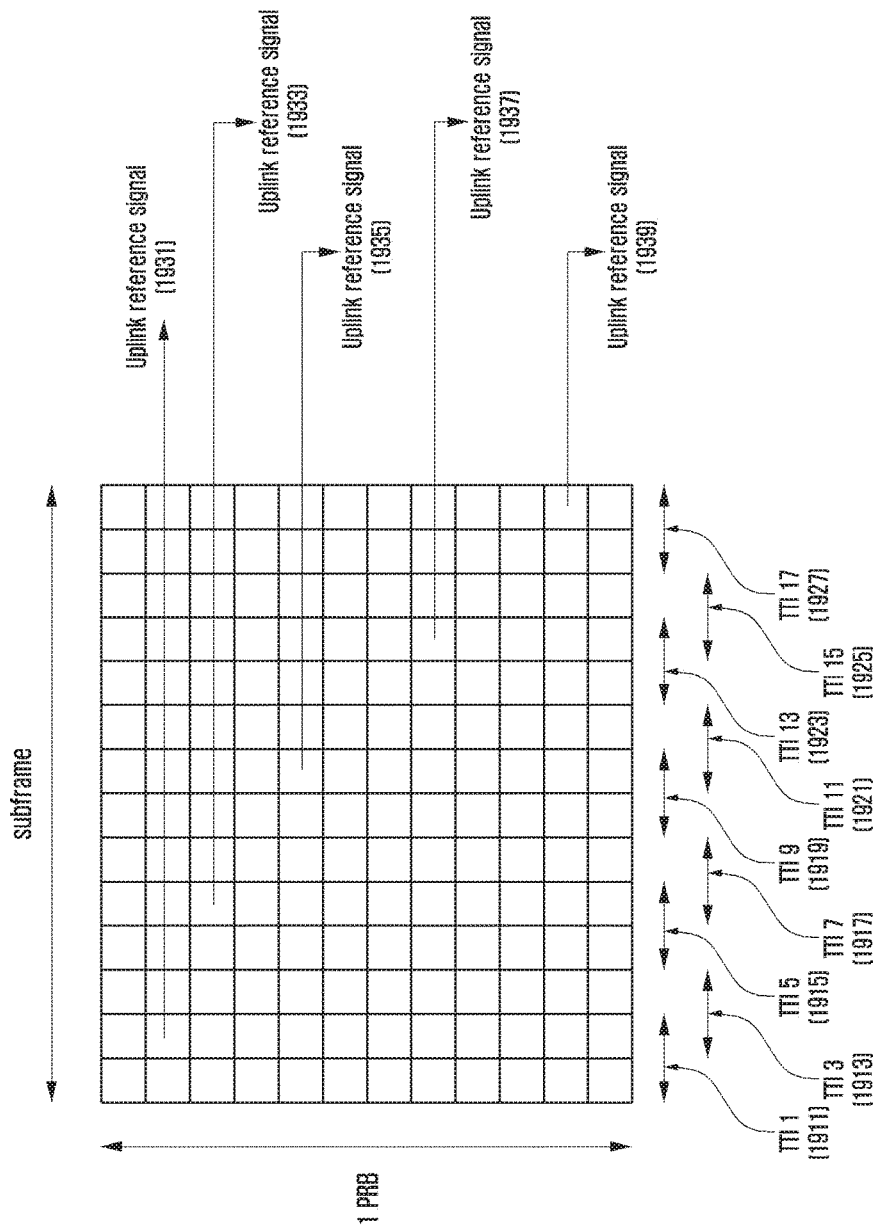

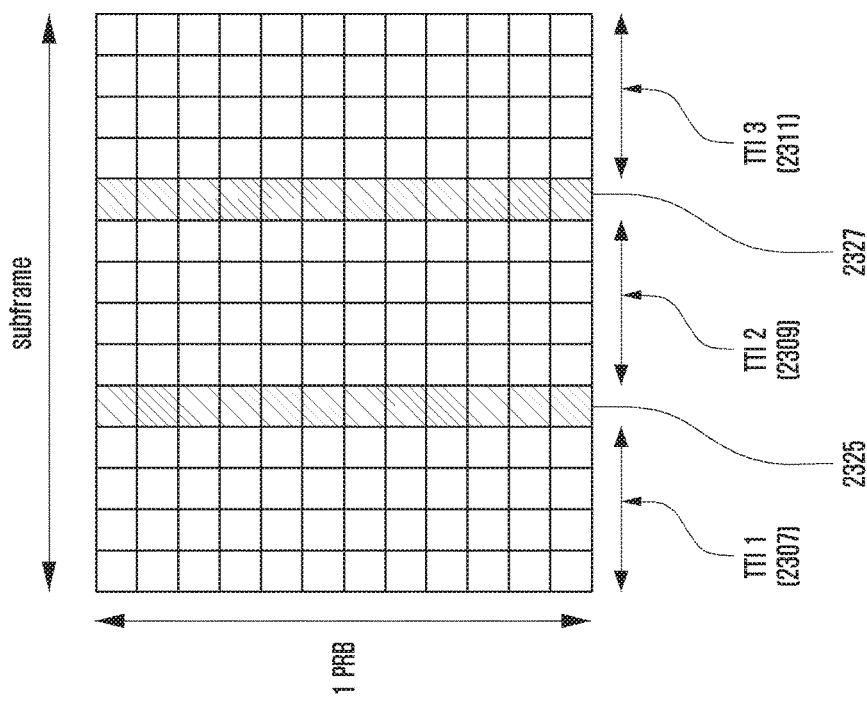
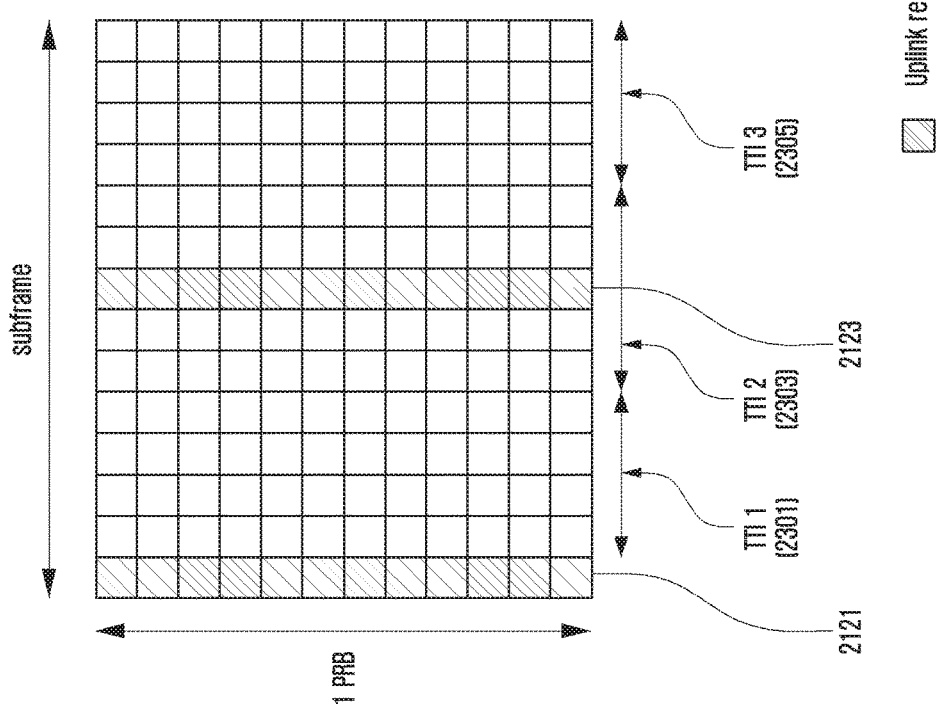

FIG. 30

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 31A

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2356 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

FIG. 31B

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2008 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14583 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

METHOD AND APPARATUS FOR TRANSMITTING UPLINK CONTROL INFORMATION IN CARRIER AGGREGATION SYSTEM

CROSS-REFERENCE TO RELATED APPLICATION(S)

This application claims the benefit under 35 U.S.C. § 119(e) of a U.S. Provisional application filed on Jan. 21, 2016 in the U.S. Patent and Trademark Office and assigned Ser. No. 62/281,357, of a U.S. Provisional application filed on Jul. 1, 2016 in the U.S. Patent and Trademark Office and assigned Ser. No. 62/357,641, and of a U.S. Provisional application filed on Aug. 11, 2016 in the U.S. Patent and Trademark Office and assigned Ser. No. 62/373,577, the entire disclosure of each of which is hereby incorporated by reference.

TECHNICAL FIELD

The present disclosure relates to wireless communication systems. More particularly, the present disclosure relates to a method and apparatus for user equipment (terminal) to transmit, to an enhanced node B (eNB) (base station), ACK/negative acknowledgement (NACK) (A/N) feedback regarding data and channel information, or uplink control information, regarding one or more serving cells in a wireless communication system.

BACKGROUND

In order to meet the increase in the demand for wireless data traffic after the commercialization of 4th generation (4G) communication systems, considerable effort has been made to develop pre-5th generation (5G) communication systems or improved 5G communication systems. This is one reason why '5G communication systems' or 'pre-5G communication systems' are called 'beyond 4G network communication systems' or 'post long-term evolution (LTE) systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive multiple-input multiple-output (MIMO), full dimensional MIMO (FD-MIMO), array antennas, analog beam-forming, large scale antennas, etc. In order to improve system networks for 5G communication systems, various technologies have been developed, e.g.: evolved small cell, advanced small cell, cloud radio access network (cloud RAN), ultra-dense network, device to device communication (D2D), wireless backhaul, moving network, cooperative communication, coordinated multi-points (CoMP), interference cancellation, etc. In addition, for 5G communication systems, other technologies have been developed, e.g., hybrid frequency shift keying (FSK) and frequency shift keying (QAM) modulation (FQAM) and sliding window superposition coding (SWSC), as advanced coding modulation (ACM), filter bank multi carrier (FBMC), non-orthogonal multiple access (NOMA), sparse code multiple access (SCMA), etc.

The Internet has evolved from a human-based connection network, where humans create and consume information, to the Internet of things (IoT) where distributed configurations, such as objects, exchange information with each other to process the information. The technology related to the IoT is starting to be combined with, for example, a technology for processing big data through connection with a cloud server, and this is called an Internet of everything (IoE) technology. In order to manifest the IoT, various technical components are required, such as, a sensing technology, wired/wireless communication and network infra technology, a service interfacing technology, a security technology, etc. In recent years, a sensor network for connecting objects, machine to machine (M2M), machine type communication (MTC), etc. have been researched. Under the IoT environment, intelligent Internet Technology (IT) services may be provided to collect and analyze data obtained from objects connected to each other and thus to create new value for human life. As existing IT technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, M2M, MTC, etc., have been implemented by beam-forming, MIMO, array antenna, etc., as 5G communication technology. The application of the cloud RAN as a big data processing technology described above may be an example of a hybrid of 5G technology and IoT technology.

In order to meet the demands for wireless data traffic, various fields are discussing the development of communication system, e.g., D2D communication, a carrier aggregation (CA) system for operating a number of cells, a multiple antenna system using large-scaled antennas, etc.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for user equipment (UE) to transmit channel information regarding a number of serving cells, and/or A/N feedback, or a combination of the channel information and the A/N feedback, under various conditions: the number of serving cells set to UE, a type of physical uplink control channel (PUCCH) format set to UE, a condition as to whether PUCCH and physical uplink shared channel (PUSCH), set to UE, are simultaneously transmitted to UE, and PUCCH transmissions via a secondary cell set to UE as well as a primary cell set to UE, without wasting a transmission resource of a downlink control channel, in a wireless communication system supporting carrier aggregation (CA).

Another aspect of the present disclosure is to provide a signal transmission method that transmits at least one of the following a control signal, a channel and a data channel in a partial sub-frame when performing a channel occupancy operation in an unlicensed band.

Long-term evolution (LTE) or LTE-advanced (LTE-A) systems need to define: a reference signal and a physical channel which are used to transmit a control signal and a data signal in the downlink and uplink in a transmission time interval of less than a sub-frame, and a method of transmitting hybrid automatic repeat request (HARQ) in downlink and uplink. To this end, the present disclosure defines a method of transmitting HARQ in downlink and uplink at respective downlink and uplink timings in LTE or LTE-A systems supporting a transmission time interval of less than 1 ms. The present disclosure provides a method and apparatus for allocating resources for HARQ transmission and downlink and uplink physical channels.

In accordance with an aspect of the present disclosure, a method for transmitting control information by UE is provided. The method includes generating uplink control information (UCI), identifying whether a PUSCH is not configured to transmit on a primary cell (PCell), identifying whether the PUSCH is configured to transmit on at least one secondary cell (SCell) for licensed band, and transmitting, to a base station, the UCI according to the identification.

In accordance with another aspect of the present disclosure, UE for transmitting control information is provided. The UE includes a transceiver configured to transmit and receive a signal, and at least one processor configured to generate UCI, identify whether a PUSCH is not configured to transmit on a primary cell (PCell), identify whether the PUSCH is configured to transmit on at least one secondary cell (SCell) for licensed band, and control transmitting, to a base station, the UCI according to the identification.

In accordance with an aspect of the present disclosure, a method for receiving control information by a base station is provided. The method includes identifying whether a physical uplink shared channel (PUSCH) is not configured to transmit on a primary cell (PCell), identifying whether the PUSCH is configured to transmit on at least one secondary cell (SCell) for licensed band, and receiving, from a user equipment (UE), uplink control information (UCI) according to the identification.

In accordance with another aspect of the present disclosure, a base station for receiving control information is provided. The base station includes a transceiver configured to transmit and receive a signal, and at least one processor configured to identify whether a physical uplink shared channel (PUSCH) is not configured to transmit on a primary cell (PCell), identify whether the PUSCH is configured to transmit on at least one secondary cell (SCell) for licensed band, and control receiving, from a user equipment (UE), uplink control information (UCI) according to the identification.

In accordance with an aspect of the present disclosure, a method for communicating control information is provided. The method includes identifying whether a physical uplink shared channel (PUSCH) is not configured to transmit on a primary cell (PCell), identifying whether the PUSCH is configured to transmit on at least one secondary cell (SCell) for licensed band, and communicating uplink control information (UCI) according to the identification, wherein the device comprises at least one of a user equipment (UE) and a base station.

In accordance with another aspect of the present disclosure, a device for communicating control information is provided. The device includes a transceiver configured to transmit and receive a signal, and at least one processor configured to identify whether a physical uplink shared channel (PUSCH) is not configured to transmit on a primary cell (PCell), identify whether the PUSCH is configured to transmit on at least one secondary cell (SCell) for licensed band, and control communication of uplink control information (UCI) according to the identification, wherein the device comprises at least one of a user equipment (UE) and a base station.

The UE transmission method and apparatus according to the present disclosure is capable of transmitting channel information or A/N feedback in a system where cells are aggregated in number up to 32. The eNB receives channel information regarding a number of serving cells or A/N feedback from the UE, and performs the optimal scheduling for the serving cells, thereby increasing the amount of transmission.

If simultaneous transmission of PUSCH and PUCCH is set to UE, PUCCH format 4/5 is set to UE, and one or two PUCCH transmission cells are set, the method according to the present disclosure is capable of transmitting, if uplink control information, such as channel information, etc., is not dropped, the uplink control information, via the PUCCH format 4/5 set to UE, considering the maximum number of UCI transmission bits which can be transmitted in the PUCCH format 4/5, and transmitting, if the PUCCH format 4/5 exceeds the maximum number of UCI transmission bits which can be transmitted, HARQ-ACK to PUCCH and channel information to PUSCH. In a state where simultaneous transmission of PUSCH and PUCCH is set to UE or uplink control information is transmitted via PUCCH, if UE has succeeded in performing (E)PDCCH reception but failed in data decoding, it needs to transmit NACK for all the code words. In this case, the method according to the present disclosure enables the UE not to perform PUCCH transmission or to decrease the PUCCH transmission power, thereby guaranteeing PUSCH transmission power of the UE. Therefore, the method according to the present disclosure is capable of enabling UE to reduce power consumption when the UE transmits control information or data to an eNB, and the eNB to receive the control information or data with a relatively high level of reliability.

The present disclosure is capable of efficiently performing the channel occupancy operation, and transmitting one or more of the following: a control signal, a channel signal, and a data channel signal in a partial sub-frame, thereby efficiently using an unlicensed band.

The present disclosure provides a transmission/reception method of shortened-transmit time interval (TTI) UE. The present disclosure also provides a system where legacy UE, performing the transmission/reception via downlink and uplink control channels and data channels in a unit of sub-frame, and shortened-TTI UE, whose transmission time interval is less than a sub-frame, coexist efficiently.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18A, 18B, 18C and 18D are diagrams showing transmission structure of an uplink in a transmission time interval transmission method using 2 single carrier frequency division multiple access (SC-FDMA) symbols according to various embodiments of the present disclosure;

FIG. 19 is a diagram showing an example of a symbol location in one sub-frame where two symbols are transmitted in an uplink using a two-symbol TTI according to an embodiment of the present disclosure;

FIGS. 23A and 23B are diagrams showing transmission structure of an uplink in a transmission time interval transmission method using 4 SC-FDMA symbols according to various embodiments of the present disclosure;

FIG. 30 is a table for determining transport block size (TBS) indexes set according to modulation and coding scheme (MCS) values in a LTE system according to various embodiments of the present disclosure; and FIGS. 31A and 31B are tables for determining TBS according to TBS indexes and a number of PRBs allocated to UE in an LTE system according to various embodiments of the present disclosure.

Throughout the drawings, like reference numerals will be understood to refer to like parts, components, and structures.

DETAILED DESCRIPTION

Figure 1:
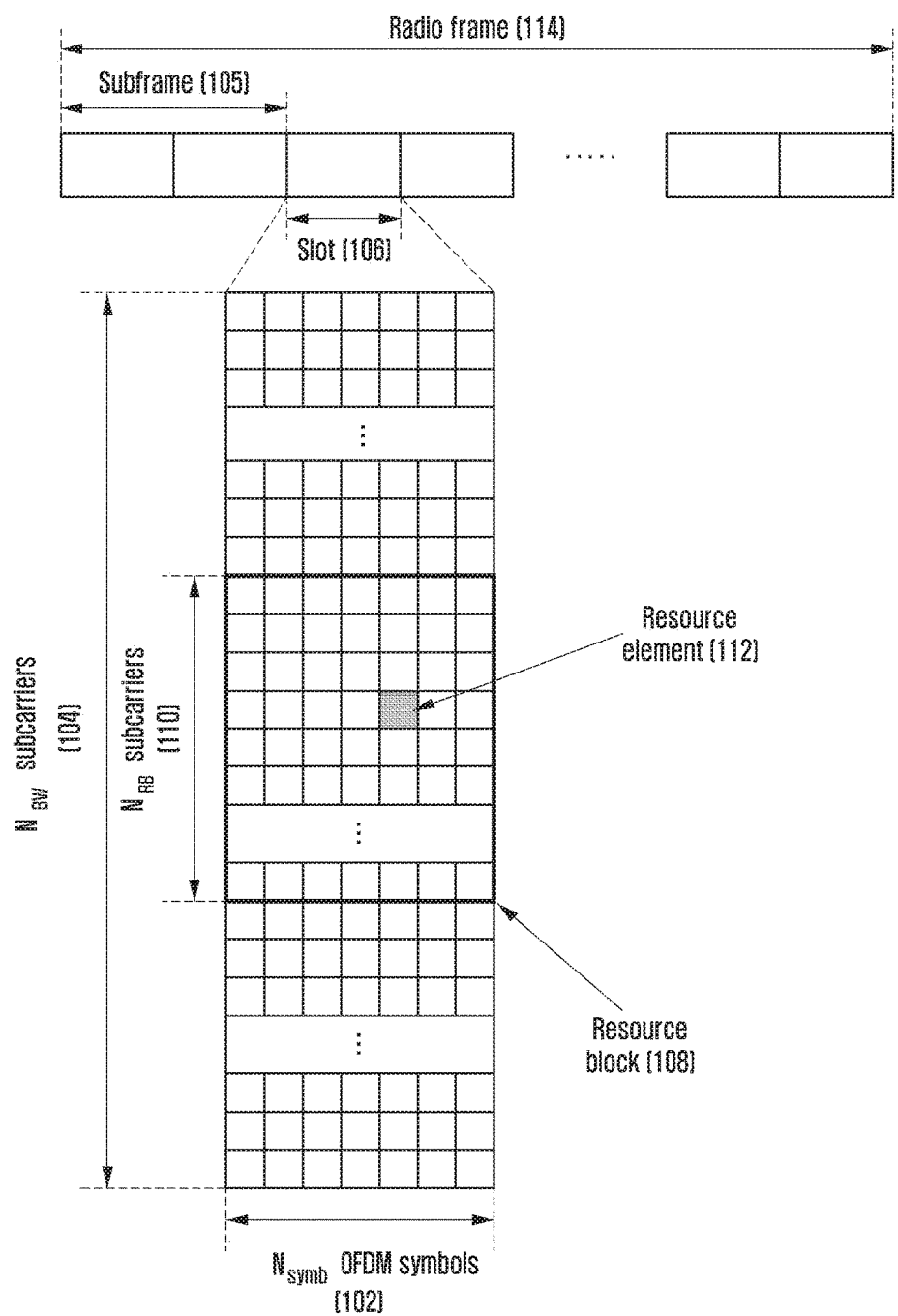
FIG. 1 is a diagram showing a basic architecture of a time-frequency domain as a wireless resource domain through which a long-term evolution (LTE) system transmits data or control channel in a downlink according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, embodiments of the present disclosure will be described based on advanced evolved universal mobile telecommunications system terrestrial radio access (E-UTRA) (also called long-term evolution-advanced (LTE-A)) supporting carrier aggregation (CA); however, it will be appreciated to those skilled in the art that the subject matter of the present disclosure can also be applied to various types of communication systems which have the technical background and channel forms similar to those of the present disclosure, without departing from the scope and spirit of the present disclosure. For example, the subject matter of the present disclosure may be applied to multicarrier HSPA supporting carrier aggregation.

In LTE (used, in the present disclosure, to include all advanced technologies related to LTE, such as LTE-A, unless LTE indicates otherwise), considering that the number of licensed bands, frequency, is limited, a study is made to provide LTE services in unlicensed bands such as a 5 GHz band, which is called licensed assisted access (LAA). If LAA is introduced, by applying CA of LTE-A, an LTE cell of a licensed band is used as a Pcell, and an LAA cell as an unlicensed band is used as an Scell. Therefore, feedback, created in a LAA cell as an Scell, as in LTE-A, needs to be transmitted only to a Pcell, so that the frequency division duplex (FDD) or time division duplex (TDD) architectures can be applied to the LAA cell. In the following description, a communication system where the LTE cell and the LAA cell coexist and carriers are aggregated is explained in detail.

Mobile communication systems have developed to provide voice call services, supporting users' mobility. With the development of communication technology, mobile communication systems have recently provided data communication services, or high speed data services. As mobile communication systems evolve to provide a wider range of services, they face lack of resources and users' demands for high speed data services. Therefore, the development of more advance mobile communication systems is required.

In order to comply with users' demands, LTE that has been developed as a next generation communication system is standardized in the 3rd generation partnership project (3GPP). LTE is a technology to implement high speed packet-based communication supporting a maximum transmission rate of up to 100 Mbps. To this end, various proposals have been discussed. As an example, a scheme has been proposed to reduce the number of nodes on communication paths by simplifying network architecture. Another scheme has been proposed to apply wireless protocols to wireless channels as close as possible.

If a decoding failure occurs in the initial transmission, LTE systems employ a hybrid automatic repeat request (HARQ) scheme that allows a physical layer to re-transmit corresponding data. HARQ scheme allows a receiver to transmit negative acknowledgement (NACK) informing of decoding failure to a transmitter, so that the transmitter can re-transmit corresponding data from the physical layer to the receiver. The receiver combines data re-transmitted from the transmitter with data that the receiver has failed to decode, thereby increasing the reception performance of data. The HARQ scheme also allows a receiver to transmit acknowledgement (ACK) informing of decoding success to a transmitter, so that the transmitter can transmit new data to the receiver.

Embodiment 1

FIG. 1 is a diagram showing a basic architecture of a time-frequency domain as a wireless resource domain through which an LTE system transmits data or control channel in the downlink according to an embodiment of the present disclosure.

Referring to FIG. 1, the horizontal axis represents a time domain and the vertical axis represents a frequency domain. In the time domain, a minimum unit of transmission is an orthogonal frequency division multiplexing (OFDM) symbol. OFDM symbols of $N_{symb}$, indicated by reference number 102, forms one slot 106, and two slots form one sub-frame 105. The length of a slot is 0.5 ms. The length of a sub-frame is 1.0 ms. A radio frame 114 is a unit of time domain formed by 10 sub-frames. In the frequency domain, a minimum unit of transmission is a sub-carrier. The total system transmission bandwidth is sub-carriers of a total of $N_{BW}$, indicated by reference number 104.

In the time-frequency domain, the basic unit of resource is a resource element (RE) 112 which may be represented by an OFDM symbol index and a sub-carrier index. A resource block (RB) or physical RB (PRB) 108 is defined as successive OFDM symbols of $N_{symb}$ 102 in the time domain and successive sub-carrier of $N_{RB}$ 110 in the frequency domain. Therefore, one RB 108 is formed by REs 112 of $N_{symb} \times N_{RB}$. In general, a minimum unit of data transmission is RB. In LTE systems, $N_{symb}$ is 7; $N_{RB}$ is 12; and $N_{BW}$ and $N_{RB}$ are proportional to the system transmission bandwidth. The data rate increases in proportion to the number of RBs scheduled to user equipment (UE) or a terminal. LTE systems define and use six transmission bandwidths. In the case of an FDD system identifying and using downlink and uplink based on frequency, the downlink transmission bandwidth and the uplink transmission bandwidth may differ from each other. Channel bandwidth represents RF bandwidth corresponding to system transmission bandwidth. The relation between the channel bandwidth and the system transmission bandwidth, defined in LTE systems, is shown as in the following Table 1. For example, an LTE system of 10 MHz channel bandwidth is formed configured in such a way that the transmission bandwidth has 50 RBs.

TABLE 1

| | Channel bandwidth BWChannel [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

Downlink control information is transmitted within the initial N OFDM symbols in the sub-frame. In general, N={1, 2, 3}. Therefore, a value of N varies at each sub-frame according to the amount of control information that needs to be transmitted via the current sub-frame. The control information may contain: a control channel transmission interval indicator indicating the number of OFDM symbols carrying control information, scheduling information for downlink data or uplink data, HARQ ACK/NACK signals, etc.

In LTE systems, scheduling information for downlink data or uplink data is transmitted from an eNB to UE via downlink control information (DCI). Uplink (UL) is referred to as a radio link through which UE transmits data or control signals to an eNB. Downlink (DL) is referred to as a radio link through which an eNB transmits data or control signals to UE. DCI is defined in various types of format, according to: scheduling information for uplink data (UL grant) or scheduling information for downlink data (DL grant), compact DCI indicating a small size of control information, spatial multiplexing using a multiple antenna, a use for power control, etc. For example, DCI format 1, defined for scheduling control information regarding downlink data (DL grant), may be configured to include details of control information as follows.

Resource allocation type 0/1 flag: notify that a resource allocation scheme is type 0 or type 1.

Type 0 indicates that resources are allocated in a unit of resource block group (RBG) by using a bitmap scheme. In LTE systems, a basic unit of scheduling is a RB expressed by time and frequency domain resources, and one RBG is configured to include a number of RBs and is a basic unit of scheduling in the scheme of type 0. Type 1 indicates that a specified RB is allocated in an RBG.

Resource block assignment: notify RBs allocated for the data transmission.

Resources, expressed according to a system bandwidth and a resource allocation scheme, are determined.

Modulation and coding scheme (MCS): notify a modulation scheme used for the data transmission and the size of transport block as data to be transmitted.

HARQ process number: notify an HARQ process number.

New data indicator: notify whether transmission is HARQ initial transmission or re-transmission.

Redundancy version: notify a redundancy version of HARQ.

Transmit power control (TPC) command for physical uplink control channel (PUCCH): notify a TPC command for PUCCH as an uplink control channel.

The DCI is processed by channel coding and modulation, and is transmitted via physical downlink control channel (PDCCH) or enhanced PDCCH (EPDCCH) as a downlink physical control channel.

In general, the DCI is processed independently by channel coding for each UE, and formed and transmitted as independent PDCCHs. In the time domain, PDCCH is mapped and transmitted during the control channel transmission interval. The mapping location of PDCCH in the frequency domain is determined by an identifier (ID) of each UE, and is spread over the overall system transmission bandwidth.

The downlink data is transmitted via a physical downlink shared channel (PDSCH) serving as a physical channel for the transmission of downlink data. PDSCH is transmitted after the control channel transmission interval. Scheduling information, such as a mapping location in the frequency domain, a modulation scheme, etc., is notified by DCI transmitted via the PDCCH.

An eNB notifies UE of a modulation scheme applied to PDSCH to be transmitted and a size of data to be transmitted, i.e., transport block size (TBS), via MCS of 5 bits in the control information forming DCI. The TBS corresponds to a size of data (transport block (TB)) that an eNB needs to transmit and that has not been processed by a channel coding for error correction.

Modulation schemes supported by LTE systems are quadrature phase shift keying (QPSK), quadrature amplitude modulation (16QAM), and 64QAM, whose modulation orders ($Q_m$) correspond to 2, 4, and 6, respectively. That is, QPSK modulation is capable of transmitting 2 bits per symbol; and 16QAM modulation is capable of transmitting 4 bits per symbol; and 64QAM modulation is capable of transmitting 6 bits per symbol.

A 3GPP LTE Rel-10 employs bandwidth extension to support a larger amount of data transmission than LTE Rel-8. Bandwidth extension or CA is a technique that extends bandwidth, compared with LTE Rel-8 UE that transmitting data via one bandwidth, and thus increases the amount of data transmission by extended bandwidths. Each of the bandwidths is called a component carrier (CC). LTE Rel-8 UE is set to have one component carrier for each of the downlink and uplink. A downlink component carrier and an uplink component carrier connected to SIB-2 are both called a cell. SIB-2 connecting relation of an uplink component carrier and a downlink component carrier is transmitted via a system signal or a higher signal. UE supporting CA is capable of performing the reception of downlink data and the transmission of uplink data via a number of serving cells.

In Rel-10, an eNB has difficulty in transmitting, to a specified UE, PDCCH in a specified serving cell. In this case, the eNB is capable of transmitting, to the UE, PDCCH in another serving cell, and setting a Carrier Indicator Field (CIF) informing that the PDCCH indicates a PDSCH or physical uplink shared channel (PUSCH) of the other serving cell. The CIF may be set by UE supporting CA. The CIF may be set in such a way as to add 3 bits to PDCCH information in a specified serving cell and to indicate another serving cell. The CIF is included only when a cross carrier scheduling is performed. If the CIF is not included, a crossing carrier scheduling is not performed. If the CIF is included in a DL assignment, it is defined to indicate a serving cell to which PDSCH scheduled by the DL assignment is transmitted. If the CIF is included in an uplink resource assignment (UL grant), it is defined to indicate a serving cell to which PUSCH scheduled by the UL grant is transmitted.

As described above, in LTE-10, CA or bandwidth extension is defined and a number of serving cells are set by UE. For eNB's data scheduling, UE transmits channel information regarding a number of serving cells to the eNB, periodically or aperiodically. The eNB schedules data by carriers and transmits data to UE. The UE transmits, to the eNB, A/N feedback in response to the received data by carriers. The LTE Rel-10 is designed in such a way that A/N feedback of a maximum of 21 bits is transmitted, and if A/N feedback and channel information are overlapping, in transmission, on one sub-frame, the A/N feedback is transmitted and channel information is discarded. The LTE Rel-11 is designed in such a way that channel information regarding one cell is multiplexed with A/N feedback, and channel information regarding one cell and A/N feedback of a maximum of 22 bits are transmitted, in PUCCH format 3, via a transmission resource of PUCCH format 3.

In the LTE-13, it is assumed in the scenario that the number of serving cells extends up to a maximum of 32, by a licensed band and an unlicensed band. In this case, channel information transmissions to a number of serving cells may be mutually conflicted on one sub-frame. Therefore, a new PUCCH format needs to be designed so that information regarding a number of channels or A/N feedback can be transmitted once. In order to multiplex A/N feedback or channel information regarding as many serving cells as possible in one sub-frame under various conditions, a method is needed to support operations of UE. That is, under various conditions: the number of serving cells set to UE; a type of PUCCH format set to UE; a condition as to whether PUCCH and PUSCH, set to UE, are simultaneously transmitted to UE; and PUCCH transmissions via a secondary cell set to UE as well as a primary cell set to UE, information regarding a channel through which UE needs to perform transmission, a method is needed to determine: operation of A/N feedback to be transmitted, and transmission resources; and transmit the channel information and/or A/N feedback or a combination thereof, using the transmission format mapped to the transmission resource.

Figure 2A:
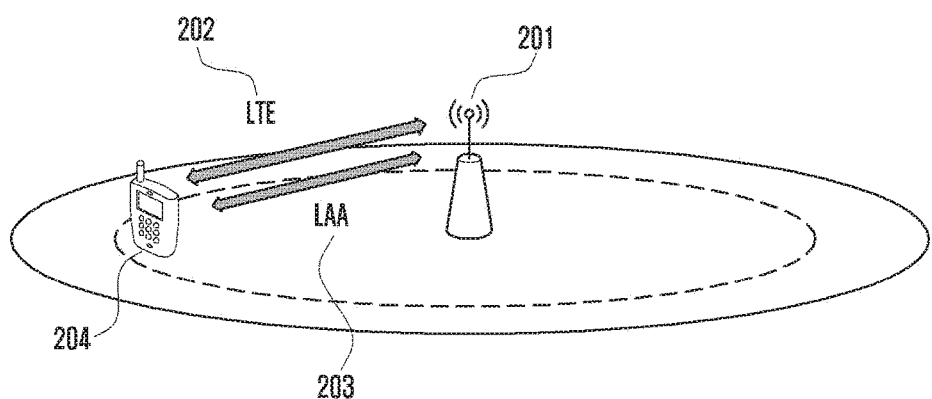
FIGS. 2A and 2B are diagrams showing a communication system according to various embodiments of the present disclosure.
Figure 2B:
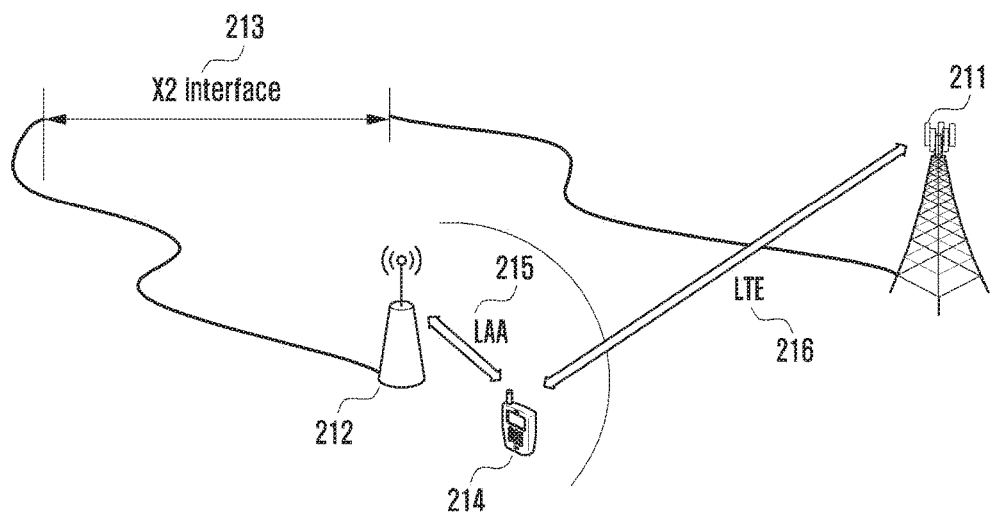

FIGS. 2A and 2B are diagrams showing a communication system according to various embodiments of the present disclosure.

Referring to FIG. 2A, a diagram is provided showing a network where an LTE cell 202 and an LAA cell 203 coexist in one small eNB 201. UE 204 transmits/receives data to/from an eNB via an LTE cell 202 and an LAA cell 203. In this case, the LTE cell 202 or the LAA cell 203 is not limited in duplex mode. However, if an LTE cell is a Pcell, uplink transmission is performed via only the LTE cell 202.

Referring to FIG. 2B, a diagram is provided showing a network where an LTE cell 216 and an LAA cell 215 coexist with an LTE macro eNB 211 for wide coverage and an LAA small eNB 212 to increase the amount of data transmission are installed for use by a UE 214. In this case, the LTE macro eNB 211 or the LAA small eNB is not limited in duplex mode. However, if an LTE eNB is a PCell, uplink transmission is performed via only the LTE eNB 211. It is assumed that the LTE eNB 211 and the LAA eNB 212 have an ideal backhaul network. Therefore, high-speed inter-eNB X2 communication 213 is possible. Although uplink transmission is performed by only the LTE eNB 211, the LAA eNB 212 can receive related-control information, in real-time, from the LTE eNB 211, via X2 communication 213. With reference to FIGS. 2A and 2B, the system allows the LTE cell and the LAA cell to include a number of serving cells, and to support 32 serving cells in total. Therefore, the methods according to the present disclosure can be applied to the systems shown in FIGS. 2A and 2B.

In LTE Rel-12, for CA as bandwidth extension, a maximum number of serving cells of up to 5 may be set for UE. UE may set higher information so that the UE can periodically transmit the channel information to an eNB and thus the eNB performs data scheduling based on the channel information.

In the following description, the operation that channel information is periodically transmitted is called a 'periodic channel information transmission.' Periodic channel information is transmitted via a PUCCH of a primary serving cell (Pcell). Each serving cell independently defines a periodic channel information transmission for UE set for CA. Types of information to be transmitted in the periodic channel information transmission are: subband channel quality indicator (CQI), subband CQI and second precoding matrix indicator (PMI), wideband CQI and PMI, wideband first PMI, wideband CQI and second PMI, wideband CQI and first PMI and second PMI, rank indicator (RI), wideband CQI, RI and first PMI, RI and precoder type indicator (PTI), etc.

Information items that UE needs to transmit are determined according to a transmission mode by higher information of the various types of information, and information items to be transmitted according to higher information are set to have cycles and offsets respectively.

If the timings of the periodic channel information transmission to a number of serving cells are identical to each other on one sub-frame, the periodic channel information transmission is designed in such a way that the periodic channel information for only one serving cell is only transmitted on one sub-frame via PUCCH of Pcell. If the transmission timings of a number of channel information items to one serving cell are identical to each other on one sub-frame, only one channel information item is transmitted. In this case, from among the periodic channel information items set to be transmitted to a number of serving cells, the priority of transmission is determined, based on a type of information to be transmitted and a serving cell index, so that only periodic channel information regarding one serving cell is transmitted and the periodic channel information regarding the remaining serving cells is discarded. In the following description, the priority of the transmission of channel information is explained.

For example, if the transmission timings of a number of channel information items to one serving cell are identical to each other, information including a rank indication (RI) has the highest priority. If the transmission timings of channel information items to a number of serving cells are identical to each other, information including an RI or a first PMI has the first priority and information including a wideband CQI has the second priority. If channel information items with the same priority are transmitted to different serving cells, one of them, with a lower serving cell index, has priority. Since Rel-10 has assumed that two serving cells are set, conflict between periodic channel information transmissions to a number of serving cells does not occur frequently. Therefore, an eNB may set cycles and offsets of periodic channel information transmissions to serving cells to different values, thereby easily avoiding transmission conflict.

However, if it is assumed that a maximum number of serving cells of up to 32 is configured as in Rel-13, it is difficult to avoid conflict between periodic channel information transmissions to a number of serving cells, by an eNB only setting cycles or offsets of periodic channel information transmissions to serving cells to different values. Therefore, the coincidence probability of transmission timings of channel information on one sub-frame is much higher than that of Rel-12. As defined in Rel-12, if UE transmits only one periodic channel information item in only one serving cell and discards periodic channel information regarding the remaining serving cells, the eNB has difficulty in performing an optimal scheduling for the remaining serving cells, and thus decreases the amount of transmission data to the UE.

If an eNB transmits a UL grant including an aperiodic channel information request in order to transmit channel information items to a number of serving cells, it needs to transmit UL grants each time that the timings of periodic channel information transmission in one serving cell or a number of serving cells are identical to each other, and this wastes the PDCCH transmission resources and also decreases PDCCH resources for scheduling other UEs under the eNB. Therefore, if Rel-13 supports the settings for a maximum number of serving cells of 32 for CA, a method is needed to support the periodic channel information transmission for as many serving cells as possible via one sub-frame without PDCCH transmission resources.

Therefore, Rel-13 defines a new PUCCH format capable of transmitting a payload size of more than 22 bits, which is called, in the preset disclosure, a PUCCH format 4 or 5 and expressed as a PUCCH format 4/5. The PUCCH format 4/5 may be used to transmit A/N feedback in response to downlink data scheduled by a number of cells, channel information multiplexed by a number of cells, and A/N feedback and channel information, simultaneously, when the A/N feedback and the channel information overlap in transmission on one sub-frame.

In the following description, a method according to embodiments of the present disclosure is explained that UE transmits A/N feedback or channel information regarding a number of serving cells, under various conditions: the number of serving cells set to UE; a type of PUCCH format set to UE; a condition as to whether PUCCH and PUSCH, set to UE, are simultaneously transmitted to UE; and PUCCH transmissions via a secondary cell set to UE as well as a primary cell set to UE, in a wireless communication system supporting carrier aggregation.

A detailed description regarding the conditions is provided as follows.

UE receives, from an eNB, a higher signal for the setting of a serving cell; is configured with cells for the transmission/reception of data; and transmits/receives data and control information to the eNB via the configured cells.

UE may be set, by an eNB, to use a type of PUCCH format for the transmission of uplink control information. UE may be determined to use a specified PUCCH format under a specified condition. The UE performs the transmission of uplink control information using the determined or set PUCCH format.

If UE is capable of performing simultaneous transmission of PUSCH and PUCCH, it may be set, by the eNB, to receive a higher signal for performing simultaneous transmission of PUSCH and PUCCH. If UE is not set to receive the higher signal or is not capable of performing simultaneous transmission of PUSCH and PUCCH, it transmits uplink control information, in one sub-frame, via PUCCH or PUSCH. UE set to perform simultaneous transmission of PUSCH and PUCCH is capable of transmitting uplink control information, in one sub-frame, via PUCCH and PUSCH.

UE is set to basically transmit uplink control information regarding serving cells set to the UE using a primary cell. If UE is capable of transmitting uplink control information via two PUCCHs, it receives, from an eNB, a higher signal to additionally use one secondary cell for the PUCCH transmission, and transmits uplink control information to the eNB, using the set PUCCH transmission secondary cell and the primary cell.

The following description provides a method for UE to transmit uplink control information under various conditions according to the present disclosure.

More specifically, the following description provides a method for UE to transmit uplink control information, under various conditions: the number of serving cells set to UE; a type of PUCCH format set to UE; a condition as to whether PUCCH and PUSCH, set to UE, are simultaneously transmitted to UE; and PUCCH transmissions via a secondary cell set to UE as well as a primary cell set to UE.

A first condition is set where only one serving cell is set to UE and simultaneous transmission of PUSCH and PUCCH is not set to UE. In this case, UE performs the following operations to transmit uplink control information via sub-frame n.

If UE does not transmit PUSCH via sub-frame n, the UE transmits uplink control information via PUCCH, using at least one set or pre-determined PUCCH format.

If UE transmits PUSCH via sub-frame n, the UE multiplexes uplink control information with the PUCCH and transmits the result.

A second condition is set where only one serving cell is set to UE and simultaneous transmission of PUSCH and PUCCH is set to UE. In this case, UE performs the following operations to transmit uplink control information via sub-frame n.

If uplink control information to be transmitted via sub-frame n is only HARQ-ACK/SR, UE transmits uplink control information via PUCCH, using at least one set or pre-determined PUCCH format.

If uplink control information to be transmitted via sub-frame n is only periodic channel information, UE transmits uplink control information via PUCCH, using the set PUCCH format.

If uplink control information to be transmitted via sub-frame n is periodic channel information and HARQ-ACK, and UE does not transmit PUSCH, UE transmits uplink control information via PUCCH, using a set or pre-determined PUCCH format.

If uplink control information to be transmitted via sub-frame n is HARQ-ACK/SR and periodic/aperiodic channel information, and UE transmits PUSCH, the UE multiplex the periodic/aperiodic channel information with PUSCH and transmits the result, and transmits the HARQ-ACK/SR, via PUCCH, using at least one set or pre-determined PUCCH format. In this case, UE needs to simultaneously perform PUCCH transmission and PUSCH transmission. If UE is in a situation limited in transmission power (power limited situation), PUCCH transmission power has priority over PUSCH. That is, when performing transmission to an eNB, UE first allocates available transmission power to PUCCH and then the remaining power to PUSCH. If UE expects the same operation from an eNB regardless of a type of channel to which UE an eNB regarding transmission power is applied, additional transmission power may be allocated to PUSCH. An example that UE may expect the same operation from an eNB is the data re-transmission of an eNB for the PUCCH transmission. If UE has failed to decode data and needs to request the re-transmission of the data, it maps NACK to HARQ-ACK and transmits it to an eNB via PUCCH. If the eNB receives NACK via a PUCCH, it re-transmits data corresponding to the NACK to the UE. UE combines the re-transmitted data with the existing transmitted data, so that it can receive data from the eNB with high reliability.

In addition to the case of the reception of NACK via PUCCH, the eNB may also re-transmit data to the UE. For example, if the eNB does not receive HARQ-ACK information via PUCCH or PUSCH, it may re-transmit data to the UE. If UE transmitting NACK via PUCCH reduces the PUCCH transmission power, the eNB does not receive HARQ-ACK information in PUCCH or PUSCH and then performs the re-transmission of data. The data re-transmission performed since an eNB has not received HARQ-ACK information via PUCCH or PUSCH differs from the data re-transmission performed since an eNB has received NACK via PUCCH as follows: if the eNB has not received HARQ-ACK information via PUCCH or PUSCH, it means that the eNB ascertains that UE has not received data via (E)PDCCH. Therefore, the eNB increases an amount of resource used for the (E)PDCCH transmission, i.e., an aggregation level required for the (E)PDCCH transmission, and performs the (E)PDCCH transmission so that the UE receives data via (E)PDCCH with relatively high reliability. Therefore, UE supporting PUCCH transmission and PUSCH transmission receives the setting of simultaneous transmission of PUCCH and PUSCH from an eNB. If UE needs to simultaneously perform the PUCCH transmission and the PUSCH transmission, the present disclosure enables the UE to perform corresponding operations based on the following conditions, thereby allocating additional transmission power to PUSCH transmission and allowing an eNB to increase the reliability of PUSCH reception.

Condition 1: UE has succeeded in (E)PDCCH reception, but failed to receive data and thus needs to transmit NACK for all code words:

UE's Operations

Embodiment 1: UE sets a maximum of power for PUCCH transmission (Pcmax) to a minimum value within a range set by eNB, in a sub-frame that performs PUCCH transmission and includes NACK. PUCCH transmission power is restricted to a value less than or equal to Pcmax according to the following Equation 1. UE may allocate transmission power (of actually available maximum power-Pcmax) to PUSCH transmission in a corresponding sub-frame.

$$P_{PUCCH}(i) = \min\left\{\begin{array}{l} P_{CMAX}, \\ P_{0\_PUCCH} + PL + h(n_{CQI}, n_{HARQ}) + \\ \Delta_{F\_PUCCH}(F) + g(i) \end{array}\right\} [dBm] \quad \text{Equation 1}$$

In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Embodiment 2: UE sets PUCCH transmission power to '0' in a sub-frame that performs PUCCH transmission and includes NACK. That is, UE does not perform PUCCH transmission. Therefore, UE may allocate transmission power for PUCCH transmission to PUSCH transmission in a corresponding sub-frame. In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Embodiment 3: UE performs an operation to reduce PUCCH transmission power in a sub-frame that performs PUCCH transmission and includes NACK. For example, UE decreases PUCCH transmission power to a value as small as possible in the sub-frame, by: applying a minimum value within a range of PO_PUCCH to the equation; applying '0,' instead of the received power control command, to the equation, in an accumulation mode when it controlling power; applying '−1,' instead of the received power control command, to the equation, in an absolute mode when it controls power; etc. Therefore, UE may allocate transmission power for PUCCH transmission to PUSCH transmission in a corresponding sub-frame. In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Condition 2: UE has succeeded in (E)PDCCH reception, and needs to transmit ACK for at least one code word (i.e., cases other than condition 1):

UE performs normal UE's operations where PUCCH transmission power has priority over PUSCH transmission power under condition 2.

Condition 3 is set where one or more serving cells are set to UE and simultaneous transmission of PUSCH and PUCCH is not set to UE. In this case, UE performs the following operations to transmit uplink control information via sub-frame n.

If UE does not transmit PUSCH via sub-frame n, the UE transmits uplink control information via PUCCH, using at least one set or pre-determined PUCCH format. In this case, if PUCCH format 4/5 is set to UE, the UE is capable of transmitting uplink control information via PUCCH using the PUCCH format 4/5.

If uplink control information to be transmitted via sub-frame n is either aperiodic channel information or aperiodic channel information and HARQ-ACK, UE multiplexes the uplink control information with PUSCH instructed to transmit aperiodic channel information and transmits the result.

If uplink control information to be transmitted via sub-frame n is periodic channel information or HARQ-ACK, and UE is instructed to transmit PUSCH via a primary cell, the UE multiplexes the uplink control information with PUSCH of the primary cell and transmits the result.

If uplink control information to be transmitted via sub-frame n is periodic channel information or HARQ-ACK, and UE is instructed to transmit PUSCH via only a secondary cell without using a primary cell, the UE multiplexes the uplink control information with PUSCH which is instructed to transmit uplink link control information via a secondary cell with the smallest serving cell index from among the secondary cells, and transmits the result.

Condition 4 is set where one or more serving cells are set to UE and simultaneous transmission of PUSCH and PUCCH is set to UE. In this case, UE performs the following operations to transmit uplink control information via sub-frame n.

If uplink control information to be transmitted via sub-frame n is only HARQ-ACK/SR, UE transmits uplink control information via PUCCH, using at least one set or pre-determined PUCCH format.

If uplink control information to be transmitted via sub-frame n is periodic channel information or HARQ-ACK, UE transmits uplink control information via PUCCH, using at least one set or pre-determined PUCCH format. In this case, if PUCCH format 4/5 is set to UE, the UE is capable of transmitting uplink control information via PUCCH using the PUCCH format 4/5.

If uplink control information to be transmitted via sub-frame n is only periodic channel information regarding only one serving cell, UE transmits uplink control information via PUCCH using a set PUCCH format.

If uplink control information to be transmitted via sub-frame n is periodic channel information and HARQ-ACK, and UE is instructed to transmit PUSCH via a primary cell, the UE is capable of performing the following operations.

If PUCCH format 3 is set to UE, the UE multiplexes periodic channel information with PUSCH of a primary cell and transmits the result, and transmits HARQ-ACK/SR via PUCCH using a PUCCH format 3 and/or a pre-determined PUCCH format.

If PUCCH format 4/5 is set to UE, the UE is capable of performing the following operations.

Method 1: UE multiplexes periodic channel information with PUSCH of a primary cell and transmits the result, and transmits HARQ-ACK/SR via PUCCH using a PUCCH format 4/5 and/or a pre-determined PUCCH format.

Method 2: UE transmits periodic channel information and HARQ-ACK/SR via PUCCH using a PUCCH format 4/5.

Method 3: Although UE transmits periodic channel information and HARQ-ACK/SR using a PUCCH format 4/5, it determines whether the periodic channel information is dropped. If UE ascertains that part of the periodic channel information needs to be dropped since the PUCCH format 4/5 is restricted in transmittable payload size, the UE multiplexes periodic channel information with PUSCH of a primary cell and transmits the result, and transmits HARQ-ACK/SR via PUCCH using a PUCCH format 4/5 and/or a pre-determined PUCCH format.

If uplink control information to be transmitted via sub-frame n is periodic channel information and HARQ-ACK, and UE is instructed to transmit PUSCH via only a secondary cell without a primary cell, the UE is capable of performing the following operations.

If PUCCH format 3 is set to UE, the UE multiplexes periodic channel information with PUSCH of a secondary cell with the smallest serving cell index from among the secondary cells and transmits the result, and transmits HARQ-ACK/SR via PUCCH using a PUCCH format 3 and/or a pre-determined PUCCH format.

If PUCCH format 4/5 is set to UE, the UE is capable of performing the following operations.

Method 1: UE multiplexes periodic channel information with PUSCH of a secondary cell with the smallest serving cell index from among the secondary cells and transmits the result, and transmits HARQ-ACK/SR via PUCCH using a PUCCH format 4/5 and/or a pre-determined PUCCH format.

Method 2: UE transmits periodic channel information and HARQ-ACK/SR via PUCCH using a PUCCH format 4/5.

Method 3: Although UE transmits periodic channel information and HARQ-ACK/SR using a PUCCH format 4/5, it determines whether the periodic channel information is dropped. If UE ascertains that part of the periodic channel information needs to be dropped since the PUCCH format 4/5 is restricted in transmittable payload size, the UE multiplexes periodic channel information with PUSCH of a secondary cell with the smallest serving cell index from among the secondary cells and transmits the result, and transmits HARQ-ACK/SR via PUCCH using a PUCCH format 4/5 and/or a pre-determined PUCCH format.

If uplink control information to be transmitted via sub-frame n is aperiodic channel information and HARQ-ACK/SR, the UE multiplexes aperiodic channel information with PUSCH instructed to transmit aperiodic channel information and transmits the result, and transmits HARQ-ACK/SR via PUCCH using one of the PUCCH formats set or pre-determined to UE.

If uplink control information to be transmitted via sub-frame n includes HARK-ACK and periodic/aperiodic channel, and is indicated so that PUSCH is transmitted via a primary cell or a secondary cell, the UE multiplexes periodic/aperiodic channel information with PUSCH and transmits it, and transmits HARQ-ACK/SR, via PUCCH, using at least one pre-set or pre-determined PUCCH format. In this case, UE needs to simultaneously perform PUCCH transmission and PUSCH transmission. If UE is in a situation limited in transmission power (power limited situation), PUCCH transmission power has priority over PUSCH. That is, when performing transmission to an eNB, UE first allocates available transmission power to PUCCH and then the remaining power to PUSCH. If UE expects the same operation from an eNB regardless of a type of channel to which UE's available transmission power is applied, additional transmission power may be allocated to PUSCH. An example that UE may expect the same operation from an eNB is the data re-transmission of an eNB for the PUCCH transmission.

If UE has failed to decode data and needs to request the re-transmission of the data, it maps NACK to HARQ-ACK and transmits it to an eNB via PUCCH. If the eNB receives NACK via a PUCCH, it re-transmits data corresponding to the NACK to the UE. UE combines the re-transmitted data with the existing transmitted data, so that it can receive data from the eNB with high reliability. In addition to the case of the reception of NACK via PUCCH, the eNB may also re-transmit data to the UE. For example, if the eNB does not receive HARQ-ACK information via PUCCH or PUSCH, it may re-transmit data to the UE. If UE transmitting NACK via PUCCH reduces the PUCCH transmission power, the eNB does not receive HARQ-ACK information in PUCCH or PUSCH and then performs the re-transmission of data. The data re-transmission performed since an eNB has not received HARQ-ACK information via PUCCH or PUSCH differs from the data re-transmission performed since an eNB has received NACK via PUCCH as follows: if the eNB has not received HARQ-ACK information via PUCCH or PUSCH, it means that the eNB ascertains that UE has not received data via (E)PDCCH. Therefore, the eNB increases an amount of resource used for the (E)PDCCH transmission, i.e., an aggregation level required for the (E)PDCCH transmission, and performs the (E)PDCCH transmission so that the UE receives data via (E)PDCCH with relatively high reliability. Therefore, UE supporting PUCCH transmission and PUSCH transmission receives the setting of simultaneous transmission of PUCCH and PUSCH from an eNB. If UE needs to simultaneously perform the PUCCH transmission and the PUSCH transmission, the present disclosure enables the UE to perform corresponding operations based on the following conditions, thereby allocating additional transmission power to PUSCH transmission and allowing an eNB to increase the reliability of PUSCH reception.

Condition 1: UE has succeeded in (E)PDCCH reception, but failed to receive data and thus needs to transmit NACK for all code words:

UE's Operations

Embodiment 1: UE sets a maximum of power for PUCCH transmission (Pcmax) to a minimum value within a range set by eNB, in a sub-frame that performs PUCCH transmission and includes NACK. PUCCH transmission power is restricted to a value less than or equal to Pcmax according to the following Equation 2. UE may allocate transmission power (of actually available maximum power-Pcmax) to PUSCH transmission in a corresponding sub-frame.

$$P_{PUCCH}(i) = \min\left\{ \begin{array}{l} P_{CMAX}, \\ P_{0\_PUCCH} + PL + h(n_{CQI}, n_{HARQ}) + \\ \Delta_{F\_PUCCH}(F) + g(i) \end{array} \right\} [dBm] \quad \text{Equation 2}$$

In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Embodiment 2: UE sets PUCCH transmission power to '0' in a sub-frame that performs PUCCH transmission and includes NACK. That is, UE does not perform PUCCH transmission. Therefore, UE may allocate transmission power for PUCCH transmission to PUSCH transmission in a corresponding sub-frame. In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Embodiment 3: UE performs an operation to reduce PUCCH transmission power in a sub-frame that performs PUCCH transmission and includes NACK. For example, UE decreases PUCCH transmission power to a value as small as possible in the sub-frame, by: applying a minimum value within a range of PO_PUCCH to the equation; applying '0,' instead of the received power control command, to the equation, in an accumulation mode when it controlling power; applying '−1,' instead of the received power control command, to the equation, in an absolute mode when it controls power; etc. Therefore, UE may allocate transmission power for PUCCH transmission to PUSCH transmission in a corresponding sub-frame. In this case, if an aggregation level of (E)PDCCH decoded by UE is a maximum value which can be set for UE (i.e., in a state where an eNB has not received HARQ-ACK information via PUCCH or PUCCH, if the eNB cannot increase a aggregation level of (E)PDCCH and cannot transmit it to UE), UE does not perform an operation for setting a maximum value Pcmax for PUCCH transmission to a minimum value in order to prevent the interference of eNB as described above; however, UE performs a normal UE operation where PUCCH transmission power has priority over PUSCH transmission power.

Condition 2: UE has succeeded in (E)PDCCH reception, and needs to transmit ACK for at least one code word (i.e., cases other than condition 1):

UE performs normal UE's operations where PUCCH transmission power has priority over PUSCH transmission power under condition 2.

When UE transmits uplink control information via PUCCH using a PUCCH format 4/5 as described above, the transmission resource of the PUCCH format 4/5 may be one of the following:
- a resource set for the transmission of periodic channel information, if periodic channel information is transmitted via sub-frame n;
- a resource instructed by (E)PDCCH for the transmission of HARQ-ACK/SR, if HARQ-ACK/SR is transmitted via sub-frame n; and
- a resource set for the transmission of periodic channel information or a resource instructed by (E)PDCCH for the transmission of HARQ-ACK/SR, if periodic channel information or HARQ-ACK/SR is transmitted via sub-frame n.

In the operations of UE described above, if UE is set by a higher signal in such a way as to perform PUCCH transmission in one secondary cell other than the PUCCH transmission of a primary cell, UE independently performs its operations for serving cells set so that a primary cell performs the transmission of PUCCH and serving cells set so that one secondary cell performs the transmission of PUCCH. That is, the UE operations described above are applied to serving cells set so that a primary cell independently performs the transmission of PUCCH, so that the UE performs its operations only within the serving cells; and the UE operations described above are applied to serving cells set so that one secondary cell independently performs the transmission of PUCCH, so that the UE performs its operations only within the serving cells.

Figure 3:
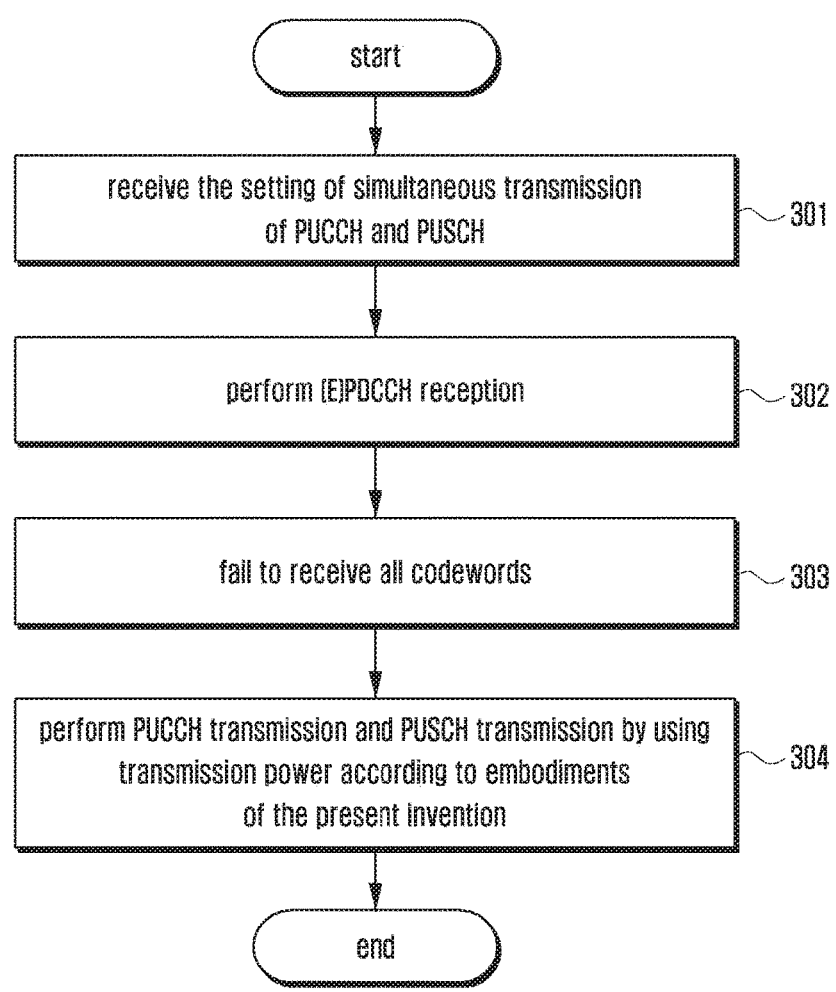
FIG. 3 is a flowchart that describes operations of user equipment (UE) according to an embodiment of the present disclosure.

FIG. 3 is a flowchart that describes operations of UE according to various embodiments of the present disclosure.

Referring to FIG. 3, if UE supporting simultaneous transmission of PUCCH and PUSCH needs to: receive the setting of simultaneous transmission of PUCCH of PUSCH from an eNB; and simultaneously perform PUCCH transmission and PUSCH transmission, the method according to the present disclosure enables the UE to perform corresponding operations based on conditions according to the present disclosure, thereby additionally allocating PUSCH transmission power and thus allowing the eNB to increase the reliability of PUSCH reception.

UE supporting simultaneous transmission of PUCCH and PUSCH receives the setting of simultaneous transmission of PUCCH of PUSCH from an eNB in operation 301. The UE receives scheduled downlink data from the eNB via (E)PDCCH in operation 302. The UE has failed to receive code words corresponding to all downlink data received from the eNB via the (E)PDCCH in operation 303. The UE determines whether it satisfied conditions 1 and 2 according to the present disclosure in operation 304. If the UE satisfies conditions 1 and 2, it performs the PUCCH transmission by using PUCCH transmission power, and the PUSCH transmission by using PUSCH transmission power, based on operations described as in embodiments 1, 2, and 3, according to the conditions 1 and 2, FIG. 4 is a block diagram showing an eNB according to various embodiments of the present disclosure.

Figure 4:
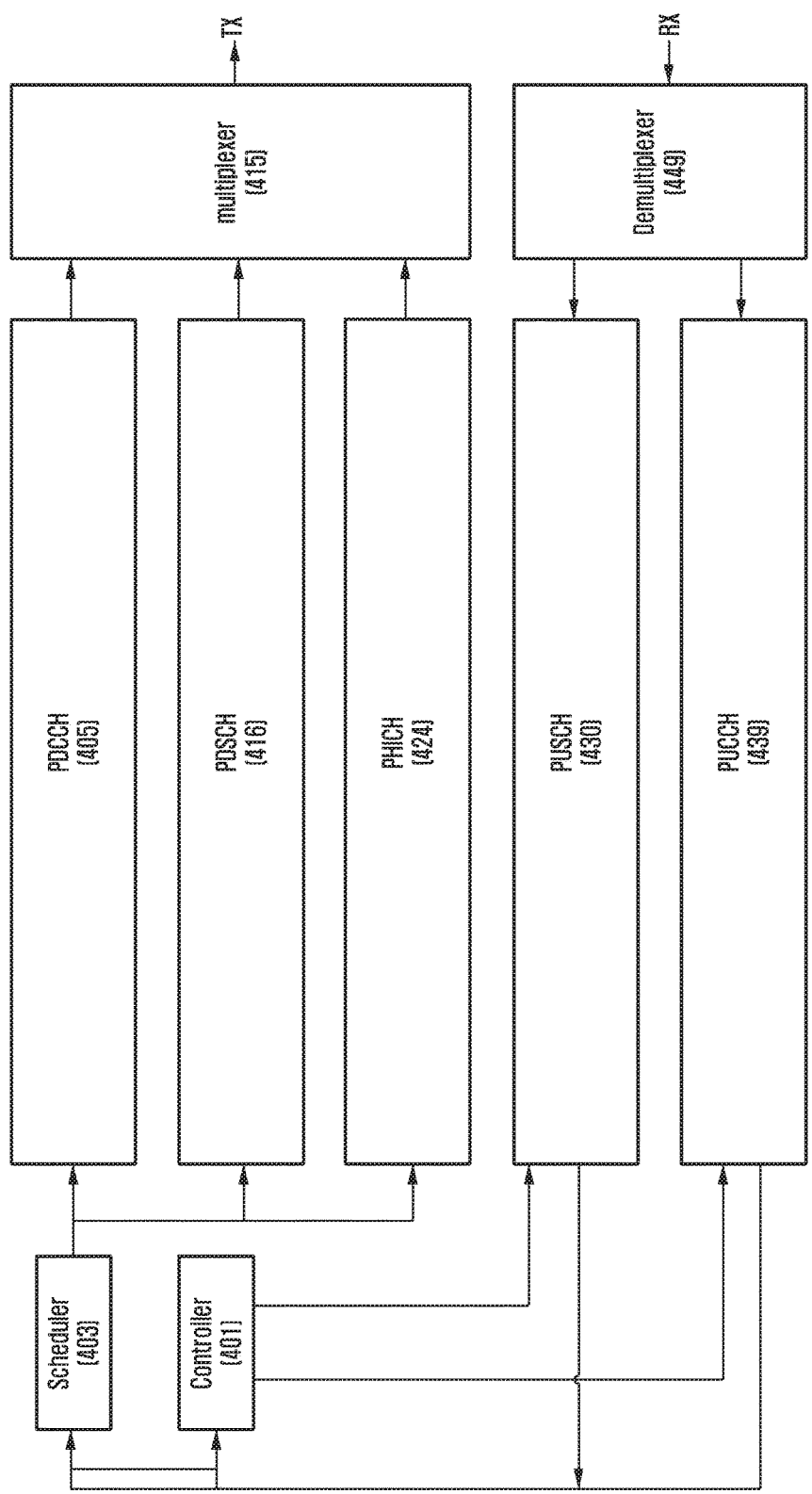
FIG. 4 is a block diagram showing an enhanced node B (eNB) according to an embodiment of the present disclosure.

Referring to FIG. 4, an eNB may be referred to as an LTE eNB or an LAA eNB. The eNB is configured to include a transmitter including a PDCCH block 405, a PDSCH block 416, a physical hybrid indicator channel (PHICH) block 424, and a multiplexer 415; a receiver including a PUSCH block 430, a PUCCH block 439, and a de-multiplexer 449; a processor or controller 401 for controlling the reception of A/N feedback and channel information; and a scheduler 403. It should be understood that each cell may include a number of transmitters and a number of receivers (except for a PUCCH block). For the sake of convenience, the embodiment is described, assuming that each cell includes one transmitter and one receiver.

The controller 401 controls the reception of A/N feedback and channel information. The controller 401 controls the timings between physical channels in order to schedule UE, considering the amount of data to be transmitted to UE, the amount of available resource in the system, etc., and provides the timings to the scheduler 403, PDCCH block 405, PDSCH block 416, PHICH block 424, PUSCH block 430, and PUCCH block 439. The reception of A/N feedback and channel information is performed based on the methods according to the embodiments of the present disclosure.

The PDCCH block 405 configures control information according to the control of the scheduler 403. The control information is multiplexed with other signals by the multiplexer 415.

The PDSCH block 416 creates data according to the control of the scheduler 403 in order to transmit corresponding higher information to the UE. The data is multiplexed with other signals by the multiplexer 415.

The PHICH block 424 creates an HARQ ACK/NACK in response to the PUSCH received from the UE, according to the control of the scheduler 403. The HARQ ACK/NACK is multiplexed with other signals by the multiplexer 415.

The multiplexed signals are converted to OFDM signals and transmitted to the UE.

The PUSCH block 430 of the receiver obtains channel information from the PUSCH of signals transmitted from UE.

The PUCCH block 430 obtains uplink ACK/NACK or CQI from signals transmitted from UE. The obtained uplink ACK/NACK or CQI is applied to the scheduler 403 and is used to determine the re-transmission of PDSCH and a MCS. The obtained uplink ACK/NACK is applied to the controller 401. The controller 401 controls the transmission timing of the PDSCH based on the uplink ACK/NACK.

Figure 5:
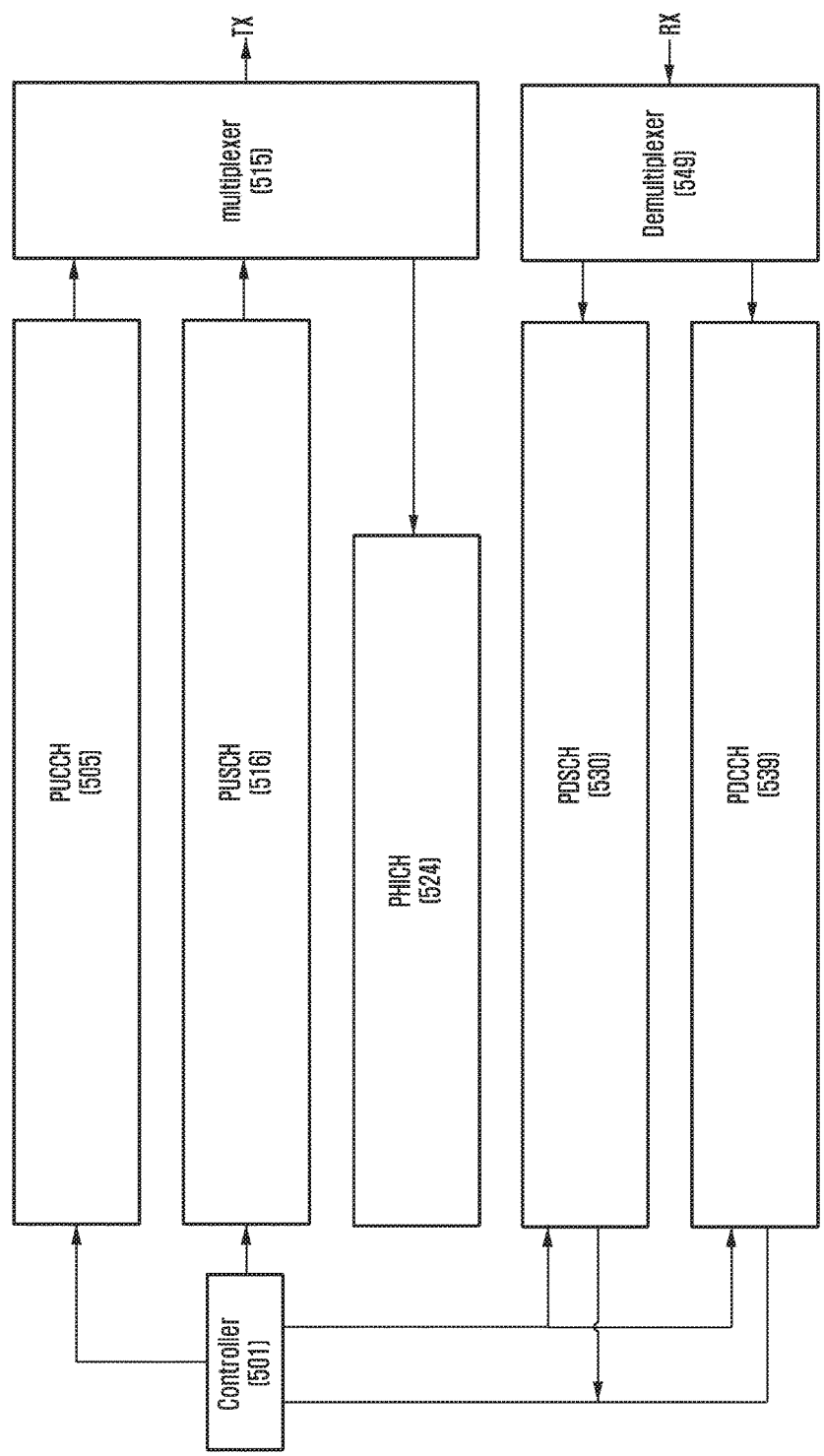
FIG. 5 is a block diagram showing UE according to an embodiment of the present disclosure.

FIG. 5 is a block diagram showing UE according to various embodiments of the present disclosure.

Referring to FIG. 5, UE includes a transmitter including a PUCCH block 505, a PUSCH block 516, and a multiplexer 515; a receiver including a PHICH block 524, a PDSCH block 530, a PDCCH block 539, and a de-multiplexer 549; and a controller 501 for controlling the transmission of A/N feedback and channel information. It should be understood that each cell may include a number of transmitters and a number of receivers. For the sake of convenience, the embodiment is described, assuming that each cell includes one transmitter and one receiver.

The controller 501 controls the transmission of A/N feedback and channel information. The controller 501 provides corresponding information to the PDSCH block 530, PDCCH block 539, PUCCH block 505, and PUSCH block 516. The transmission of A/N feedback and channel information is performed based on the methods according to the embodiments of the present disclosure.

The PUCCH block 505 configures a HARQ ACK/NACK or CQI using UCI according to the control of the controller 501 for controlling a soft buffer to store downlink data. The HARQ ACK/NACK or CQI is multiplexed with other signals by the multiplexer 515 and transmitted to an eNB.

The PUSCH block 516 outputs channel information and the channel information is multiplexed with other signals by the multiplexer 515. The multiplexed signals are created to single carrier frequency division multiple access (SC-FDMA) signals and transmitted to an eNB based on a period and an offset created according to the method of transmitting A/N feedback and channel information according to the present disclosure.

The PHICH block 524 of the receiver receives signals from the eNB, according to DL/UL HARQ-ACK transmission/reception timings. The de-multiplexer 549 separates a PHICH signal from the received signals. The receiver obtains an HARQ ACK/NACK from the PHICH signal in response to the PUSCH.

The PDSCH block 530 separates a PDSCH signal from the signals received from the eNB via the de-multiplexer 549 in order to obtain higher configuration information related to the transmission of A/N feedback and channel information; obtains PDSCH data; notifies the PUCCH block 505 of a condition as to whether error occurs in the decoded data; creates an uplink HARQ ACK/NACK; and applies the condition as to whether error occurs in the decoded data to the controller 501. The controller 501 controls the transmission timing of the uplink HARQ ACK/NACK.

The PDCCH block 539 separates a PDCCH signal from the received signals via the de-multiplexer 549; performs a decoding in a DCI format; and obtains DCI from the decoded signal.

Although certain embodiments of the disclosure are described in detail above, it should be understood that many variations and modifications of the basic inventive concept herein described, which may be apparent to those skilled in the art, will still fall within the spirit and scope of the present disclosure as defined by the appended claims and their equivalents.

Recent mobile communication systems that were providing voice-based services have evolved to wireless packet data communication systems that are capable of providing high quality and high speed data services and multimedia services. In order to support a high quality and high speed wireless packet data transmission service, various mobile communication standards have been developed, such as: high speed downlink packet access (HSDPS), high speed uplink packet access (HSUPA), LTE, LTE-A by 3GPP; high rate packet data (HRPD) by 3GPP2, 802.16 by Institute of Electrical and Electronics Engineers (IEEE), etc. In particular, the standard of LTE/LTE-A/LTE-A-Pro is evolved and developed to improve the system capacity and frequency efficiency.

Typically, LTE systems are capable of greatly increasing the data transfer rate and the system capacity according to available frequency bandwidth using CA that operates a system using a number of frequency bands. Frequency bands used by current LTE systems are licensed bands (licensed spectrum or licensed carrier) that a specified service provider can exclusively use with a unique authority. However, since frequency bands (e.g., a frequency band of less than or equal to 5 GHz) providing mobile communication services are already used by existing service providers, existing communication system, etc., a mobile communication service provider has difficulty in securing a number of licensed bands. Under the circumstances where it is difficult to secure licensed bands, in order to efficiently process the increase of mobile data, a technology has been researched to use LTE systems in an unlicensed band (unlicensed spectrum or unlicensed carrier), e.g., LTE in unlicensed (LTE-U), LAA. Unlicensed bands are used in such a way that a specified service provider or a specified system does not exclusively use a specified band but all allowable communication devices share the same frequency band with each other. Since 5 GHz band of the unlicensed bands is used by a relatively small number of communication devices, compared to 2.4 GHz unlicensed band, and can use a relatively broader bandwidth, it can easily secure an additional frequency band. If licensed band and unlicensed band frequency is secured by applying an LTE technology aggregating and using a number of frequency bands, i.e., CA, the system capacity can be easily increased. That is, by using CA, LTE cell in licensed band is set to PCell (or Pcell) and LTE cell in unlicensed band (LAA cell or LTE-U cell) is set to SCell (or Scell), so that an LTE system can be used in licensed band and unlicensed band. In this case, the system can be applied to an environment of CA where a licensed band and an unlicensed band are connected to each other via ideal backhaul and also a dual-connectivity environment where a licensed band and an unlicensed band are connected to each other via non-ideal backhaul. The present disclosure is described, assuming an environment of CA where a licensed band and an unlicensed band are connected to each other via ideal backhaul.

Embodiment 2

Figure 6:
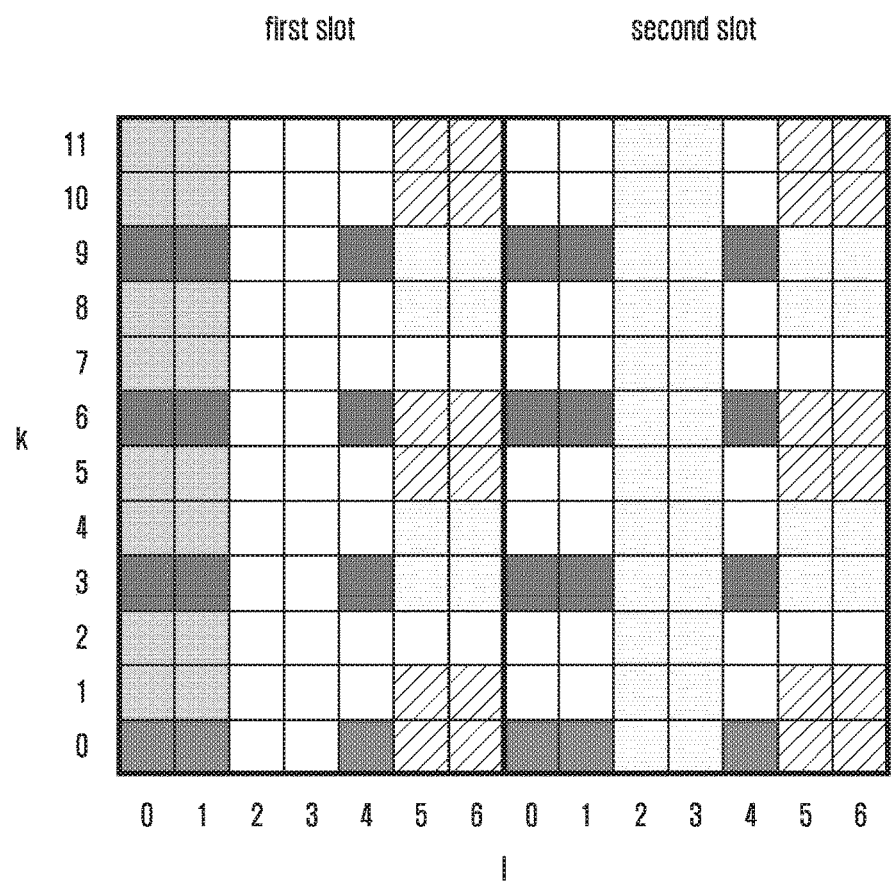
FIG. 6 is a diagram showing architecture of a wireless resource of an LTE system according to an embodiment of the present disclosure.

FIG. 6 is a diagram showing architecture of a wireless resource of an LTE system according to an embodiment of the present disclosure.

In general, LTE/LTE-A systems perform the transmission of data using an orthogonal frequency division multiple access (OFDMA) scheme. In the OFDM scheme, modulation signals are located in the two dimensional resources, i.e., time and frequency resources. The resources in the time domain are divided into different OFDM symbols which are orthogonal to each other. The resources in the frequency domain are divided into different sub-carriers which are orthogonal to each other. That is, if a specified OFDM symbol is set in the time domain and a specified sub-carrier is set in the frequency domain, the OFDM scheme may indicate a minimum unit of resource, which is called a RE. Although different REs are processed through a frequency selective channel, they have the orthogonality characteristic that they are orthogonal to each other. Therefore, a receiver may receive signals transmitted via different REs, without mutual interference. In the OFDM communication system, a downlink bandwidth may be configured with a number of RBs, and each PRB may be configured in such a way that 12 sub-carriers are arranged in the frequency axis and 6 or 7 OFDM symbols are arranged in the time axis, as shown in FIG. 2. A sub-frame (subframe) in the time axis is configured with two slots, i.e., first and second slots, each of which is 0.5 ms in length, as shown in FIG. 2. As shown in FIG. 2, the wireless resource may transmit a number of different types of signals as follows.

1. Cell specific RS (CRS): A reference signal which is periodically transmitted for all UEs in one cell and is commonly used by a number of UEs.

2. Demodulation reference signal (DMRS): A reference signal which is transmitted for a specified UE and is transmitted only when data is transmitted to the corresponding UE. DMRS is configured with 8 DMRS ports in total. In LTE/LTE-A, DMRS is configured with DMRS ports from port 7 to port 14, and individual ports maintain the orthogonality so as not to cause interference to each other, using CDM or FDM.

3. PDSCH: A downlink data channel that an eNB uses to transmit traffic to UE, using REs that do not transmit a reference signal in a data region as shown in FIG. 2.

4. Channel status information reference signal (CSI-RS): A reference signal which is transmitted for UEs in one cell and is used to measure the channel quality. A number of CSI-RSs may be transmitted to one cell. In an LTE-A system, one CSI-RS corresponds to one antenna port or two, four or eight antenna ports.

5. PHICH, PCFICH, and PDCCH: Control channels that provide control information required when UE receives PDSCH or are used to transmit ACK/NACK for operating HARQ in response to the transmission of uplink data.

A Physical dedicated control channel (PDCCH) region, as a control channel region, and an enhanced PDCCH (ePDCCH) region, as a data channel region, are split and transmitted in the time axis. This allows the system to rapidly receive and demodulate control channel signals. In addition, in a state where the PDCCH region is located over the overall downlink bandwidth, one control channel is split into control channels as a small unit and spread and located over the overall downlink bandwidth. Uplink is divided into control channel (PUCCH) and a data channel (PUSCH). A response in response to a downlink data channel and other feedback is: if there is no data channel, transmitted via a control channel; and if there is a data channel, transmitted via the data channel.

In general, the unlicensed bands allow a number of devices to share and use the same frequency band or channel with each other. In this case, the devices using unlicensed bands may be systems that differ from each other. For the coexistence between various devices, the devices operating in unlicensed bands perform the following operations.

When a transmission device needs to perform the transmission of signals including data, control signals, etc., it determines, before performing the transmission of signals, whether other devices occupies a channel or unlicensed band transmitting the signals. The transmission device may or may not occupy the channel according to the channel occupancy state by the other devices. This operation is generally called a listen-before-talk (LBT). That is, the transmission device needs to determine whether it can occupy the channel based on a pre-defined or pre-set method. In this case, the detection of the channel may be pre-defined or preset. Time detecting the channel may be pre-defined or pre-set or may be set to a value in a specified range. Time detecting channel may be set in proportion to a preset maximum channel occupancy time. In this case, the channel detection that the device performs to determine whether it can occupy the channel may be set in different ways according to unlicensed frequency bands performing the operations, local areas, or rules by countries. For example, in the USA, an unlicensed band may be used without performing the channel detection, except for the radar detection in the 5 GHz frequency band.

A transmission device that needs to use an unlicensed band detects whether a corresponding is used by other devices via the channel detection (or LBT). If the transmission device ascertains that a corresponding is not occupied by other devices, it may occupy and use the channel. In this case, after the channel detection, devices using an unlicensed band may pre-define or pre-set a maximum channel occupancy time that they can continue to occupy and may operate during the time. In this case, the maximum channel occupancy time may be pre-defined, based on rules defined according to frequency bands, local areas, countries, etc. Alternatively, if other devices are, for example, UE, the maximum channel occupancy time may be set by an eNB. In this case, the channel occupancy time may be set in different ways according to unlicensed bands, local areas, or rules by countries. For example, in Japan, the maximum occupancy time in an unlicensed band of a 5 GHz band is restricted to 4 ms. In contrast, in Europe, the channel may be continuously shared and used by the device for a period of time of up to 10 ms or 13 ms. In this case, the devices occupying a channel re-perform the detection of the channel during the maximum occupancy time, and then re-occupy the channel based on the channel detection result.

Figure 7:
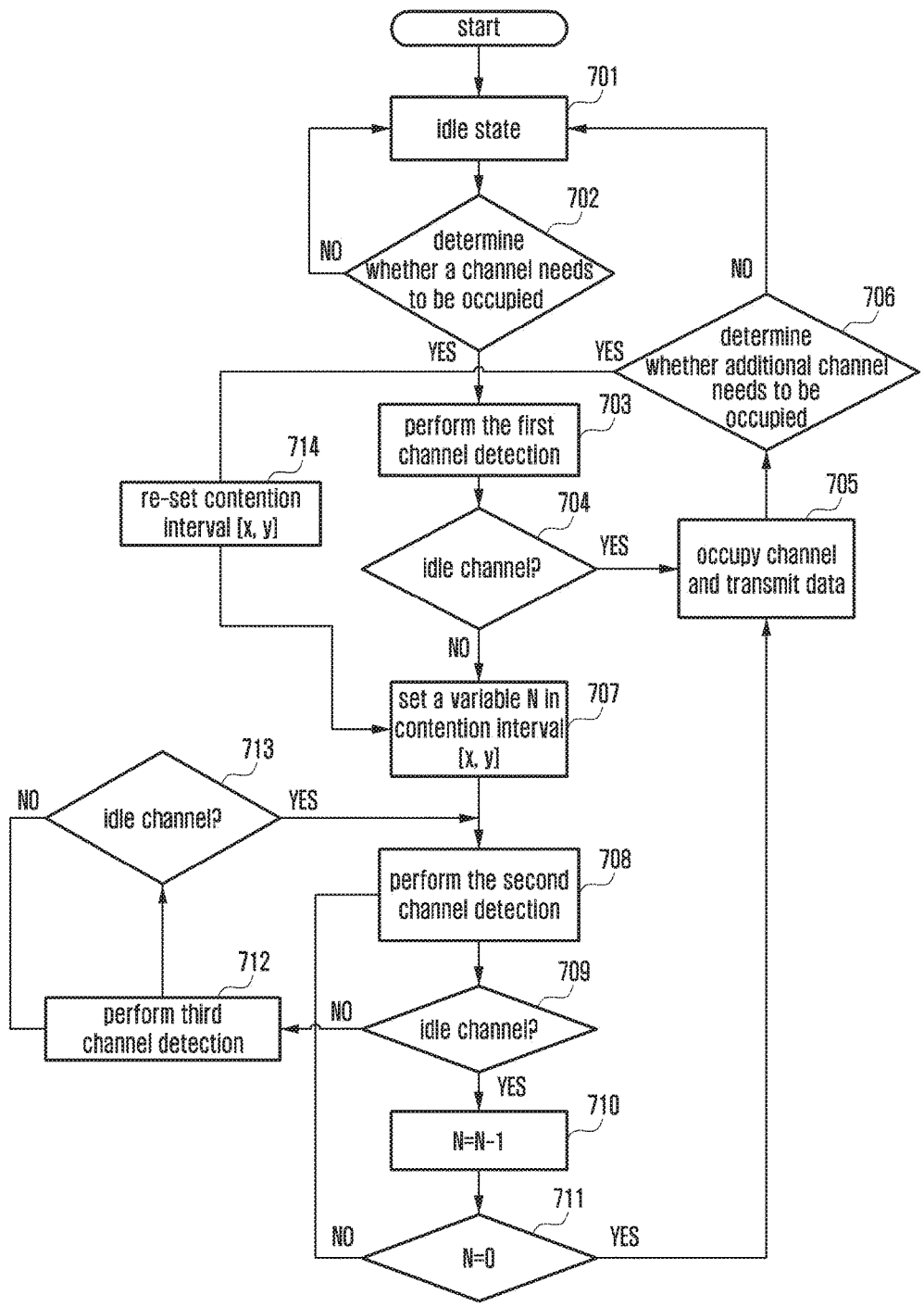
FIG. 7 is a flowchart that describes a method for a licensed assisted access (LAA) system to access an unlicensed band according to an embodiment of the present disclosure.

FIG. 7 is a flowchart that describes a method for an LAA system to access an unlicensed band according to an embodiment of the present disclosure.

Referring to FIG. 7, a method for an LAA system to occupy a channel to use an unlicensed band is described. An LAA cell (or LAA SCell, LAA Cell, LAA eNB) that does not need to perform the transmission of data maintains an idle state in operation 701. The idle state is referred to as a state where the LAA cell does not transmit data signals via an unlicensed band.

If the LAA cell in an idle state needs to occupy a channel to transmit data or a control signal to UE in operation 702, it is capable of performing the first channel detection in operation 703. In this case, the first channel detection may be set in various ways, based on at least one of the following conditions: a preset time (e.g., 34 μs), a time set by another device, and a type of control signal or data that the LAA cell needs to transmit. When the LAA cell transmits only a control signal, without transmitting a data signal, to a specified UE, a running time of the first channel detection may be set to differ from that of the first channel detection when the LAA cell transmit data to the UE. For example, a running time of the first channel detection when the LAA cell transmits only a control signal to a specified UE may be less than that of the first channel detection when the LAA cell transmits a data signal to the UE. In this case, the values that can be set for the first channel detection may be pre-defined. In addition to the running time of the first channel detection, one or more of the other factors (e.g., a received signal intensity threshold used to determine whether a channel is detected) may be set so that a first channel detection when the LAA cell transmits only a control signal to a specified UE and a first channel detection when the LAA cell transmits a data signal to the UE differ from each other. In this case, the first channel detection may be performed in a fixed interval without requiring an additional configuration of a contention interval.

Alternatively, the LAA cell may set a contention interval used in the second channel detection to an initial value and may then operate. In this case, the first channel detection includes a process of detecting whether other devices occupy a corresponding channel, using various methods including at least one of the following: the measurement of the intensity of a received signal, the detection of a pre-defined signal, etc., during a preset period of time for the first channel detection.

If the channel is in an idle state in operation 704, the LAA cell occupies the channel and transmits a signal via the channel in operation 705. If the channel is occupied by other devices in operation 704, the LAA cell selects a variable N in a set contention interval [x, y] and performs the channel detection in operation 707. In this case, the initial contention interval [x, y] may be pre-defined or may be set by an eNB. Alternatively, the contention interval may be altered or set, using various values, for example: the number of attempts to occupy the channel, the channel occupancy rate (e.g., traffic load), a reception result of data signals that UE has received during the channel occupancy (e.g., ACK/NACK), etc.

If the LAA cell needs to additionally occupy the channel, which has been occupied in operation 705, in operation 706, it is capable of altering or setting a contention interval, using the result of the data transmission performed as in operation 705 or the result of data reception performed before operation 705, in operation 714. It should be understood that a method of setting a contention interval using a data transmission result as in operation 705 is an example. That is, the contention interval may also be set, based on a pre-set value, the previous channel occupancy, and the previous data transmission. For example, if the LAA cell transmits data to UE in a channel occupancy interval and receives an NACK, as the reception result in response to the data transmission, from the UE, it may increase or maintain the contention interval.

If the LAA cell, occupying the channel using the increased or maintained contention interval, transmits data to the UE in the channel occupancy interval, and receives an ACK, as the reception result in response to the data transmission, from the UE, it may increase or maintain the contention interval or may set the contention interval to the initial contention interval. It should be understood that a method of setting a contention interval using an ACK/NACK is an example. That is, the contention interval may also be set, based on other criterions.

If a variable N is set in the initial contention interval as in operation 707 or in the set contention interval as in operation 714, a second channel detection is performed using the set N in operation 708. In this case, the second channel detection is a process of detecting an occupancy state of a channel, including at least one of the following: the measurement of the intensity of a received signal, the detection of a pre-defined signal, etc., during a preset period of time. The second channel detection may use a method that differs from that of the first channel detection. That is, a reference time of the second channel detection may be set to be less than or equal to the time of the first channel detection. For example, the time of the first channel detection may be set to 34 μs and the time of the second channel detection may be set to 9 μs. In addition, thresholds for the second channel detection and the first channel detection may be set to differ from each other.

If the channel detected as in operation 708 is an idle channel in operation 709, the variable N, set as in operation 707, is decreased by '1' in operation 710. It should be understood that the decrement of the variable N by '1' is an example. For example, the variable N may also be decreased by a set value or by any other value according to a characteristic or type of a signal that the LAA cell needs to transmit.

If the variable N is '0' in operation 711, the LAA cell starts to occupy a channel and transmits a control signal or a data signal in operation 705. If the variable N is not '0' in operation 711, the LAA cell returns to operation 708 and performs the second channel detection. After performing the second channel detection in operation 708, if the channel is not an idle channel in operation 709, the LAA cell performs a third channel detection in operation 712.

The third channel detection may be set to be identical to the first channel detection and/or the second channel detection. Alternatively, the third channel detection may be set to differ from the first channel detection and the second channel detection. For example, the reference times for the first channel detection and third channel detection may be set to be the same, e.g., 34 μs. In this case, the reference thresholds for the first channel detection and the third channel detection may set to differ from each other. It should be understood that the reference time and the reference threshold for the channel detections are examples. It should also be understood that reference thresholds or variables required for the third channel detection may be set to: be identical to those for the first channel detection; or differ from one or more of those for the first channel detection.

The third channel detection may be set to perform an operation which causes a time delay, without additionally requiring the channel detection or the channel occupancy operation. The LAA cell determines whether the other devices occupy the channel, using a reference value set for the third channel detection, in operation 713. If the channel occupancy state is an idle state in operation 713, the LAA cell returns to operation 708 and performs the second channel detection. If the channel occupancy state is not an idle state in operation 713, the LAA cell performs the third channel detection in operation 712. In this case, the LAA cell may omit one or more of the first channel detection, second channel detection, and third channel detection, according to a characteristic or type of control signal or data which needs to be transmitted. For example, if the LAA cell needs to transmit only a control signal, e.g., a discovery reference signal (DRS), it performs only the first channel detection, occupies a channel according to the channel detection result, and transmits the DRS signal. It should be understood that the DRS is an example to omit one or more of the first channel detection, second channel detection, and third channel detection. It should be understood that the DRS may also be used for the transmission of other control signals.

The contention interval, applied to the second channel detection, may be altered or re-set in operation 714. In this case, the contention interval may be set, using at least one of the following: the number of attempts to occupy the channel, the channel occupancy rate (e.g., traffic load), and a reception result of data signals that an eNB or UE has received via unlicensed band during the channel occupancy (e.g., ACK/NACK). It should be understood that the method of altering or re-setting the contention interval is an example. For example, the contention interval may also be altered or re-set via various methods.

Figure 8:
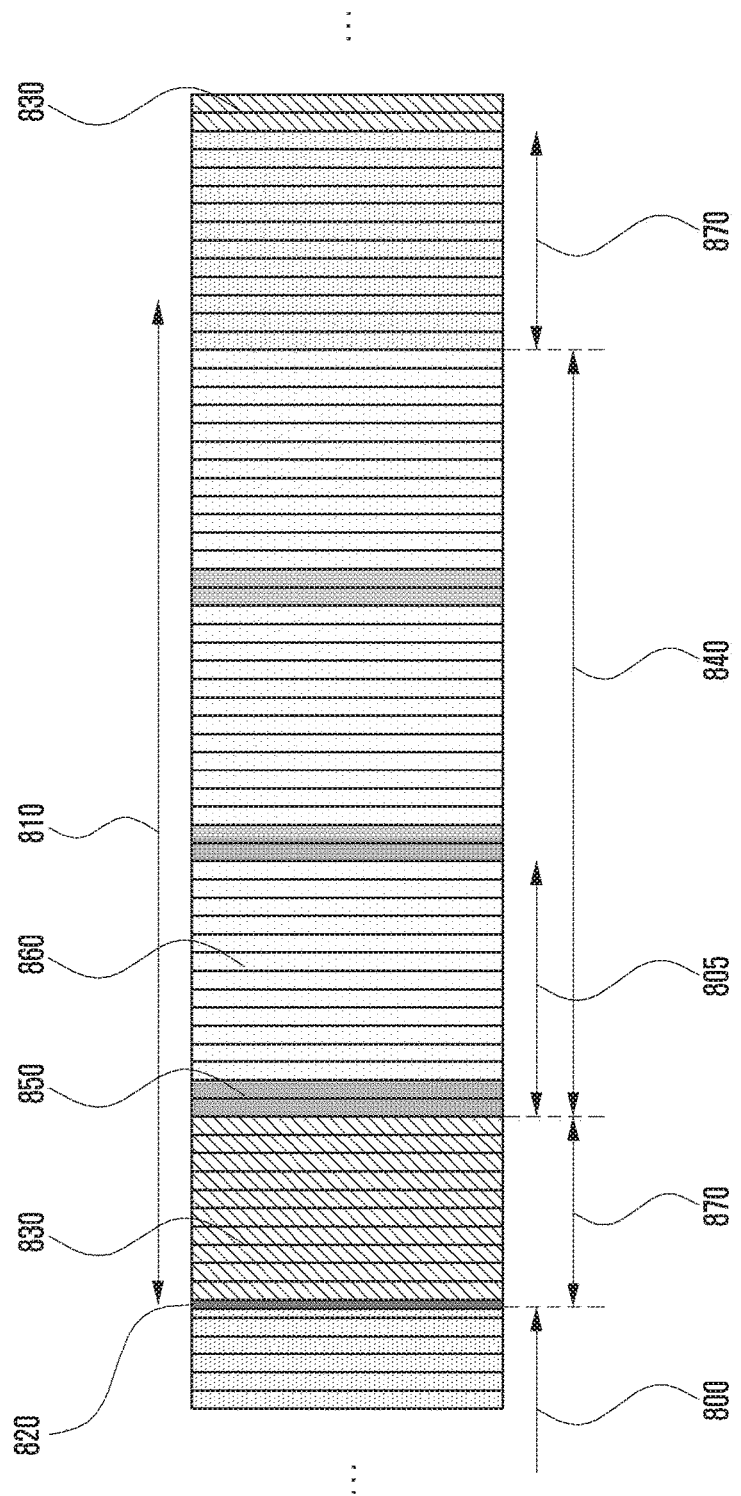
FIG. 8 is a diagram showing a frame structure of an unlicensed band of an LAA system according to an embodiment of the present disclosure.

FIG. 8 is a diagram showing a frame structure of an unlicensed band of an LAA system according to an embodiment of the present disclosure.

Referring to FIG. 8, the channel detection and the channel occupancy operation in an unlicensed band are described as follows. FIG. 8 is a diagram that describes the procedure of the downlink transmission where a transmission node (e.g., LAA cell) transmits data or control signals to a reception node (e.g., LAA UE). It should be understood that the procedure of the downlink transmission may be applied to that of the uplink transmission where the LAA UE transmits signals to the LAA cell.

As shown in FIG. 8, the LTE sub-frame (subframe) 805 has a length of 1 ms, and may be configured with a number of OFDM symbols (e.g., 14 for a normal CP). In a state where a transmission node (hereafter called an LAA cell or an eNB) and a reception node (hereafter called an LAA UE or UE) perform communication using an unlicensed band, the transmission node performs the channel detection and the channel detection. If a corresponding unlicensed band is in an idle state based on the result of the channel detection, the node occupies the channel and performs communication using the unlicensed band during a pre-defined or pre-set maximum channel occupancy time (or TXOP). In this case, the LAA cell may occupy the channel for a period of time less than the maximum channel occupancy time. If the corresponding unlicensed band is occupied by other devices based on the result of the channel detection, the node continues to perform the channel detection. If the LAA cell, occupying the channel during the set channel occupancy time, needs to occupy an additional channel, it re-performs the channel detection. After that, the LAA cell may re-occupy the channel or may not use the channel, based on the result of the channel detection. To this end, the interval (or length) of the channel detection may be set to differ from that of the previous channel detection, based on the result that data is transmitted/received via the unlicensed band. In addition, one or more of the variables applied to the re-performed channel detection may be set to differ from those of the previous channel detection.

The channel detection and the channel occupancy operation may set in different ways according to frequency bands, local areas, or rules defined by countries. In the following description, the channel detection and the channel occupancy operation are described in detail, based on load-based equipment which is a channel access method from among the regulatory rule EN301 893 related to 5 GHz band in Europe.

If the LAA cell needs to occupy an unlicensed band channel, it needs to determine whether the channel is occupied by other devices during a minimum channel detection interval. In this case, the minimum channel detection interval may be determined by the following methods according to a maximum channel occupancy interval.

Maximum channel occupancy interval: 13/32×q, (q=4, . . . , 32)

Minimum channel detection interval: extended clear channel assessment (ECCA) slot length×rand (1, q)

The ECCA slot length is a minimum unit (or length) of a pre-defined or pre-set channel detection interval, e.g., 9 μs. That is, if q=32, a transmission device may occupy an unlicensed band for a maximum of 13 ms. In this case, a minimum channel detection interval may be a value (random) selected from 1~q (i.e., 1~32), and a total of channel detection intervals is an ECCA slot length×the selected value. Therefore, if a maximum channel occupancy interval increases, a minimum channel detection interval also increases. It should be understood that the method of setting a maximum channel occupancy interval and a minimum channel detection interval is an example. That is, the method of setting a maximum channel occupancy interval and a minimum channel detection interval may also be implemented in various modes according to frequency bands, local areas, and rules defined by countries, including future frequency regulatory rules. In addition to the channel detection according to the frequency regulatory rules, the method may also be set to include additional operations (e.g., employing an addition channel detection interval), etc. In this case, the detailed settings related to the channel detection may vary according to the change of rules, related to frequency bands or local areas, or the settings of an LAA cell.

If an eNB does not detect other devices using a corresponding unlicensed band in a channel detection interval 800, or if the channel is in an idle state, the eNB occupies and uses the channel. In this case, a condition as to whether a channel is occupied by other devices in a channel detection interval 800 may be determined using a pre-defined or pre-set reference value. For example, if the size of signals received from other devices during the channel detection interval is greater than a reference value (e.g., −62 dBm), the eNB ascertains that the channel has been occupied by other devices. If the size of signals received from other devices is less than a reference value, the eNB ascertains that the channel is in an idle state. The method of determining whether the channel is occupied may also include the detection of a pre-defined signal (e.g., initial signal), etc., in addition to the size of a received signal.

As shown in FIG. 8, the LAA cell is capable of occupying the unlicensed band from an OFDM symbol in a sub-frame after the ending timing of the channel detection. However, in LTE, operations are generally performed based on a unit of sub-frame (e.g., the transmission and reception of signals are performed from the first OFDM symbol of a sub-frame). Therefore, signals transmitted from and after an OFDM symbol may not be transmitted or received. The eNB, detecting an idle channel via the channel detection 800 at a timing in a sub-frame, is capable of one or more of the specified signals 820 and 830 for the channel occupancy from the ending timing of the channel detection interval 800 to the first OFDM symbol transmission of the next sub-frame 805, i.e., during an interval 870. That is, before a first signal (e.g., at least one of the following signals 850 and 860: existing (E)PDCCH and PDSCH, modified (E)PDCCH and PDSCH, control signals (CRS, DMRS, CSI-RS), and control channels (PCFICH, PHICH)) is transmitted via a sub-frame 805, the eNB is capable of transmitting a second signal 830, e.g., at least one of the following signals: PSS/SSS/CRS, newly defined signals, etc., for the synchronization with UE and the channel occupancy for a corresponding unlicensed band. In this case, at least one of the second signals to be transmitted may not be transmitted according to the ending timing of the channel detection interval. If the start timing of the occupancy of corresponding channel is set within or after a specified OFDM symbol, a third signal 820, e.g., a signal newly defined in a preamble form, is transmitted by the start timing of the next OFDM symbol and then the second signal 830 is transmitted. Although the embodiment of the present disclosure describes, for the sake of convenience, the channel detection interval based on a unit of OFDM symbol, it should be understood that the channel detection interval may be set, regardless of OFDM symbols of the LTE system.

In the embodiment, the second signal may be created by re-using PSS/SSS used by current LTE systems. The second signal may be created by using at least one of the following: PSS and SSS, using a sequence that differs from the root sequence used by a current licensed band. The second signal may be created by using another sequence except for a PSS/SSS sequence required to create an unlicensed band eNB unique value, or Physical Cell ID (PCID), so that it is not confused with the eNB unique value. The second signal may include at least one of the following: CRS and CSI-RS used by current LTE systems. (E)PDCCH or PDSCH, or a signal modified from the signal may be used as the second signal.

If the LAA cell starts to occupy a channel based on the channel detection and transmits the second signal until the next sub-frame, the interval 840, in which the LAA cell actually occupies an unlicensed band and transmits data or control signals, may be less than the maximum channel occupancy interval 810. That is, since current LTE systems perform the transmission and reception of signals from the first OFDM symbol of the sub-frame or until the last OFDM symbol of the sub-frame, they cannot efficiently use the unlicensed band. Therefore, a method is needed which is capable of performing the transmission and reception of signals in an OFDM symbol of a sub-frame and until an OFDM symbol of a sub-frame. If signals are transmitted or received in all OFDM symbols of a sub-frame, UE, receiving the data or control signal/channel, needs to perform the reception operation for all possible cases/outcomes. This causes UE to increase power consumption when receiving data or control signal/channel and the degree of complexity. Therefore, the present disclosure provides a method for an LAA cell to transmit, to LAA UE, data or control signal/channel from a pre-defined or pre-set one of the OFDM symbols in a sub-frame and until a pre-defined or pre-set one of the OFDM symbols in a sub-frame. Since the method according to the present disclosure transmits and receives data or control signal/channel in a limited OFDM symbol, it can minimize the degree of complexity in UE and thus maximize the frequency efficiency.

Although embodiments of the present disclosure are described, for the sake of convenience, based on a carrier aggregation (CA) environment, it should be understood that the present disclosure is not limited thereto. It should be understood that the present disclosure may also be applied to a stand-alone environment operating in dual-connectivity or unlicensed band.

Hereinafter, embodiments of the disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the disclosure. The following terms are defined considering functions of the disclosure, and may be changed by users or operators according to their needs. Therefore, the terms will be defined throughout the content of this description.

In the following description, embodiments of the present disclosure will be described based on LTE system and LTE-A system; however, it will be appreciated to those skilled in the art that the present disclosure can also be applied to various types of communication systems using a licensed band and an unlicensed band. Embodiments of the present disclosure will be described assuming that a cell transmitting data using an unlicensed band is an SCell; however, it should be understood that the cell operating in an unlicensed band may be set to a PCell or a PSCell. The term an 'eNB' or a 'cell' performing communication using an unlicensed band is expressed as an LAA SCell, an LAA Cell, an LAA eNB, or a base station; and the term 'UE' performing communication using an unlicensed band is expressed as LAA UE, LAA UE, or a terminal. If part of the OFDM symbols in a sub-frame (subframe), used for general LTE communication, is used to transmit a control signal or channel or a data channel signal, this is called a partial sub-frame (subframe). For example, from among the 14 OFDM symbols (0, 1, 2, . . . , 13 OFDM symbols) forming a sub-frame of 1 ms, a sub-frame transmitting a control signal or channel, or a data channel signal using 0~k1 OFDM symbols (k1<13) or a sub-frame transmitting a control signal or channel, or a data channel signal using k~13 OFDM symbols (k1>0) is expressed as a partial sub-frame (subframe). Although embodiments of the present disclosure are described, for the sake of convenience, based on a CA environment, it should be understood that the present disclosure is not limited thereto. It should be understood that the present disclosure may also be applied to a stand-alone environment operating in dual-connectivity or unlicensed band. Embodiments of the present disclosure will be described, for the sake of convenience, assuming that an LAA cell transmits a downlink control signal or channel or downlink data to LAA UE via an unlicensed band; however, it should be understood that the present disclosure may also be implemented in such a way that LAA UE transmits an uplink control signal or channel or uplink data to an LAA cell via an unlicensed band.

In LTE systems, UE is capable of performing the transmission of uplink data according to an eNB's setting or instruction. For example, UE performs the transmission of uplink data channel (called a Physical Uplink Shared Channel (PUSCH)) in such a way that an eNB instructs a specified UE to perform the uplink transmission via a downlink control channel (hereafter called a Physical Downlink Control Channel (PDCCH)) and the UE transmits the configured PUSCH to the eNB using a pre-defined timing set with the eNB. In an FDD system, if an eNB instructs to UE to perform the PUSCH transmission via PDCCH in sub-frame n, the UE performs the PUSCH transmission using a resource set by the eNB, in sub-frame n+4. In a TDD system, UE is capable of performing the PUSCH transmission to an eNB, using a PDCCH reception timing and a PUSCH transmission timing, pre-defined between an eNB and the UE.

Similarly, in LTE systems, UE is capable of transmitting, to an eNB, uplink control information (UCI) including its type and an eNB/UE setting, according to an eNB's setting or instructions, using one or more of the uplink control channels PUCCH or a PUSCH, based on one or more criteria. The UCI may be configured with one or more of the following: HARQ-ACK, periodic CSI, aperiodic CSI, and a scheduling request. For example, UE is capable of periodically reporting CSI to an eNB, via a PUCCH, at each cycle that an eNB set with a higher signal. If an eNB instructed UE to aperiodically report CSI via a PDCCH, the UE is capable of reporting CSI to the eNB, via a PUSCH set by the PDCCH.

The present disclosure relates to an eNB and UE that are capable of transmitting/receiving signals to/from one or more cells operating in a licensed band or un unlicensed band. The present disclosure also relates to: an eNB and UE that are capable of transmitting/receiving signals to/from one or more cells via a licensed band; an eNB capable of transmitting signals to one or more cells via an unlicensed band; and UE capable of receiving signals to/from one or more cells via an unlicensed band. In the present disclosure, it is assumed that UE is set to transmit/receive signals to/from one or more cells to/from an eNB, unless expressly stated otherwise. It is also assumed that the set cells include a cell operating in one or more licensed bands and a cell operating in one or more unlicensed bands. It should be understood that the present disclosure may also be applied to an eNB and UE operating in an unlicensed band without a separate licensed band.

In the present disclosure, it is assumed that a cell or an eNB and UE, operating in a licensed band, are set and operate in at least one of the following duplex modes: FDD (or frame structure type 1) and or TDD (frame structure type 2). It is also assumed that a cell or an eNB and UE, operating in an unlicensed band, are set and operate in frame structure type 3. The frame structure type 3 includes a frame structure required for the channel detection; is set by all sub-frames to downlink or uplink; and allows for the change in downlink and uplink intervals within a range permitted by the specification or regulatory rule, according to an eNB's settings.

If UE is set, to transmit/receive signals to/from one or more cells operating in a licensed band and not perform simultaneous transmission of PUCCH and PUSCH, a cell transmitting UCI may vary, according to one or more of the following conditions: a condition as to whether PUSCH is transmitted at a UCI transmission timing (or sub-frame n), a type of PUSCH transmission cell, a cell index of a PUSCH transmission cell, and UCI transmitted via sub-frame n (e.g., HARQ-ACK, periodic CSI (P-CSI), aperiodic CSI (A-CSI), a scheduling request (SR), etc.). For example, if the set PUSCH transmission is not performed at a UCI transmission timing, the UCI (e.g., HARQ-ACK, periodic CSI, SR) is transmitted via a PUCCH of a PCell. Since it is assumed that aperiodic CSI is transmitted via a PUSCH, the aperiodic CSI is not transmitted via PUCCH.

In this case, UE set to perform PUCCH transmission from one or more cells (e.g., UE set to perform PUCCH transmission in two different cells, PCell PUCCH and PUCCH-SCell) is capable of distinguishing PUCCH transmission groups from each other, based on a PUCCH transmission cell. In this case, one cell may be set to a PUCCH transmission cell in a PUCCH transmission group. For example, if it is assumed that four cells, such as PCell, SCell1, SCell2, and SCell3, are set to UE and two PUCCH transmissions are also set, the PCell and SCell1, transmitting PUCCH, are set to one PUCCH group; and the SCell2 and SCell3 are set to another PUCCH group (secondary PUCCH group). In the case of the PUCCH group including a PCell, PUCCH is transmitted from the PCell. In the case of the PUCCH group without a PCell, a specified cell may be set to a PUCCH transmission cell (PUCCH-SCell) according to an eNB's settings. For example, UCI for PCell and SCell1 is transmitted via PUCCH of PCell and UCI for SCell2 and SCell3 is transmitted via PUCCH of SCell2 set to PUCCH-SCell. Although embodiments of the present disclosure are described, for the sake of convenience, assuming that one cell (PCell) sets PUCCH transmission, it should be understood that the present disclosure may also applied to a case where one or more cells set PUCCH transmission. For example, if a number of PUCCH transmission cells are set, the present disclosure may be applied to each of the PUCCH cell groups.

In a state where UE is set, to transmit/receive signals to/from one or more cells operating in a licensed band and not perform simultaneous transmission of PUCCH and PUSCH, if UCI transmitted via sub-frame n contains aperiodic CSI or aperiodic CSI and HARQ-ACK information, the UCI is transmitted via PUSCH set via PDCCH from an eNB. In this case, the eNB requests a CSI report via PDCCH and sets a PUSCH resource through which UE transmits the CSI report. If PUSCH for data transmission has been set when UE attempts to transmit UCI, the UCI is included in a PUSCH for data transmission (embedded or multiplexed) and then transmitted along therewith. In this case, the PUSCH for a CSI request and the PUSCH for data transmission may be set via one PDCCH or via separate PDCCHs respectively.

In a state where UE is set, to transmit/receive signals to/from one or more cells operating in a licensed band and not perform simultaneous transmission of PUCCH and PUSCH, if UCI transmitted via sub-frame n contains one of the following: periodic CSI, HARQ-ACK, periodic CSI and HARQ-ACK information, and the PUSCH transmission from PCell is set at UCI transmission timing, the UCI may be included in a PUSCH transmission from PCell and transmitted along therewith. In this case, if the PUSCH transmission from PCell is information transmitted in the initial cell access, the UCI may not be transmitted.

In a state where UE is set, to transmit/receive signals to/from one or more cells operating in a licensed band and not perform simultaneous transmission of PUCCH and PUSCH, if UCI transmitted via sub-frame n contains one of the following: periodic CSI, HARQ-ACK, periodic CSI and HARQ-ACK information, and if the PUSCH transmission from PCell is not set at a UCI transmission timing but PUSCH is set in one or more SCells, the UCI may be included in a PUSCH transmission of an SCell with the smallest SCellIndex among the SCells where the PUSCH transmission is set, and then transmitted along therewith.

In a state where UE is set, to transmit/receive signals to/from one or more cells operating in a licensed band and perform simultaneous transmission of PUCCH and PUSCH, if UCI transmitted via sub-frame n contains HARQ-ACK and/or SR, the UCI may be transmitted using at least one of the PUCCH format 1/1a/1b/3, according to the settings of eNB and UCI. Details regarding the PUCCH formats refer to TS36.211, TS36.212, and TS36.213 defined in the 3GPP specification. In a state where UE is set, to receive services from one or more cells and perform simultaneous transmission of PUCCH and PUSCH, if UCI transmitted via subframe n contains at least one of the following: HARQ-ACK and/or SR and/or periodic CSI, the UCI may be transmitted using at least one of the PUCCH format 4/5 according to the settings of eNB and UCI. In a state where UE is set, to receive services from one or more cells and perform simultaneous transmission of PUCCH and PUSCH, if UCI transmitted via sub-frame n contains periodic CSI for one serving cell, the UCI may be transmitted in PUCCH format 2. In a state where UE is set, to receive services from one or more cells and perform simultaneous transmission of PUCCH and PUSCH, if UCI transmitted via sub-frame n is configured to contain periodic CSI and HARQ-ACK and is set not to perform PUSCH transmission from another cell, the UCI may be transmitted using at least one of the PUCCH format 2a/2b/3/4/5 according to the UCI.

In a state where UE is set, to transmit/receive signals to/from one or more cells operating in a licensed band and perform simultaneous transmission of PUCCH and PUSCH, if UCI transmitted via sub-frame n is configured to contain periodic CSI and HARQ-ACK, and PUSCH transmission from PCell is set in sub-frame n, the HARQ-ACK of the UCI is transmitted using at least one of the PUCCH format 1a/1b/3 according to the UCI and the periodic CSI is transmitted via PUSCH of PCell. In a state where UE is set, to receive services from one or more cells and perform simultaneous transmission of PUCCH and PUSCH, if UCI transmitted via sub-frame n is configured to contain periodic CSI and HARQ-ACK and if PUSCH transmission from PCell is not set in sub-frame n but PUSCH transmission is set in one or more SCell, the HARQ-ACK of the UCI is transmitted using at least one of the PUCCH format 1a/1b/3 according to the UCI and the periodic CSI is transmitted via a PUSCH of an SCell with the smallest SCellIndex among the SCells that set to perform PUSCH transmission in sub-frame n.

In a state where UE is set, to transmit/receive signals to/from one or more cells operating in a licensed band and perform simultaneous transmission of PUCCH and PUSCH, if UCI transmitted via sub-frame n is configured to include: aperiodic CSI and HARQ-ACK or aperiodic CSI and HARQ-ACK and SR or aperiodic CSI and SR, the HARQ-ACK or HARQ-ACK and SR or SR are transmitted using at least one of the PUCCH format 1/1a/1b/3 according to the UCI, and the aperiodic CSI is transmitted via PUSCH set to perform the transmission.

In a state where an eNB and UE are set, to transmit/receive signals to/from one or more cells operating in a licensed band or an unlicensed band, if the UE is set to receive unlink signals from an eNB in an unlicensed band, the UE performs the channel detection (LBT) for an unlicensed band that has been set before the uplink signal transmission is set, and determines whether it can perform the uplink signal transmission. After that, the UE may or may not perform the uplink signal transmission based on the determination result. Alternatively, the UE may perform the uplink signal transmission without performing the channel detection (LBT) for an unlicensed band that has been set before the uplink signal transmission is set. For example, if UE is set by an eNB so that the uplink signal transmission via an unlicensed band in sub-frame n+K (e.g., K=4) is performed via a PDCCH of a licensed band or an unlicensed band in sub-frame n, the UE may perform the channel detection for an unlicensed band where the uplink transmission has been set before the UE starts the uplink signal transmission in at least sub-frame n+K. In this case, UE may determine whether the channel is occupies, using various methods, e.g., a condition that the intensity of a received signal in the channel detection is set by the eNB or is greater than a pre-defined threshold, a condition as to whether a pre-defined signal is detected, etc. If UE ascertains that the unlicensed band is in an idle state via the channel detection, it may perform the uplink signal transmission set by the eNB. If UE ascertains that the set unlicensed band is occupied by other devices via the channel detection, it may not transmit the uplink transmission set by the eNB.

In a state where UE is set, to transmit/receive signals to/from one or more cells operating in a licensed band and perform simultaneous transmission of PUCCH and PUSCH, at least one of the following: UCI, a channel transmitting UCI and a UCI transmission cell may be differently set according to a type of UCI transmitted via sub-frame n and/or a condition as to whether PUSCH is transmitted. That is, as described above, in a state where UE is set, to transmit/receive signals to/from one or more cells operating in a licensed band and not perform simultaneous transmission of PUCCH and PUSCH, if UCI transmitted via sub-frame n contains one of the following: periodic CSI, HARQ-ACK, periodic CSI and HARQ-ACK information, and if the PUSCH transmission from PCell is not set at a UCI transmission timing but PUSCH is set in one or more SCells, the UCI may be included in a PUSCH transmission of an SCell with the smallest SCellIndex among the SCells where PUSCH transmission is set, and then transmitted along therewith. In this case, if a cell set to perform the PUSCH transmission is a cell operating in an unlicensed band, the UE may perform the channel detection for the unlicensed band before the PUSCH is transmitted and may or may not perform the PUSCH transmission according to the result of the channel detection. If the UE does not perform the PUSCH transmission according to the channel detection result, it may transmit the UCI via a PUCCH. If the UE performs the PUSCH transmission according to the channel detection result, the UCI is included in the PUSCH transmission and then transmitted along therewith. However, since an eNB that needs to receive the UCI and PUSCH signals does not know the channel detection result of the UE, the eNB may receive the UCI and PUSCH signals from the UE, considering that the UE performs the PUSCH transmission based on an existing condition set to the UE. If the UE transmits UCI via a PUCCH, instead of performing the PUSCH transmission according to the channel detection result, the eNB may not correctly receive the UCI and PUSCH signals. In addition, since the UE does not previously know about the channel detection result for the PUSCH transmission, it needs to: create signals for the cases where it transmits UCI via a PUCCH and it transmits PUSCH including UCI; select a transmission mode according to the channel detection result; and perform the transmission in the selected mode. These operations cause UE to increase the degree of complexity and a signal processing delay.

When UE needs to perform the channel detection for an unlicensed band through which it transmits uplink signals, at least one of the following: UCI, a channel transmitting UCI and a UCI transmission cell is differently determined, according to the channel detection result. Therefore, a method is needed to prevent the problem. That is, in a state where UE is set to transmit/receive signals to/from one or more cells, if the UE is set not to perform the PUSCH transmission at a UCI transmission timing but is set to perform the PUSCH transmission in an SCell operating in one or more unlicensed bands, a channel transmitting the UCI or a UCI transmission cell is selected by the following methods.

Method 1: If the PUSCH transmission is not set in all cells operating in a licensed band, including a PCell, at a UCI transmission timing, but is set in an SCell operating in one or more unlicensed bands, the UCI is transmitted only when LBT succeeds in the set PUSCH SCell.

Method 2: If the PUSCH transmission is not set in a cell operating in a licensed band, including a PCell, at a UCI transmission timing, but is set in an SCell operating in one or more unlicensed bands, the UCI is transmitted via the set PUCCH but is not transmitted via the set PUSCH.

Method 3: If the PUSCH transmission is set, in an SCell operating in one or more licensed bands, except for a PCell, at a UCI transmission timing, and in an SCell operating in one or more unlicensed bands, and an SCell with the smallest SCellIndex among the SCells where the PUSCH transmission is set is an SCell operating in a licensed band, the UCI is included in the PUSCH with the smallest SCellIndex among the licensed band SCells transmitting the set PUSCH and is then transmitted along therewith. In this case, if an SCell with the smallest SCellIndex among the SCells where the PUSCH transmission is set is an SCell operating in an unlicensed band, the UCI is included in the PUSCH with the smallest SCellIndex among the licensed band SCells transmitting the set PUSCH and is then transmitted along therewith.

Embodiment 1

Embodiment 1 is related to Method 1 and described in detail as follows. In a state where UE is set, to transmit/receive signals to/from one or more cells, include a cell operating in one or more unlicensed bands among the set cells and not perform simultaneous transmission of PUCCH and PUSCH, if the PUSCH transmission is not set in all cells operating in a licensed band, including a PCell, at a transmission timing (or sub-frame n) of UCI (e.g., part or all of the following: a scheduling request (SR), HARQ-ACK, periodic CSI, and aperiodic CSI), but is set in an SCell operating in one or more unlicensed bands, the UCI may or may not be transmitted according to a condition as to whether the channel for an unlicensed band where the PUSCH transmission is set is occupied. That is, if only the PUSCH transmission is set in an SCell operating in an unlicensed band at a UCI transmission timing or sub-frame n, the UE determines whether the channel for the unlicensed band can be occupied before the start timing of the set PUSCH transmission. If the UE ascertains that the channel for the unlicensed band can be occupied at sub-frame n, it is capable of transmitting the UCI via a PUSCH of the unlicensed band. If the UE ascertains that simultaneous transmission of PUSCH for the CSI request and PUSCH for the data transmission is set when the UE performs the UCI transmission, the UCI is included in a PUSCH for data transmission (embedded or multiplexed) and then transmitted along therewith. In this case, the PUSCH for a CSI request and the PUSCH for data transmission may be set via one PDCCH or via separate PDCCHs respectively. If one or more cells operate in an unlicensed band where the PUSCH transmission is set, a cell with the smallest SCellIndex among the cells, where the PUSCH transmission is set, performs the channel detection and transmits UCI via the PUSCH. If one or more cells are set to perform the PUSCH transmission, the UCI may be transmitted via a PUSCH: in a cell whose channel can be first occupied among the cells set to perform the PUSCH transmission; or a cell with the smallest SCellIndex among the cells whose channels can be occupied. If a channel is not occupied at the UCI transmission timing, UCI is not transmitted.

In a state where UE is set, to transmit/receive signals to/from one or more cells, include a cell operating in one or more unlicensed bands among the set cells and perform simultaneous transmission of PUCCH and PUSCH, if the PUSCH transmission is not set in all cells operating in a licensed band, including a PCell, at a UCI transmission timing (or sub-frame n) but is set in one or more SCell operating in an unlicensed band, part of the UCI is transmitted via a PUCCH, and another part of the UCI may or may not be transmitted according to a condition as to whether the channel for an unlicensed band where the PUSCH transmission is set is occupied. For example, if the UCI contains periodic CSI and HARQ-ACK, the HARQ-ACK is transmitted via a PUCCH, and the aperiodic CSI is included in a PUSCH transmission and may or may not be transmitted according to the channel detection result. Alternatively, the HARQ-ACK and the periodic CSI may also be transmitted via a PUCCH. In another embodiment, if UCI forms HARQ-ACK, HARQ-ACK and SR, or SR, containing aperiodic CSI, the UCI except for the aperiodic CSI may be transmitted via a PUCCH, and the aperiodic CSI is contained in a PUSCH transmission and may or may not be transmitted according to the channel detection result. That is, if only the PUSCH transmission is set in an SCell operating in an unlicensed band at a UCI transmission timing or sub-frame n, the UE determines whether the channel for the unlicensed band can be occupied before the start timing of the set PUSCH transmission. If the UE ascertains that the channel for the unlicensed band can be occupied at sub-frame n, it is capable of transmitting the UCI via a PUSCH of the unlicensed band. If the UE ascertains that simultaneous transmission of PUSCH for the CSI request and PUSCH for the data transmission is set when the UE performs the UCI transmission, the UCI is included in a PUSCH for data transmission (embedded or multiplexed) and then transmitted along therewith. In this case, the PUSCH for a CSI request and the PUSCH for data transmission may be set via one PDCCH or via separate PDCCHs respectively. If one or more cells are set to perform the PUSCH transmission, a cell with the smallest SCellIndex among the cells, where the PUSCH transmission is set, performs the channel detection, and transmits UCI via the PUSCH. If one or more cells are set to perform the PUSCH transmission, the UCI may be transmitted via a PUSCH: in a cell whose channel can be first occupied among the cells set to perform the PUSCH transmission; or a cell with the smallest SCellIndex among the cells whose channels can be occupied. If a channel is not occupied at the UCI transmission timing, UCI is not transmitted.

Embodiment 2

Embodiment 2 is related to Method 2 and described in detail as follows. In a state where UE is set, to transmit/receive signals to/from one or more cells, include a cell operating in one or more unlicensed bands among the set cells and perform or not perform simultaneous transmission of PUCCH and PUSCH, if the PUSCH transmission is not set in all cells operating in a licensed band, including a PCell, at a transmission timing (or sub-frame n) of UCI (e.g., part or all of the following: a scheduling request (SR), HARQ-ACK, periodic CSI, and aperiodic CSI), but is set in an SCell operating in one or more unlicensed bands, the UCI is transmitted, via a PUCCH, regardless of a condition as to whether the PUSCH transmission can be performed in the set unlicensed band. In this case, the set PUSCH transmission is not performed. If the UCI contains aperiodic CSI, the aperiodic CSI is not transmitted via a PUCCH. In a state where UE is set, to transmit/receive signals to/from one or more cells, include a cell operating in one or more unlicensed bands among the set cells and perform or not perform simultaneous transmission of PUCCH and PUSCH, if the PUSCH transmission is set in cells operating in one or more licensed bands, except for a PCell, at a transmission timing (or sub-frame n) of UCI (e.g., part or all of the following: a scheduling request (SR), HARQ-ACK, and periodic CSI), except for aperiodic CSI, the UCI is transmitted, via a PUCCH of a cell operating in a licensed band, regardless of a condition as to whether the PUSCH transmission can be performed in the set unlicensed band. In this case, the cell transmitting UCI is a cell with the smallest SCellIndex among the cells set to perform the PUSCH transmission in sub-frame n. In this case, the set PUCCH transmission is not performed. If the UCI contains aperiodic CSI, the aperiodic CSI is not transmitted via a PUCCH.

Embodiment 3

Embodiment 3 is related to Method 3 and described in detail as follows.

In a state where UE is set, to transmit/receive signals to/from one or more cells, include a cell operating in one or more unlicensed bands among the set cells and not perform simultaneous transmission of PUCCH and PUSCH, if the PUSCH transmission is not set in a licensed band, at a transmission timing of UCI transmitted via sub-frame n (e.g., part or all of the following: a scheduling request (SR), HARQ-ACK, periodic CSI, and aperiodic CSI), part or all of the UCI, except for aperiodic CSI, may be transmitted via a PUCCH of a PCell. Since it is assumed that aperiodic CSI is transmitted via a PUSCH, the transmission of the aperiodic CSI is excluded from the PUCCH transmission. That is, in a state where the UCI is transmitted in sub-frame n as described above, if the PUSCH transmission via a licensed band is not set, UE is capable of capable of performing the transmission via PUCCH, regardless of a condition as to whether the PUSCH transmission for an unlicensed band is set. In a state where UE is set no to perform simultaneous transmission of PUCCH and PUSCH, although the UE is set by an eNB to perform PUSCH transmission for uplink data or aperiodic CSI report in sub-frame n, it does not perform the set PUSCH transmission. Therefore, the UE may not perform the channel detection for the PUSCH transmission set in an unlicensed band, in sub-frame n.

In a state where UE is set, to transmit/receive signals to/from one or more cells, include a cell operating in one or more unlicensed bands among the set cells and not perform simultaneous transmission of PUCCH and PUSCH, if the UCI transmitted via sub-frame n is aperiodic CSI/aperiodic CSI and HARQ-ACK, and the PUSCH transmission in a licensed band is set for the UCI report or the uplink data transmission, the UCI is transmitted via a PUSCH in a licensed band set by an eNB. In this case, the eNB requests a CSI report via PDCCH and sets a PUSCH resource through which UE transmits the CSI report. If the CSI request and the uplink data transmission have been set in a timing when UE transmits UCI, the UCI is included in a PUSCH for data transmission (embedded or multiplexed) and then transmitted along therewith. In this case, the PUSCH for a CSI request and the PUSCH for data transmission may be set via one PDCCH.

In a state where UE is set, to transmit/receive signals to/from one or more cells, include a cell operating in one or more unlicensed bands among the set cells and not perform simultaneous transmission of PUCCH and PUSCH, if the UCI transmitted via sub-frame n is aperiodic CSI, and the PUSCH transmission in an unlicensed band is set for the UCI report, the UCI is transmitted via a PUSCH in an unlicensed band set by an eNB. In this case, the eNB requests a CSI report via PDCCH and sets a PUSCH resource through which UE transmits a CSI report or uplink data. That is, if UE is set in such a way that the UCI is transmitted via a PUSCH in an unlicensed band, in sub-frame n as described above, the UE performs the channel detection for the PUSCH transmission in the set unlicensed band. If an unlicensed band set for the UCI according to the channel detection result is in an idle state, the UCI is transmitted via a PUSCH in the set unlicensed band. If an unlicensed band set for the UCI is occupied by other devices according to the channel detection result is in an idle state, the UCI is not transmitted via a PUSCH in the set unlicensed band. If UE is set to perform simultaneous transmission of PUSCHs for the CSI request and the uplink data at a UCI transmission timing, the UCI is included in a PUSCH for data transmission (embedded or multiplexed) and then transmitted along therewith. In this case, the PUSCH for a CSI request and the PUSCH for data transmission may be set via one PDCCH. In as state where UCI transmitted via sub-frame n is aperiodic CSI and HARQ-ACK, if the UE is set to perform the PUSCH transmission in an unlicensed band for the UCI report, the HARQ-ACK of the UCI is transmitted via a PUCCH and the aperiodic CSI may not be transmitted, regardless of whether the PUSCH transmission in an unlicensed band can be performed in sub-frame n.

In a state where UE is set, to transmit/receive signals to/from one or more cells, include a cell operating in one or more unlicensed bands among the set cells and not perform simultaneous transmission of PUCCH and PUSCH, if the UCI transmitted via sub-frame n is aperiodic CSI and HARQ-ACK and only the PUSCH transmission in an unlicensed band is set, for the UCI report or the uplink data transmission, without setting the PUSCH transmission in a licensed band, the HARQ-ACK of the UCI is transmitted via a PUCCH and the aperiodic CSI may not be transmitted regardless of a condition as to whether the PUSCH transmission in an unlicensed band can be performed in sub-frame n. In a state where UE is set, to transmit/receive signals to/from one or more cells, include a cell operating in one or more unlicensed bands among the set cells and not perform simultaneous transmission of PUCCH and PUSCH, if the UCI transmitted via sub-frame n contains one of the following: periodic CSI, HARQ-ACK, and periodic CSI and HARQ-ACK, and if the PUSCH transmission from PCell is set at a UCI transmission timing, the UCI is included in the PUSCH transmission of a PCell regardless of a condition as to whether the PUSCH transmission is set in another SCell, and then transmitted along therewith. In this case, the PUSCH transmission from PCell is information transmitted during the initial cell access, the UCI may not be transmitted.

In a state where UE is set, to transmit/receive signals to/from one or more cells, include a cell operating in one or more unlicensed bands among the set cells and not perform simultaneous transmission of PUCCH and PUSCH, if the UCI transmitted via sub-frame n contains one of the following: periodic CSI, HARQ-ACK, and periodic CSI and HARQ-ACK, and if the PUSCH transmission from PCell is not set at a UCI transmission timing but the PUSCH transmission from an SCell operating in one or more licensed bands is set, the UCI may be included in a PUSCH transmission of a licensed band SCell with the smallest SCellIndex among the licensed band SCells where the PUSCH transmission is set, regardless of a condition as to whether the PUSCH transmission is set in an SCell operating in an unlicensed band, and then transmitted along therewith. That is, although the PUSCH transmission is set in an SCell operating in a licensed band and an unlicensed band, except for a PCell, at a UCI transmission timing; and an unlicensed band SCell has the smallest SCellIndex, among all the SCells where the PUSCH transmission is set in sub-frame n, if the PUSCH transmission is set in SCells operating in a licensed band, the UCI is included in the PUSCH transmission of an licensed band SCell with the smallest SCellIndex, among the SCells that operate in a licensed band and where the PUSCH transmission is set in sub-frame n, and then transmitted along therewith. If all SCells, where the PUSCH transmission is set at a UCI transmission timing (sub-frame n), are SCells operating in an unlicensed band, or are not set with the PUSCH transmission in a licensed band, including PCells, the UCI is transmitted via a PUCCH, and not transmitted via PUSCH set in an unlicensed band. In this case, the UCI may be included in a set PUSCH in an SCell with the smallest SCellIndex among the SCells that operate in an unlicensed band and where the PUSCH transmission is set, according to the channel detection result, and then transmitted along therewith. Alternatively, the UCI may be transmitted via a PUSCH: in a cell whose channel can be first occupied among the SCells that operate in an unlicensed band and where the PUSCH transmission is set; or a cell with the smallest SCellIndex among the cells whose channels can be occupied. If a channel is not occupied at the UCI transmission timing, the UCI is not transmitted. If the PUSCH transmission is set in SCells operating in one or more licensed bands at a UCI transmission timing, and if the PUSCH transmission is set in one or more SCells operating in an unlicensed band but an SCell with the smallest SCellIndex among the SCells where the PUSCH transmission is set is an SCell operating in an unlicensed band, the UCI is: transmitted via a PUCCH; defined so that it is not transmitted via the PUSCH set to perform the transmission in an SCell operating in an unlicensed band; and transmitted via a PUSCH in an SCell with the smallest SCellIndex among the SCells operating in a licensed band. In this case, the UCI may be included in a set PUSCH in an SCell with the smallest SCellIndex among the SCells operating in a set unlicensed band, according to the channel detection result, and then transmitted along therewith. Alternatively, the UCI may be transmitted via a PUSCH: in a cell whose channel can be first occupied among the SCells that operate in an unlicensed band and where the PUSCH transmission is set; or a cell with the smallest SCellIndex among the cells whose channels can be occupied. If a channel is not occupied at the UCI transmission timing, the UCI is not transmitted.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n contains HARQ-ACK or SR or and HARQ-ACK and SR, the UE may transmit the UCI using at least one of the PUCCH format 1/1a/1b/3, according to the settings of eNB and UCI. Details regarding the PUCCH formats refer to TS36.211, TS36.212, and TS36.213 defined in the 3GPP specification.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n contains at least one of the following: HARQ-ACK and/or SR and/or periodic CSI, the UE may transmit the UCI using at least one of the PUCCH format 4/5 according to the settings of eNB and UCI.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n contains periodic CSI for one serving cell, the UCI may be transmitted in PUCCH format 2.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to contain periodic CSI and HARQ-ACK and is set not to perform PUSCH transmission from another cell, the UE may transmit the UCI using at least one of the PUCCH format 2a/2b/3/4/5 according to the UCI.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to contain periodic CSI and HARQ-ACK, and PUSCH transmission from PCell is set in sub-frame n, the UE transmits: the HARQ-ACK of the UCI using at least one of the PUCCH format 1a/1b/3 according to the UCI; and the periodic CSI via PUSCH of PCell.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to contain periodic CSI and HARQ-ACK, and if PUSCH transmission from PCell is not set in sub-frame n; however PUSCH transmission is set in SCells one or more licensed bands, the UE transmits: the HARQ-ACK of the UCI using at least one of the PUCCH format 1a/1b/3 according to the UCI; and the periodic CSI via PUSCH of an SCell with the smallest SCellIndex among the SCells operating in a licensed band where the PUSCH transmission is set, regardless of a condition as to whether the PUSCH transmission is set in an SCell operating in an unlicensed band in sub-frame n.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to contain periodic CSI and HARQ-ACK, and if PUSCH transmission is not set in an SCell operating in a licensed band and PCell in sub-frame n; however PUSCH transmission is set in SCells operating in one or more unlicensed bands, the UE transmits the HARQ-ACK of the UCI using at least one of the PUCCH format 1a/1b/3 according to the UCI, and may or may not transmit the periodic CSI based on a condition as to whether the PUSCH transmission in an SCell operating in an unlicensed band can be performed in sub-frame n. In this case, the UE may transmit the periodic CSI and the HARQ-ACK via the PUCCH.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to contain periodic CSI and HARQ-ACK, and if PUSCH transmission is not set in an SCell operating in a licensed band and PCell in sub-frame n; however PUSCH transmission is set in SCells operating in one or more unlicensed bands, the UE transmits the HARQ-ACK of the UCI using at least one of the PUCCH format 1a/1b/3 according to the UCI and the periodic CSI via a PUSCH of an SCell with the smallest SCellIndex among the SCells that operate in an unlicensed band and where the PUSCH transmission is set in sub-frame n. In this case, the UE transmit the UCI via a PUSCH: in an SCell whose channel can be first occupied among the SCells that operate in an unlicensed band and where the PUSCH transmission is set; or a cell with the smallest SCellIndex among the cells whose channels can be occupied. If a channel is not occupied at the UCI transmission timing, UCI is not transmitted.

In a state where UE is set, to transmit/receive signals to/from one or more cells, include a cell operating in one or more unlicensed bands among the set cells and perform simultaneous transmission of PUCCH and PUSCH, if UCI transmitted via sub-frame n is configured to include: aperiodic CSI and HARQ-ACK or aperiodic CSI and HARQ-ACK and SR or aperiodic CSI and SR (HARQ-ACK+aperiodic CSI or HARQ-ACK+SR+aperiodic CSI or SR+aperiodic CSI), the UE transmits the UCI, except for the HARQ-ACK of the UCI or HARQ-ACK and SR or SR or aperiodic CSI, using at least one of the PUCCH format 1/1a/1b/3 according to the UCI and the aperiodic CSI via PUSCH set to perform the transmission.

Figure 9:
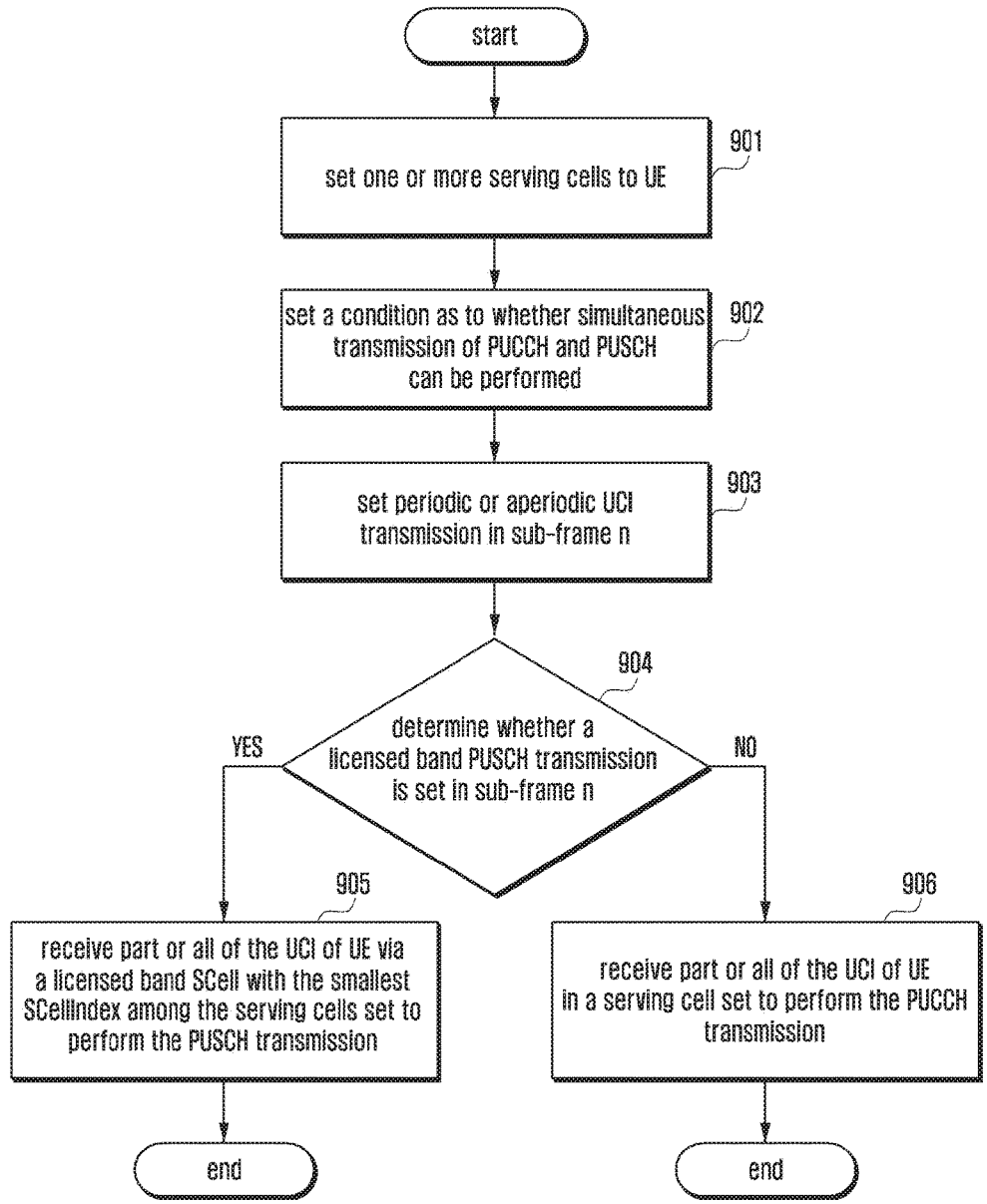
FIG. 9 is a flowchart that describes a method for an eNB to receive uplink control information (UCI) according to an embodiment of the present disclosure.

FIG. 9 is a flowchart that describes a method for an eNB to receive UCI according to an embodiment of the present disclosure.

Referring to FIG. 9, an eNB is capable of setting one or more serving cells according to its capability and the capability of UE in operation 901. The set serving cell may include cells operating in an unlicensed band according to an eNB's capability and a UE's capability. The number of serving cells can be set according to an eNB's capability and a UE's capability.

The eNB may or may not set simultaneous transmission of PUCCH and PUSCH to the UE, based on the eNB's determination and a condition as to whether UE may perform simultaneous transmission of PUCCH and PUSCH in operation 902. Although the embodiment shown in FIG. 9 is described, assuming that the eNB does not set simultaneous transmission of PUCCH and PUSCH to the UE; however, it should be understood that the present disclosure is not limited thereto. For example, the embodiment may also be modified in such a way that the eNB sets simultaneous transmission of PUCCH and PUSCH to the UE.

If the eNB requests or sets the transmission of aperiodic CSI from/to UE in sub-frame n-K or the UE is set to transmit UCI, such as periodic CSI or HARQ-ACK or SR, etc., in sub-frame n, one or more cells configuring UE's UCI or transmitting UCI may set to differ from each other, according to a condition as to whether the PUSCH transmission is performed in one or more cells among PCells in sub-frame n and SCells operating in a licensed band or an unlicensed band in operation 903. Although the embodiment shown in FIG. 9 is described in such a way that the eNB requests an aperiodic CSI report from UE in sub-frame n-K and sets to transmit the aperiodic CSI via a PUSCH in a licensed band in sub-frame n, it should be understood that the present disclosure is not limited thereto.

The present disclosure may also be applied to various embodiments where the eNB sets only the PUSCH transmission in an unlicensed band or a PCell to UE. That is, if the eNB sets, to UE, the PUSCH transmission in one or more licensed bands in sub-frame n in operation 904, the UE transmits UCI to the eNB via the set licensed band PUSCH or an SCell with the smallest SCellIndex among the SCells set to perform the PUSCH transmission, and the eNB receives part or all of the UCI of the UE via the SCell in operation 905. If the PUSCH transmission in a licensed band is not set in sub-frame n in operation 904, the UE transmits part or all of the UCI of the UE in a cell set to perform the PUCCH transmission via a PUCCH, and the eNB receives part or all of the UCI of the UE via the PUCCH in operation 906.

Figure 10:
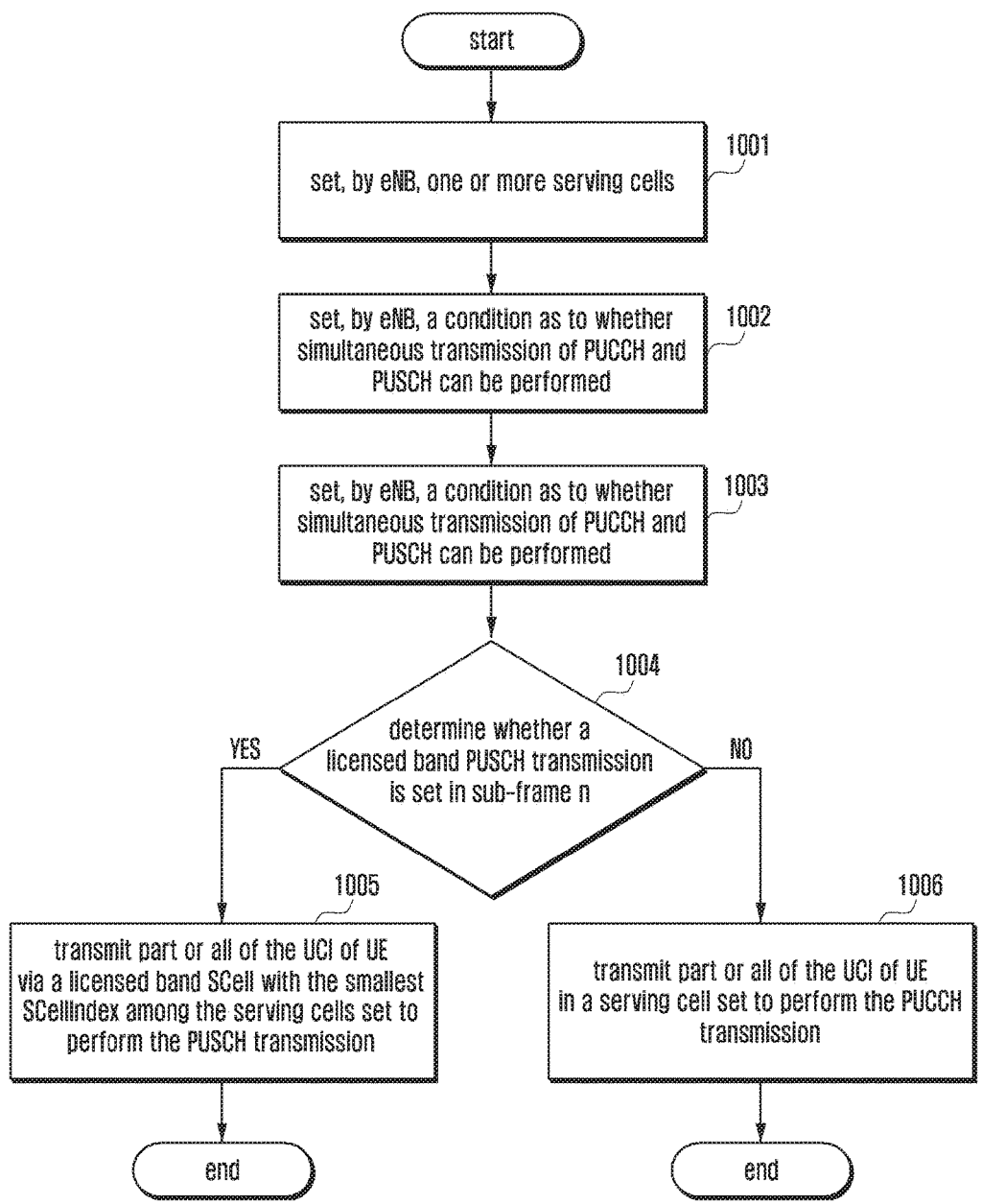
FIG. 10 is a flowchart that describes a method for UE to transmit UCI according to an embodiment of the present disclosure.

FIG. 10 is a flowchart that describes a method for UE to transmit UCI according to an embodiment of the present disclosure.

Referring to FIG. 10, UE receives a request from an eNB to set one or more serving cell according to an eNB's capability and a UE's capability in operation 1001. The set serving cell may include cells operating in an unlicensed band according to an eNB's capability and a UE's capability.

The number of serving cells can be set according to an eNB's capability and a UE's capability. UE receives, from the eNB, a setting as to whether the simultaneous transmission of PUCCH and PUSCH can be set, and performs the received setting in operation 1002. Although the embodiment shown in FIG. 10 is described, assuming that the eNB does not set simultaneous transmission of PUCCH and PUSCH to the UE; however, it should be understood that the present disclosure is not limited thereto. For example, the embodiment may also be modified in such a way that the eNB sets simultaneous transmission of PUCCH and PUSCH to the UE. If the eNB requests or sets the transmission of aperiodic CSI from/to UE in sub-frame n-K or the UE is set to transmit UCI, such as periodic CSI or HARQ-ACK or SR, etc., in sub-frame n, one or more cells configuring UE's UCI or transmitting UCI may set to differ from each other, according to a condition as to whether the PUSCH transmission is performed in one or more cells among PCells in sub-frame n and SCells operating in a licensed band or an unlicensed band in operation 1003. Although the embodiment shown in FIG. 10 is described in such a way that the eNB requests an aperiodic CSI report from UE in sub-frame n-K and sets to transmit the aperiodic CSI via a PUSCH in a licensed band in sub-frame n, it should be understood that the present disclosure is not limited thereto.

The present disclosure may also be applied to various embodiments where the eNB sets only the PUSCH transmission in an unlicensed band or a PCell to UE. That is, if the eNB sets, to UE, the PUSCH transmission in one or more licensed bands in sub-frame n in operation 1004, the UE transmits UCI to the eNB via the set licensed band PUSCH or an SCell with the smallest SCellIndex among the SCells set to perform the PUSCH transmission in operation 1005. If the PUSCH transmission in a licensed band is not set in sub-frame n in operation 1004, the UE transmits part or all of the UCI of the UE in a cell set to perform the PUCCH transmission via a PUCCH in operation 1006.

Figure 11:
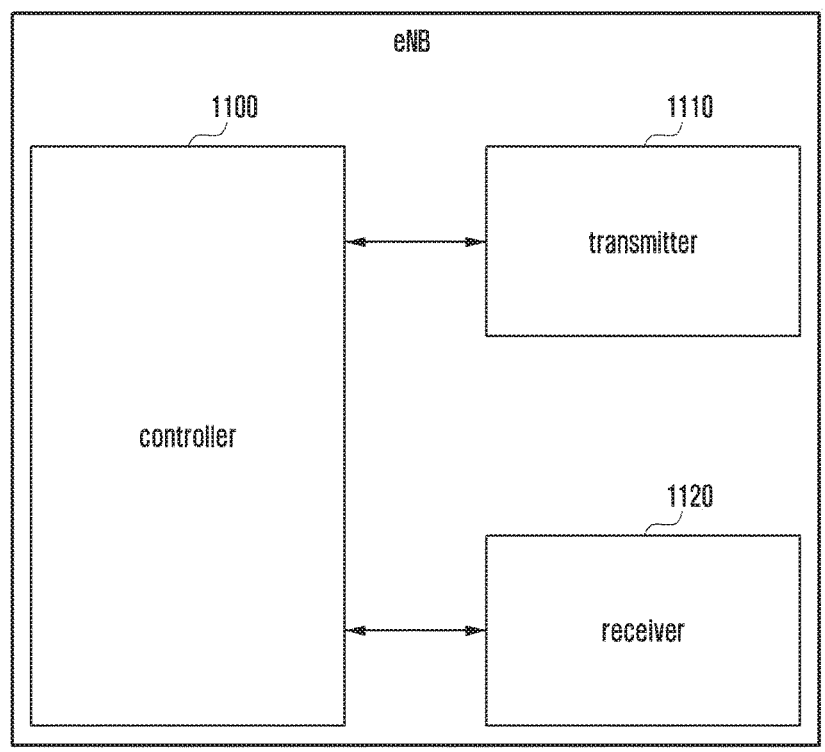
FIG. 11 is a block diagram showing an eNB according to various embodiments of the present disclosure.

FIG. 11 is a block diagram showing an eNB according to an embodiment of the present disclosure.

Referring to FIG. 11, an eNB receiver 1120 receives signals from an eNB, UE, etc., measures channels from the eNB, UE, etc., and detects an unlicensed band channel, using values set for the channel detection, by an eNB controller 1100. When an unlicensed band is occupied, the transmission power of the unlicensed band may be determined. The eNB controller 1100 is capable of determining whether the unlicensed band is in an idle state, using information regarding an unlicensed band detected via the receiver 1120. If the unlicensed band is in an idle state, the eNB controller 1100 controls an eNB transmitter 1110 to transmit a signal for the channel occupancy, control channel information and data channel information regarding a specified UE, and information for setting the transmission power of an LAA cell. The eNB is capable of correctly receiving UCI transmission to the UE where one or more of the following: UCI or a UCI transmission cell, and a UCI transmission channel can be changed, according to a condition as to whether the PUSCH transmission is set in a licensed band or an unlicensed band, at a UE's UCI transmission timing.

If the unlicensed band is not in an idle state, the eNB controller 1100 is capable of setting the eNB receiver 1120 to maintaining the channel detection. The eNB controller 1100 is capable of determining: part or all of the parameters required for the transmission or the configuration between an eNB and UE, including transmission power information, such as CRS, CSI-RS, DRS, PDSCH, PDSCH/EPDSCH scheduling information, etc.; settings of various types of reference signal transmission parameters; settings of control channel transmission parameters, such as PDCCH/EPD-CCH for a specified UE; etc. The eNB controller 1100 is capable of setting, to UE, cells operating in a licensed band and/or an unlicensed band, which differ from each other, according to an eNB's capability and a UE's capability, and simultaneous transmission of PUCCH and PUSCH.

Figure 12:
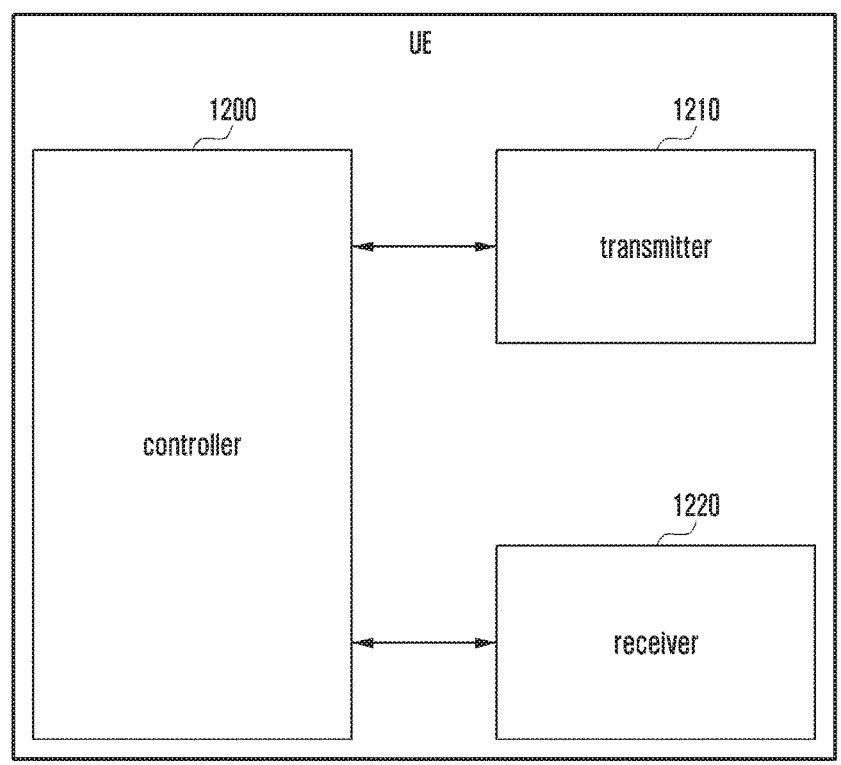
FIG. 12 is a block diagram showing a UE according to various embodiments of the present disclosure.

FIG. 12 is a block diagram showing a UE according to various embodiments of the present disclosure.

Referring to FIG. 12, a UE controller 1200 receives, from an eNB, inter eNB-UE setting information for transmitting signals in a licensed band and un unlicensed band, using a receiver 1220, and uses an unlicensed band according to the received setting value. The UE controller 1200 may also receive, via the UE receiver 1220, a transmittable timing of a first signal or a second signal, a setting for the signal, a setting for a channel occupancy interval of the LAA cell, schemes for determining the last partial sub-frame, etc. The UE controller 1200 may also receive, via the UE receiver 1220, setting information regarding transmission power in a channel occupancy interval of the LAA cell. The controller 1200 is capable of: obtaining state information regarding a corresponding unlicensed band, using one or more of the following information, received via the receiver 1220: a setting value for determining whether the eNB can perform scheduling in a sub-frame performing the channel detection set by the eNB; a setting value for signals transmitted via a channel occupancy start symbol of an eNB; state information regarding an unlicensed band that an eNB can transmit to UE using a licensed band or another unlicensed band; setting information regarding transmission power in a channel occupancy interval of an LAA cell; etc.; and receiving signals from the unlicensed band.

The controller 1200 is capable of determining whether the channel of the LAA cell is occupied, using a second signal that is received from the LAA cell and is detected. The controller 1200 is capable of determining the length of the last partial sub-frame of the LAA cell using one or more of the following: a transmittable timing of a first signal or a second signal, set from the LAA cell; and a channel occupancy interval of the LAA cell. The controller 1200 is capable of determining a reception result of a data signal transmitted from the eNB, and transmitting the data reception result to the eNB via a transmitter 1210. The controller 1200 is capable of receiving correct signals from the receiver 1220, using transmission power for an LAA cell channel occupancy interval, received from the LAA cell. The controller 1200 further includes a decoder that is capable of receiving the PDCCH/EPDCCH and PDSCH via the receiver 1220, and decoding the PDSCH. The UE is capable of correctly transmitting UCI transmission to the eNB by changing one or more of the following: UCI or a UCI transmission cell, and a UCI transmission channel, according to a condition as to whether the PUSCH transmission is set in a licensed band or an unlicensed band, at a UE's UCI transmission timing.

Embodiment 3

Wireless communication systems that were providing voice-based services have evolved to broadband wireless communication systems that are capable of providing packet data services based on high quality and high speed, such as: LTE or E-UTRA, LTE-A, high speed packet access (HSPA) defined in 3GPP; ultra mobile broadband (UMB), high rate packet data (HRPD) defined in 3GPP2; the communication standard IEEE 802.16e; etc.

The LTE system, as a typical example of the broadband wireless communication systems, employs OFDM in the DL and SC-FDMA in the UL. Uplink is referred to as a radio link through which a terminal UE or mobile station (MS) transmits data or control signals to an eNode B (eNB) or a base station (BS). Downlink is referred to as a radio link through which an eNB transmits data or control signals to UE. The Multiple Access performs allocation and management of time-frequency resources to carry data and control information according to users, so as not to overlap with each other, i.e., so as to achieve orthogonality between them, thereby distinguishing data or control information between respective users.

If a decoding failure occurs in the initial transmission, LTE systems employ a HARQ scheme that allows a physical layer to re-transmit corresponding data. HARQ scheme allows a receiver to transmit NACK informing of decoding failure to a transmitter, so that the transmitter can re-transmit corresponding data from the physical layer to the receiver. The receiver combines data re-transmitted from the transmitter with data that the receiver has failed to decode, thereby increasing the reception performance of data. The HARQ scheme also allows a receiver to transmit ACK informing of decoding success to a transmitter, so that the transmitter can transmit new data to the receiver.

Figure 13:
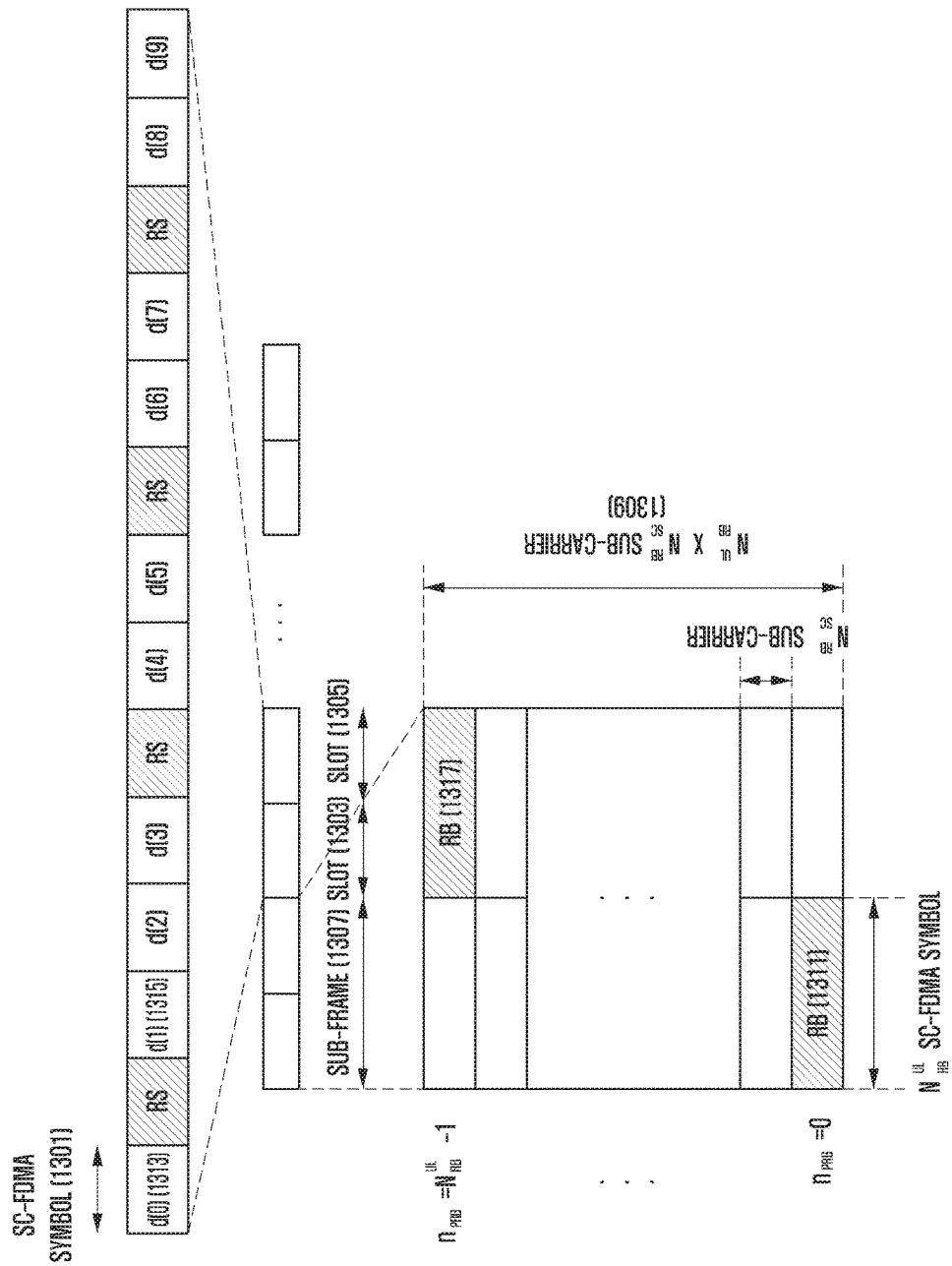
FIG. 13 is a diagram showing an uplink resource assignment structure and a sub-frame structure of a control channel in an LTE or LTE-advanced (LTE-A) system according to an embodiment of the present disclosure.

FIG. 13 is a diagram showing an uplink resource assignment structure and a sub-frame structure of a control channel in an LTE or LTE-A system according to an embodiment of the present disclosure.

Referring to FIG. 13, a diagram is provided showing a time-frequency domain transmission structure of a PUCCH in an LTE-A system. That is, FIG. 13 shows a time-frequency domain transmission structure of a PUCCH as a physical control channel through which UE transmits UCI to an eNB in an LTE-A system. UCI contains at least one item of control information as follows:

HARQ-ACK: When UE receives, from an eNB, downlink data via a PDSCH as a downlink data channel to which HARQ is applied, it feeds back Acknowledgement (ACK) if an error does not occur in the downlink data and Negative Acknowledgement (NACK) if an error occurred in the downlink data.

CSI: CSI includes a signal indicating: CQI, PMI, RI, or downlink channel coefficient. An eNB sets MCS for data to be transmitted to UE to a proper value, based on CSI obtained from the UE, and satisfies a level of data reception performance. CQI represents signal to interference and noise ratio (SINR) for a system wideband or subband, and is expressed in a form of MCS for satisfying a preset level of data reception performance. PMI/RI provides pre-coding and rank information required for an eNB to transmit data via a multiple antenna in a system supporting Multiple Input Multiple Output (MIMO). A signal representing a downlink channel coefficient provides channel state information more in detail than the CSI signal; however, it increases the uplink overhead. UE previously receives CSI configuration information, such as a reporting mode indicating a type of information to be fed back, a type of resource to be used, a transmission cycle, etc., from an eNB, via higher layer signaling. UE transmits CSI to the eNB, using the previously received CSI configuration information.

With reference to FIG. 13, the horizontal and vertical axes represent the time and frequency domains, respectively. The minimum unit of transmission on the time domain is an SC-FDMA symbol, indicated by reference number 1301. SC-FDMA symbols of $N_{symb}^{UL}$ (N represents the number of symbols) form one slot 1303 or 1305. Two slots form one sub-frame 1307. The minimum unit of transmission on the frequency domain is a subcarrier. The overall system transmission bandwidth 1309 forms a total of subcarriers, $N_{BW}$. $N_{BW}$ is a value proportional to the system transmission bandwidth.

The basic unit of resource on the time-frequency domain is a RE and is defined as an SC-FDMA symbol index and a subcarrier index. The Resource Blocks (RBs) 1311 and 1317 are defined as successive $N_{symb}^{UL}$ SC-FDMA symbols on the time domain and successive $N_{RB}^{UL} \times N_{sc}^{RB}$ subcarriers on the frequency domain. Therefore, one RB includes REs of $N_{symb}^{UL} \times N_{sc}^{RB}$. In general, a minimum unit of transmission of data or control information is an RB. PUCCH as an uplink control channel is mapped to a frequency domain of 1 RB and is transmitted during 1 sub-frame.

As shown in FIG. 13, an uplink symbol for PUCCH in a sub-frame is configured in such a way that $N_{symb}^{UL}=7$, $N_{sc}^{RB}=12$, and the number of reference signal (RSs) for the channel estimation in a slot, $N_{RS}^{PUCCH}$, is 2. RS uses a constant amplitude zero auto-correlation (CAZAC) sequence. The CAZAC sequence is constant in signal intensity and has an autocorrelation of 0. When a CAZAC sequence is processed by cyclic shift (CS) by a value greater than a delay spread of a transmission path (channel), and thus forms a new CAZAC sequence, the new CAZAC sequence maintains the mutual orthogonality with respect to the original CAZAC sequence. Therefore, a CAZAC sequence of a maximum number of L, maintaining the orthogonality, and processed by CS, can be created from a CAZAC sequence of a length L. The length of CAZAC sequence applied to a PUCCH is the number of sub-carriers forming one RB, i.e., 12.

UCI is mapped to SC-FDMA symbols to which RS has not been mapped. As shown in FIG. 13, UCI modulation symbols 1313 and 1315, d(0), d(1), . . . , d(9), which are 10 in total, are respectively mapped to SC-FDMA symbols in one sub-frame. Each of the UCI modulation symbols is multiplied by a CAZAC sequence by applying a cyclic shift value in order to be multiplexed with UCI of other UE, and then is mapped to SC-FDMA symbols. PUCCH uses a frequency hopping in a unit of slot in order to obtain the frequency diversity. The PUCCH is located at the edge parts of the system transmission bandwidth so that data can be transmitted via remaining parts of the transmission bandwidth. That is, PUCCH is mapped to RB 1311 located at one outmost edge of the system transmission bandwidth in a first slot in a sub-frame, RB 1317 located at another outmost edge of the system transmission bandwidth in a second slot, and in another frequency domain. In general, PUCCH for the transmission of HARQ-ACK and PUCCH for the transmission of CSI do not overlap with each other in terms of RB's mapping location. In the case of PUSCH as an uplink shared channel, an RS for the channel estimation in one slot is located at the 4$^{th}$ SC-FDMA symbol in one slot, and thus is used as an RS for the demodulation of uplink data to two SC-FDMA symbols in one sub-frame.

LTE systems define timings between a PDSCH as a physical channel for the transmission of downlink data or PDCCH/EPDDCH including a semi-persistent scheduling (SPS) release and a PUCCH or PUSCH as an uplink physical channel transmitting HARQ ACK/NACK. For example, in an LTE system operating in frequency division duplex (FDD), HARQ ACK/NACK, corresponding to a PDSCH transmitted in n−4$^{th}$ sub-frame or a PDCCH/EPDCCH including an SPS release, is transmitted via a PUCCH or PUSCH in n$^{th}$ sub-frame.

In LTE systems, downlink HARQ employs an asynchronous HARQ scheme where a data re-transmission timing is not fixed. That is, if an eNB receives HARQ NACK feedback from UE in response to initial transmission data, it determines a transmission timing of re-transmission data, without restriction, according to its scheduling operation. UE buffers a result of decoding received data for the HARQ operation, and data where an error occurred, and combines the buffered result with the next re-transmission data.

In LTE systems, uplink HARQ employs a synchronous HARQ scheme where a data transmission timing is fixed, unlike the downlink HARQ. That is, the relation of uplink/downlink timing, among a PUSCH as a physical channel for the transmission of uplink data, a PDCCH as a downlink control channel ahead of the PUSCH, and a PHICHPHICH as a physical channel transmitting downlink HARQ ACK/NACK corresponding to the PUSCH, is fixed by the following rule:

When UE receives, from eNB, PDCCH containing uplink scheduling control information or a PHICH transmitting a downlink HARQ ACK/NACK, in sub-frame n, it transmits, to the eNB, uplink data corresponding to the control information via a PUSCH, in sub-frame n+k. In this case, the k is defined in different values according to FDD or TDD of LTE system and the set mode. For example, in an FDD LTE system, k is fixed to 4.

UE receives, from eNB, a PHICH carrying a downlink HARQ ACK/NACK, in sub-frame i. The PHICH corresponds to PUSCH that UE transmits in sub-frame i−k. In this case, the k is defined in different values according to FDD or TDD of LTE system and the set mode. For example, in an FDD LTE system, k is fixed to 4.

One of the important criteria to determine the performance of a cellular wireless communication system is latency of packet data. LTE systems perform the transmission/reception of signals in a unit of sub-frame with a transmission time interval (TTI) of 1 ms. LTE systems are capable of supporting UE with a TTI of less than 1 ms (i.e., shortened-TTI/shorter-TTI UE). Shortened-TTI UE is expected to be suitable for voice over LTE (VoLTE) services, remote control services, etc., where latency is an important factor. Shortened-TTI UE is also expected to be used as system that can implement IoT which is cellular-based mission critical.

In recent LTE and LTE-A systems, eNBs and UE have been designed to perform the transmission/reception in a unit of sub-frame in a transmission time interval of 1 ms. In an environment where eNBs and UE operating in a transmission time interval of 1 ms exist, support shortened-TTI UE operating in a transmission time interval of less than 1 ms needs to be supported. To this ends, transmission/ reception for shortened-TTI UE needs to be newly defined that differs from that of general LTE or LTE-A UE. Therefore, the present disclosure provides a method of operating general LTE, general LTE-A UE and shortened-TTI UE in a system environment where they coexist.

Hereinafter, embodiments of the disclosure are described in detail with reference to the accompanying drawings. Detailed descriptions of well-known functions and structures incorporated herein are omitted to avoid obscuring the subject matter of the disclosure. The following terms are defined considering functions of the disclosure, and may be changed by users or operators according to their needs. Therefore, the terms will be defined throughout the content of this description.

In the following description, the term 'eNB' is a node configured to allocate resources to UE. The eNB is also called an 'eNode B,' a 'Node B,' a 'BS,' a 'wireless access unit,' or an 'eNB controller.' The eNB may also be at least one of the nodes in a network. The term 'terminal' is also called UE or 'MS.' The terminal is a multimedia system configured to perform communication function, e.g., a cellular phone, a smartphone, a computer, etc. In the present disclosure, DL is referred to as wireless transmission path (channel) through which an eNB transmits signals to UE. UL is referred to as a wireless transmission path (channel) through which UE transmits signals to an eNB. In the following description, embodiments of the present disclosure will be described based on LTE or LTE-A systems; however, it will be appreciated to those skilled in the art that the subject matter of the present disclosure can also be applied to various types of communication systems which have the technical background and channel forms similar to those of the present disclosure, without departing from the scope and spirit of the present disclosure.

In the following description, shortened-TTI UE is also called first type UE, and normal-TTI UE is also called second type UE. The first type UE includes UE with a transmission time interval of less than 1 ms. The second type UE includes UE with a transmission time interval of 1 ms. In the following description, shortened-TTI UE is referred to as first type UE, and normal-TTI UE is referred to as second type UE. In the present disclosure, a shortened-TTI is also called a shorter-TTI.

In the following description, the term 'shortened-TTI transmission' is also called 'first type transmission,' and the term 'normal-TTI transmission' is also called 'second type transmission.' The first type transmission is a scheme that transmits a control signal, a data signal, and control and data signals in an interval of less than 1 ms. The second type transmission is a scheme that transmits control signals, data signals, and control and data signals in an interval of 1 ms.

In the present disclosure, a transmission time interval in the downlink is referred to as a unit of transmitted control signal and data signal or a unit of transmitted data signal. For example, a transmission time interval in the downlink of a legacy LTE system is a sub-frame as a unit of time, e.g., 1 ms. A transmission time interval in the uplink is referred to as a unit of transmitted control signal or data signal. For example, a transmission time interval in the uplink of a legacy LTE system is a sub-frame as a unit of time, e.g., 1 ms, like that in the downlink.

In the present disclosure, a shortened-TTI mode is a procedure where UE or eNB performs the transmission/ reception of a control signal or a data signal in a unit of shortened-TTI. A normal-TTI mode is a procedure where UE or eNB performs the transmission/reception of a control signal or a data signal in a unit of sub-frame.

In the present disclosure, the term 'shortened-TTI data' is referred to as data transmitted/received via PDSCH or PUSCH in a unit of shortened-TTI. The term 'normal-TTI data' is referred to as data transmitted/received via PDSCH or PUSCH in a unit of sub-frame. The term 'shortened-TTI control signal (control signal for shortened-TTI)' is referred to as a control signal for operating a shortened-TTI mode. The term 'normal-TTI control signal (control signal for normal-TTI)' is referred to as a control signal for operating a normal-TTI mode. For example, a normal-TTI control signal may be PCFICH, PHICH, PDCCH, EPDCCH, PUCCH, etc. in legacy LTE systems.

As described above, the present disclosure defines transmission/reception of eNB and shortened-TTI UE and provides a method of operating both legacy UE and shortened-TTI UE in the same system. In the present disclosure, normal-TTI UE performs the transmission/reception of control information and data in 1 ms or in a unit of sub-frame. The control information for normal-TTI UE may be carried by PDCCH mapped to a maximum of 3 OFDM symbols in one sub-frame or EPDCCH mapped to a specified resource block in the overall of one sub-frame. Like normal-TTI UE, shortened-TTI UE may be UE that is capable of performing the transmission/reception in a unit of sub-frame or a unit of less than a sub-frame. Shortened-TTI UE may also be UE that is capable of performing the transmission/reception only in a unit of less than a sub-frame.

In the present disclosure, the term 'shortened-TTI downlink control signal' is also called 'sPDCCH' or 'shortened-TTI PDCCH.' The term 'shortened-TTI downlink data signal' is also called 'sPDSCH' or 'shortened-TTI PDSCH.' The term 'shortened-TTI uplink data signal' is also called 'sPUSCH' or 'shortened-TTI PUSCH.' The term 'shortened-TTI uplink control signal' is also called 'sPUCCH' or 'shortened-TTI PUCCH.'

Embodiment 3-1

Embodiment 3-1 is a method of performing the transmission/reception of uplink and downlink control information and data for shortened-TTI UE transmitting/receiving 2 OFDM symbols in a TTI. More specifically, embodiment 1 provides a method for shortened-TTI UE to determine shortened-TTI mode and normal-TTI mode and a method for shortened-TTI UE to perform the transmission/reception of a shortened-TTI control signal and data, which are described, in detail, with reference to FIGS. 14, 15 and 16.

Figure 14:
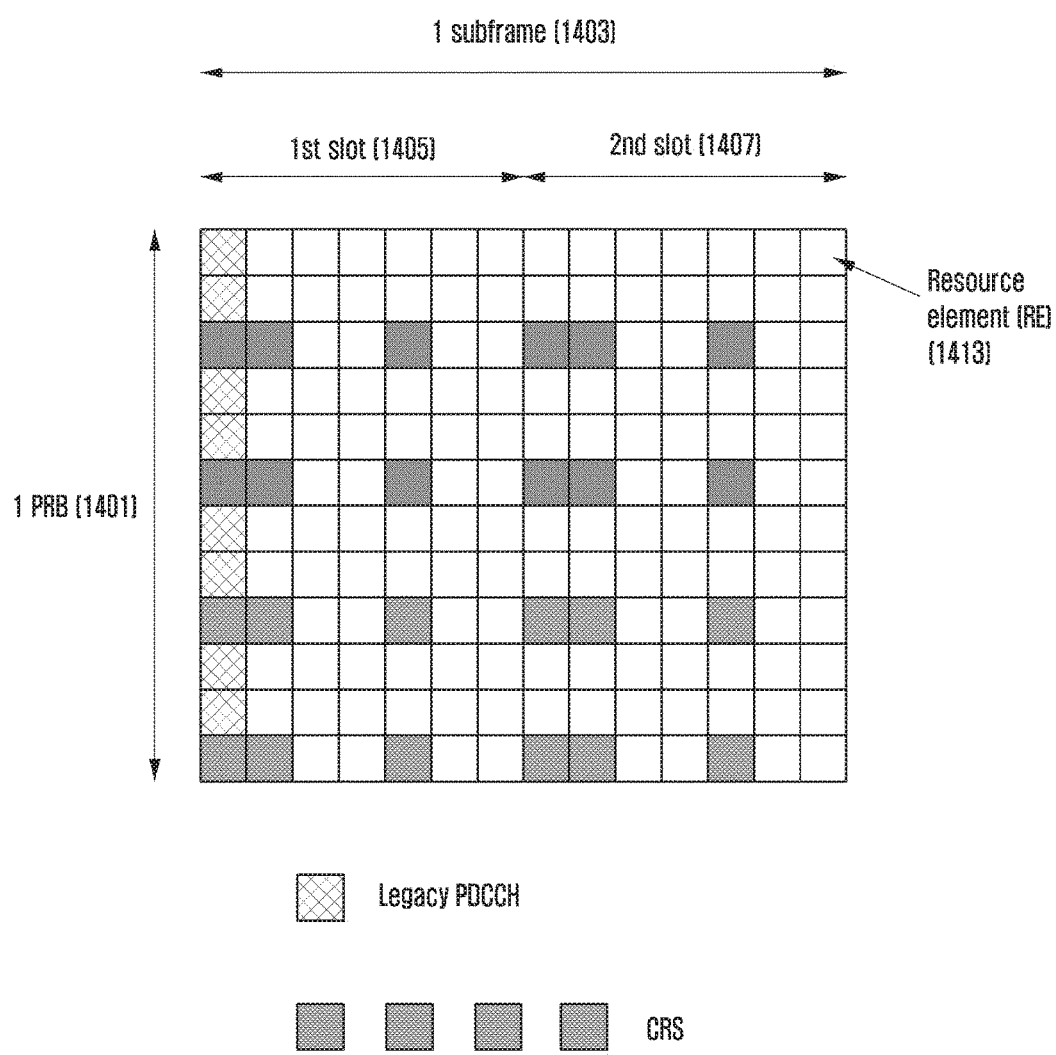
FIG. 14 is a diagram showing a structure of 1 physical resource block (PRB), in one sub-frame, as a wireless resource area transmitting a data or control channel in a downlink in an LTE or LTE-A system according to an embodiment of the present disclosure.

FIG. 14 is a diagram showing a structure of 1 PRB, in one sub-frame, as a wireless resource area transmitting a data or control channel in a downlink in an LTE or LTE-A system according to an embodiment of the present disclosure.

Referring to FIG. 14, a diagram is provided showing a basic structure of 1 PRB 1401 in the frequency domain of the time-frequency domain, as a wireless resource area, transmitting a data or control channel in the downlink in an LTE system.

In FIG. 14, the horizontal axis represents a time domain and the vertical axis represents a frequency domain. The transmission time interval of the LTE system is 1 sub-frame 1403, and is 1 ms. One sub-frame is configured with two slots 1405 and 1407, each of which includes 7 OFDM symbols. 1 PRB 1401 in the frequency domain is a set of successive 12 sub-carriers. Resource corresponding to one sub-carrier in one OFDM symbol is called RE 1413 which is a minimum unit of resource allocation in LTE systems. 1 PRB pair of one sub-frame uses 24 REs as CRS. One sub-frame contains a total of 14 OFDM symbols from which one, two or three OFDM symbol(s) are allocated for PDCCH transmission. FIG. 14 shows a diagram when 1 OFDM symbol is used for PDCCH transmission. That is, an LTE system uses a maximum of 3 OFDM symbols from the front in one sub-frame for the downlink control channel.

Figure 15:
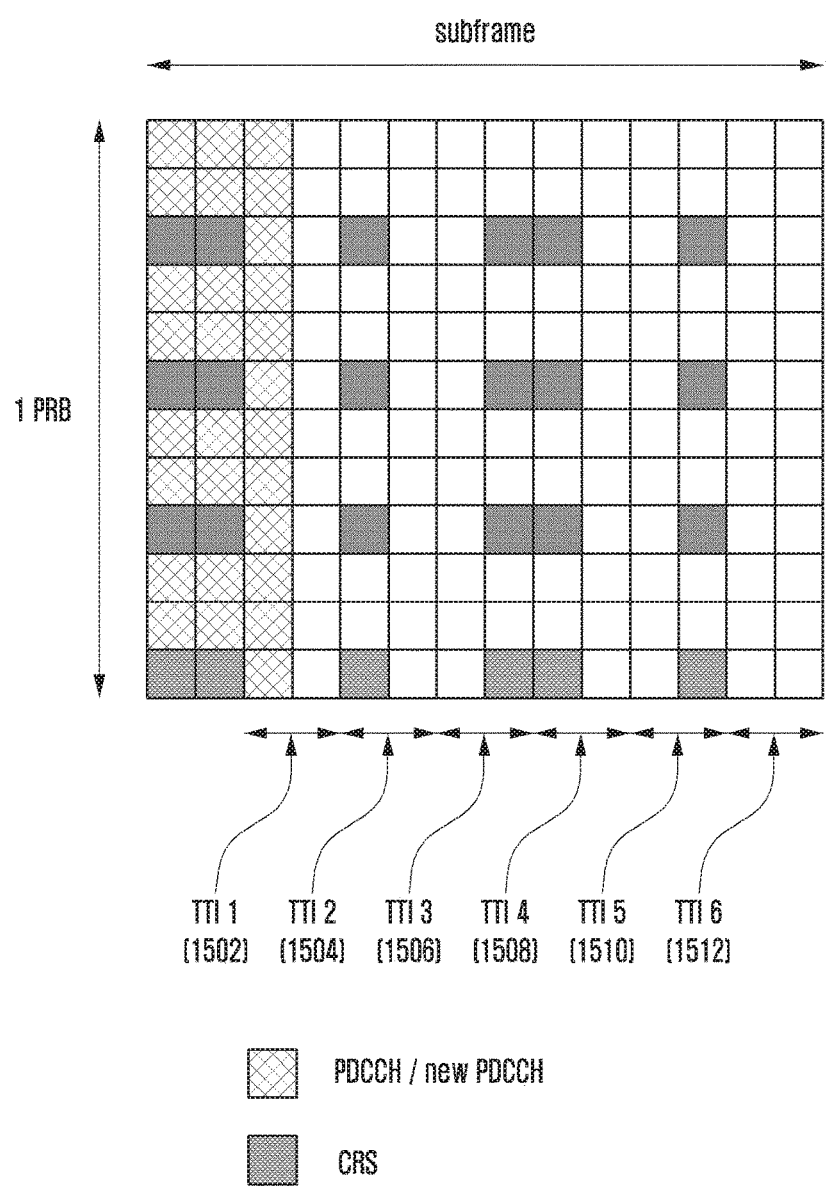
FIG. 15 is a diagram showing a transmission structure of a downlink in a transmission time interval transmission method using 2 orthogonal frequency division multiplexing (OFDM) symbols according to an embodiment of the present disclosure.

FIG. 15 is a diagram showing a transmission structure of a downlink in a transmission time interval transmission method using 2 OFDM symbols according to an embodiment of the present disclosure.

Referring to FIG. 15, a diagram is provided showing a basic structure of 1 PRB in the frequency domain of the time-frequency domain, as a wireless resource area, transmitting a data or control channel in the downlink in an LTE system, i.e., a shortened-TTI used in a shortened-TTI mode where two symbols are set as a TTI. If two symbols are set as a TTI, the $3^{rd}$ and $4^{th}$ OFDM symbols (TTI 1; 1502), $5^{th}$ and $6^{th}$ OFDM symbols (TTI 2; 1504), $7^{th}$ and $8^{th}$ OFDM symbols (TTI 3; 1506), $9^{th}$ and $10^{th}$ OFDM symbols (TTI 4; 1508), $11^{th}$ and $12^{th}$ OFDM symbols (TTI 5; 1510), are $13^{th}$ and $14^{th}$ OFDM symbols (TTI 6; 1512), in each sub-frame, are shortened-TTIs, respectively. An eNB maps a control signal and a data signal, which need to be transmitted to shortened-TTI UE, to corresponding TTIs, and transmits the signals to the UE. The shortened-TTI UE decodes the control signal or data signal in individual shortened-TTIs.

Figure 16:
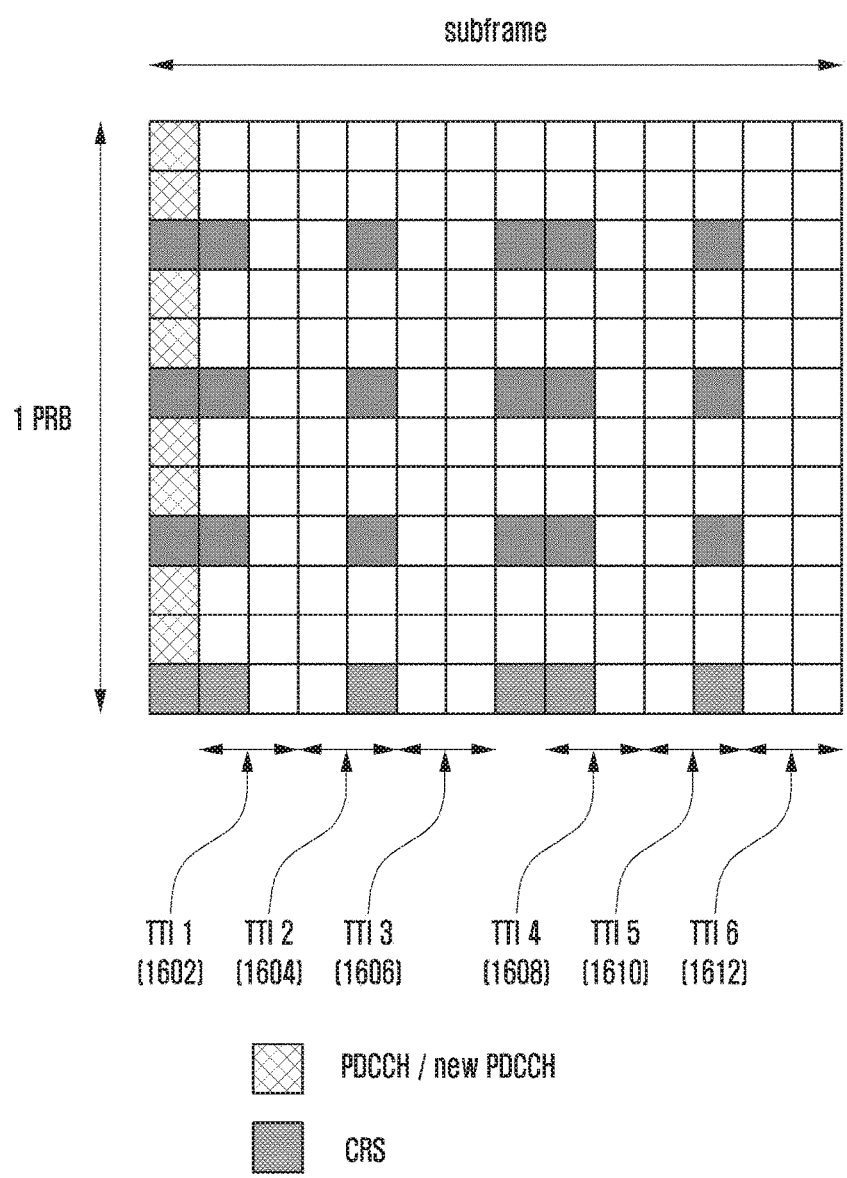
FIG. 16 is a diagram showing another example of a structure of 1 PRB forming two-symbol transmit time intervals (TTIs) in a downlink transmission using a two-symbol TTI according to an embodiment of the present disclosure.

FIG. 16 is a diagram showing another example of a structure of 1 PRB forming two-symbol TTIs in a downlink transmission using a two-symbol TTI according to an embodiment of the present disclosure.

Referring to FIG. 16, each of the slots includes OFDM symbols which are configured in such a way that every two symbols form one TTI from and after the second OFDM symbol, in order. In the first slot, TTI 1 1602, TTI 2 1604, and TTI 3 1606 are each formed by two symbols from and the second OFDM symbol. In the second slot, TTI 4 1608, TTI 5 1610, and TTI 6 1612 are each formed by two symbols from and after the second OFDM symbol. When using the configuration method, the first symbol of each slot is not used for a two-symbol TTI. The first symbol may serve as a symbol to coexist with a slot TTI.

Figure 17:
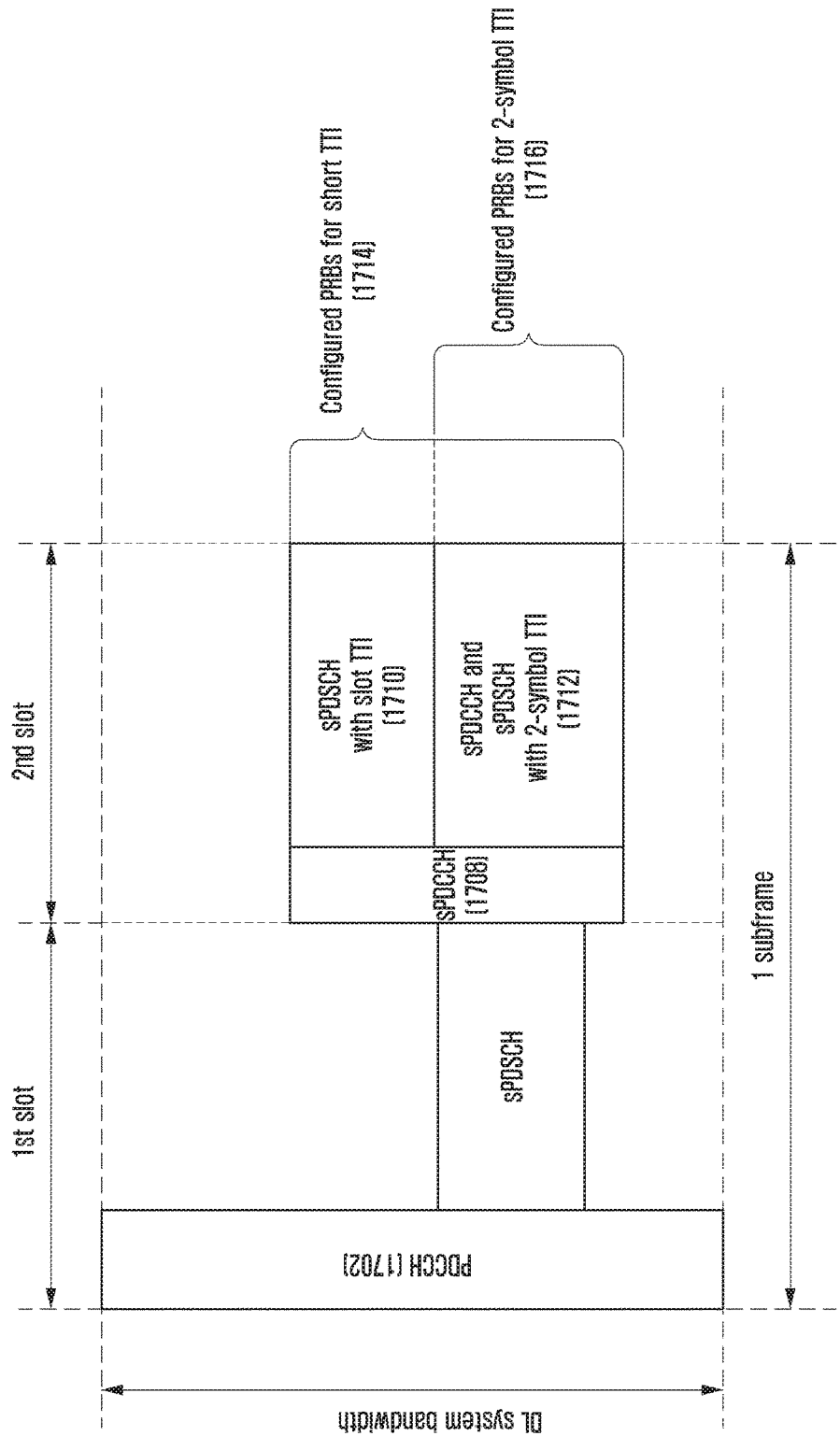
FIG. 17 is a diagram showing an example of short TTI (sTTI) transmission according to an embodiment of the present disclosure.

FIG. 17 is a diagram showing an example of short TTI (sTTI) transmission according to an embodiment of the present disclosure.

Referring to FIG. 17, in the second slot, sPDCCH 1708 occupies one OFDM symbol, and the frequency domain may be mapped in a region 1714 set to UE via higher or physical signaling. sPDCCH 1708 of the first symbol in the second slot is used for slot TTI allocation 1710. In a region 1716 set to UE via higher or physical signaling for the two-symbol TTI transmission, in the second slot, sPDCCH and sPDSCH for a two-symbol TTI 1712 may be transmitted. Alternatively, part or all of the sPDCCH for two symbols may be transmitted, in sPDCCH 1708 transmitted by the first symbol in the second slot. In the first slot, PDCCH 1702 occupies one symbol.

FIGS. 18A to 18D are diagrams showing transmission structure of an uplink in a transmission time interval transmission method using 2 SC-FDMA symbols, according to an embodiment of the present disclosure.

Referring to FIGS. 18A to 18D, diagrams are provided showing a basic structure of 1 PRB in the frequency domain of the time-frequency domain, as a wireless resource area, transmitting a uplink data or uplink control channel in the uplink in an LTE system according to various embodiments of the present disclosure, i.e., a resource used for the transmission of an uplink reference signal 1800 and a shortened-TTI used in a shortened-TTI mode where two symbols are set as a TTI.

Referring to FIG. 18A, in one sub-frame, the $1^{st}$ and $8^{th}$ SC-FDMA symbols are used as uplink reference signals 1851 and 1853, and the remaining symbols are set to TTIs of two symbols each. In this case, the $2^{nd}$ and $3^{rd}$ SC-FDMA symbols (TTI 1; 1801), $4^{th}$ and $5^{th}$ SC-FDMA symbols (TTI 2; 1803), $6^{th}$ and $7^{th}$ SC-FDMA symbols (TTI 3; 1805), $9^{th}$ and $10^{th}$ SC-FDMA symbols (TTI 4; 1807), $11^{th}$ and $12^{th}$ SC-FDMA symbols (TTI 5; 1809), and $13^{th}$ and $14^{th}$ SC-FDMA symbols (TTI 6; 1811), in each sub-frame, are shortened-TTIs, respectively. UE maps a control signal and a data signal, which need to be transmitted to a shortened-TTI eNB, to corresponding TTIs, and transmits the signals to the eNB. The shortened-TTI eNB decodes the control signal or data signal in individual shortened-TTIs.

In the embodiment, only one UE transmits the uplink reference signal via one SC-FDMA symbol or a number of UEs simultaneously transmit an uplink reference signal via the same SC-FDMA symbol. Although the embodiment is implemented in such a way that the uplink reference signals are located at the $1^{st}$ and $8^{th}$ SC-FDMA symbols, it should be understood that the uplink reference signals may also be located at any other symbols.

Referring to FIG. 18B, the uplink reference signals are located at the $3^{rd}$ and $10^{th}$ SC-FDMA symbols 1855 and 1857. The remaining symbols are set to TTIs of two symbols each. In this case, the $2^{nd}$ and $3^{rd}$ SC-FDMA symbols (TTI 1; 1813), $4^{th}$ and $5^{th}$ SC-FDMA symbols (TTI 2; 1815), $6^{th}$ and $7^{th}$ SC-FDMA symbols (TTI 3; 1817), $9^{th}$ and $10^{th}$ SC-FDMA symbols (TTI 4; 1819), $11^{th}$ and $12^{th}$ SC-FDMA symbols (TTI 5; 1821), and $13^{th}$ and $14^{th}$ SC-FDMA symbols (TTI 6; 1823).

Referring to FIG. 18C, the uplink reference signals are located at the $4^{th}$ and $11^{th}$ SC-FDMA symbols 1859 and 1861. The remaining symbols are set to TTIs of two symbols each. In this case, the $2^{nd}$ and $3^{rd}$ SC-FDMA symbols (TTI 1; 1825), $4^{th}$ and $5^{th}$ SC-FDMA symbols (TTI 2; 1827), $6^{th}$ and $7^{th}$ SC-FDMA symbols (TTI 3; 1829), $9^{th}$ and $10^{th}$ SC-FDMA symbols (TTI 4; 1831), $11^{th}$ and $12^{th}$ SC-FDMA symbols (TTI 5; 1833), and $13^{th}$ and $14^{th}$ SC-FDMA symbols (TTI 6; 1835).

Referring to FIG. 18D, the uplink reference signals are located at the $5^{th}$ and $12^{th}$ SC-FDMA symbols 1863 and 1865. The remaining symbols are set to TTIs of two symbols each, in order. In this case, the $2^{nd}$ and $3^{rd}$ SC-FDMA symbols (TTI 1; 1837), $4^{th}$ and $5^{th}$ SC-FDMA symbols (TTI 2; 1839), $6^{th}$ and $7^{th}$ SC-FDMA symbols (TTI 3; 1841), $9^{th}$ and $10^{th}$ SC-FDMA symbols (TTI 4; 1843), $11^{th}$ and $12^{th}$ SC-FDMA symbols (TTI 5; 1845), and $13^{th}$ and $14^{th}$ SC-FDMA symbols (TTI 6; 1847). In the embodiment, the shortened-TTI UE may use only one SC-FDMA symbol or two SC-FDMA symbols in order to transmit an uplink reference signal.

FIG. 19 is a diagram showing an example of a symbol location in one sub-frame where two symbols are transmitted in an uplink using a two-symbol TTI according to an embodiment of the present disclosure.

Referring to FIG. 19, the two-symbol TTI shows TTI 1 1911 and TTI 2 1913 which are sharing one uplink reference signal 1931 and one symbol. TTI 1 1911 and TTI 2 1913 may be TTIs transmitted by different UEs or by one UE. When TTI 1 1911 and TTI 2 1913 are transmitted by different UEs, sequences or cyclic shift values, used to create reference signals, set to different values, so that an eNB can identify reference signals transmitted from different UEs at the same symbol location. Similarly, TTI 3 1915 and TTI 4 1917 share one uplink reference signal 1933 and one symbol; TTI 5 1919 and TTI 6 1921 share one uplink reference signal 1935 and one symbol; and TTI 7 1923 and TTI 8 1925 share one uplink reference signal 1937 and one symbol. The last TTI 9 1927 may use the symbol as an uplink reference signal 1939.

Although embodiment 1, with reference to FIGS. 17, 18A to 18D, and 19, describes downlink and uplink TTIs using two symbols at a preset location, it should be understood that the present disclosure is not limited thereto. Embodiment 3-1 may be modified in such a way that the transmission of data or downlink control signals uses transmission start locations of two-symbol TTIs according to the settings transmitted from an eNB by a physical layer signal or via higher signaling.

Alternatively, embodiment 3-1 may also be modified in such a way that the transmission of data or uplink control signals uses: transmission start locations of two-symbol TTIs: sequences and symbol locations of uplink reference signals to be used; and cyclic shift values, according to the settings transmitted from an eNB by a physical layer signal or via higher signaling. In the embodiment and modifications, not both of downlink and uplink need to use two-symbol TTIs. That is, downlink uses a two-symbol TTI; however uplink corresponding to the downlink may use a four-symbol TTI. The expression 'uplink corresponding to downlink' may be referred to 'uplink data transmission,' according to uplink scheduling information transmitted in the downlink or HARQ feedback in response to downlink data.

Embodiment 3-2

Embodiment 2 is a method of performing the transmission/reception of uplink and downlink control information and data for shortened-TTI UE transmitting/receiving 3 OFDM symbols in a TTI. More specifically, embodiment 2 provides a method for shortened-TTI UE to determine shortened-TTI mode and normal-TTI mode and a method for shortened-TTI UE to perform the transmission/reception of a shortened-TTI control signal and data, which are described, in detail, with reference to FIGS. 20, 21A and 21B.

Figure 20:
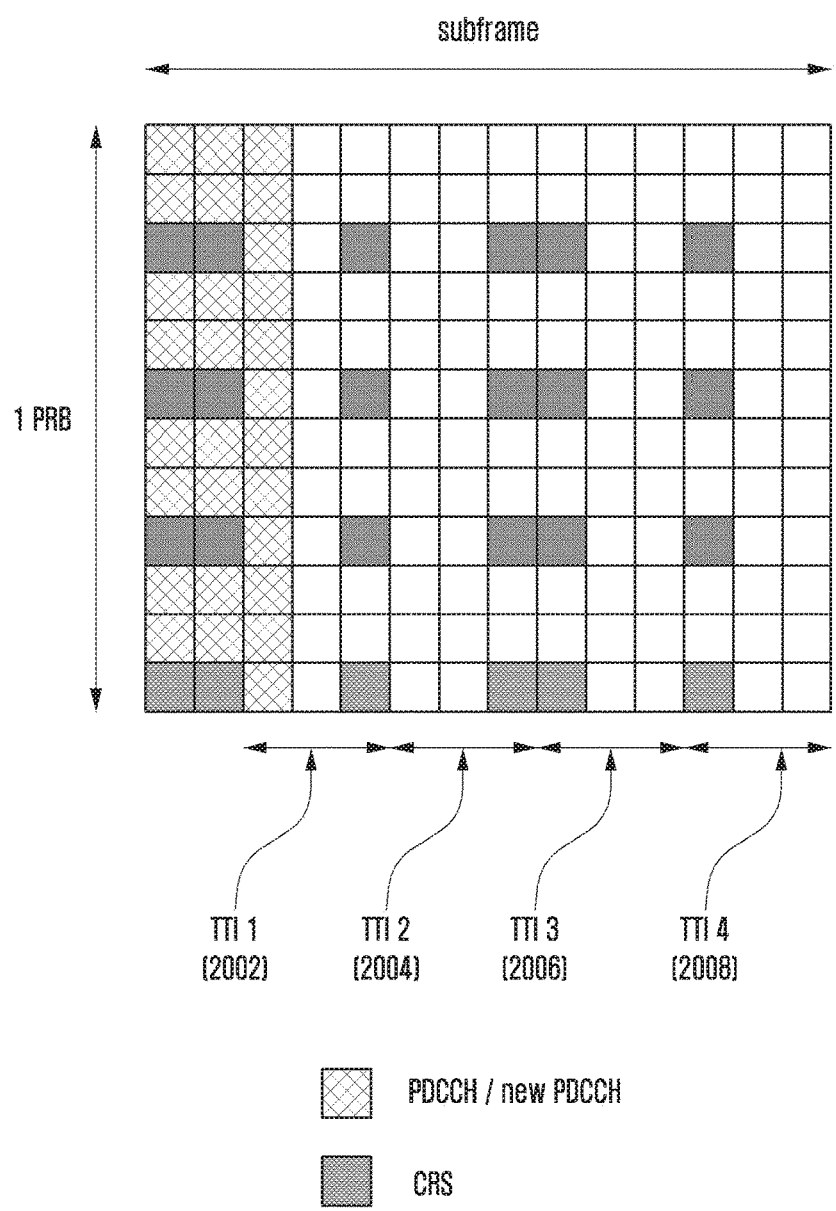
FIG. 20 is a diagram showing transmission structure of a downlink in a transmission time interval transmission method using 3 OFDM symbols according to an embodiment of the present disclosure.

FIG. 20 is a diagram showing transmission structure of a downlink in a transmission time interval transmission method using 3 OFDM symbols, according to an embodiment of the present disclosure.

Referring to FIG. 20, a diagram is provided showing a basic structure of 1 PRB in the frequency domain of the time-frequency domain, as a wireless resource area, transmitting a data or control channel in the downlink in an LTE system, i.e., a shortened-TTI used in a shortened-TTI mode where three symbols are set as a TTI. If three symbols are set as a TTI, the 3rd, 4th, and 5th OFDM symbols (TTI 1; 2002), 6th, 7th, and 8th OFDM symbols (TTI 2; 2004), 9th, 10th, and 11th OFDM symbols (TTI 3; 2006), and 12th, 13th, and 14th OFDM symbols (TTI 4; 2008), in each sub-frame, are shortened-TTIs, respectively. An eNB maps a control signal and a data signal, which need to be transmitted to shortened-TTI UE, to corresponding TTIs, and transmits the signals to the UE. The shortened-TTI UE decodes the control signal or data signal in individual shortened-TTIs.

Figure 21:
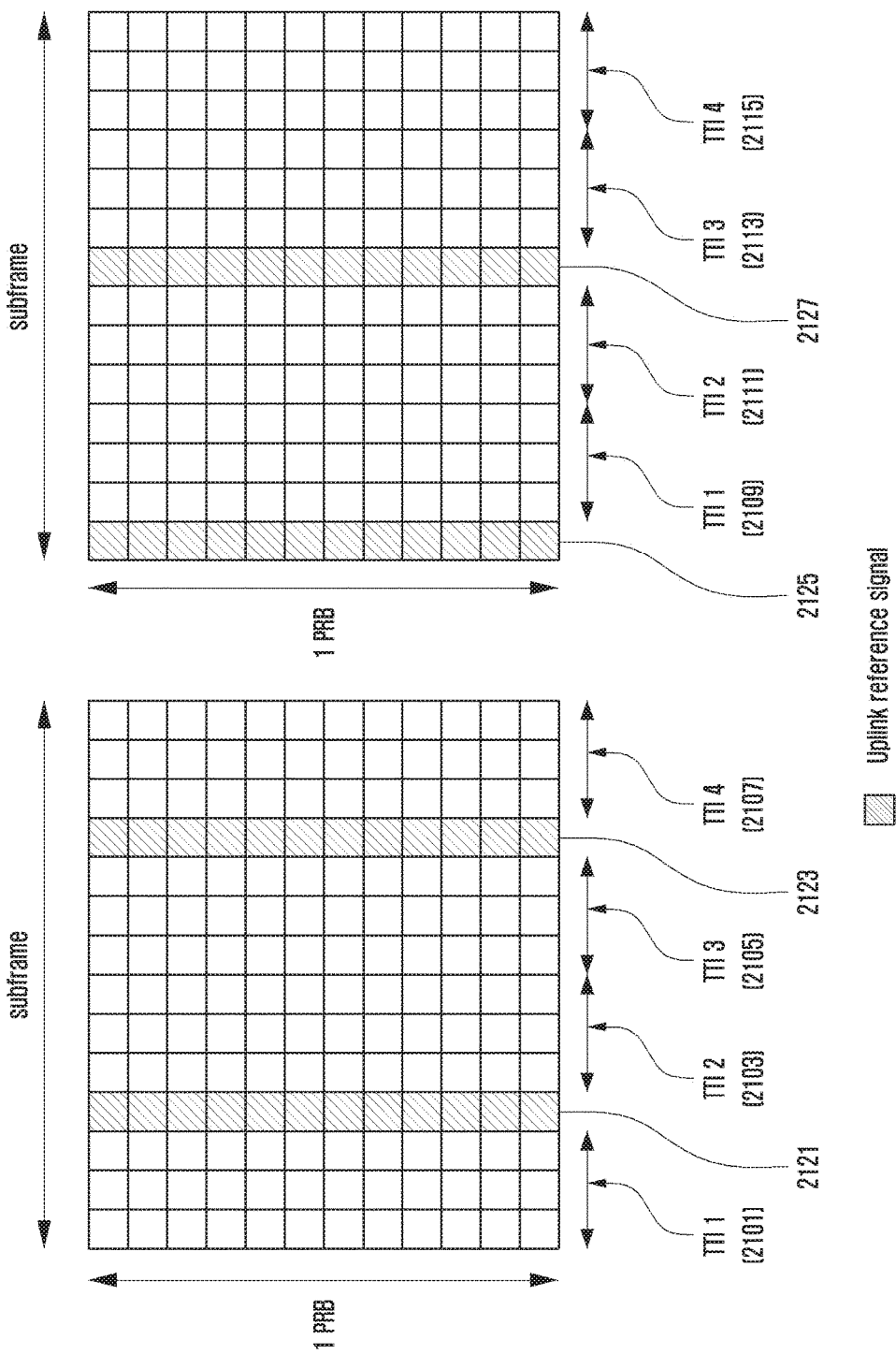
FIGS. 21A and 21B are diagrams showing transmission structure of an uplink in a transmission time interval transmission method using 3 SC-FDMA symbols according to an embodiment of the present disclosure.

FIGS. 21A and 21B are diagrams showing transmission structure of an uplink in a transmission time interval transmission method using 3 SC-FDMA symbols according to various embodiments of the present disclosure.

Referring to FIGS. 21A and 21B, a diagram is provided showing a basic structure of 1 PRB in the frequency domain of the time-frequency domain, as a wireless resource area, transmitting a uplink data or uplink control channel in the uplink in an LTE system, i.e., a resource used for the transmission of an uplink reference signal and a shortened-TTI used in a shortened-TTI mode where three symbols are set as a TTI.

Referring to FIG. 21A, in one sub-frame, the 4th and 11th SC-FDMA symbols 2121 and 2123 are used as uplink reference signals and the remaining symbols are set to TTIs of three symbols each. In this case, the 1st, 2nd, and 3rd SC-FDMA symbols (TTI 1; 2101), 5th, 6th, and 7th SC-FDMA symbols (TTI 2; 2103), 8th, 9th, and 10th SC-FDMA symbols (TTI 3; 2105), and 12th, 13th, and 14th SC-FDMA symbols (TTI 4; 2107), in individual sub-frames, are shortened-TTIs, respectively. UE maps a control signal and a data signal, which need to be transmitted to a shortened-TTI eNB, to corresponding TTIs, and transmits the signals to the eNB. The shortened-TTI eNB decodes the control signal or data signal in individual shortened-TTIs.

In the embodiment, only one UE transmits an uplink reference signal via one SC-FDMA symbol or a number of UEs simultaneously transmit an uplink reference signal via the same SC-FDMA symbol. When a number of UEs simultaneously transmit, to an eNB, uplink reference signals in the same symbol, the UEs may set reference signal sequences or cyclic shift values to different values according to UEs and transmit the set values, so that the eNB can identify reference signals of the UEs. Setting the reference signal sequences or cyclic shift values to different values is performed via higher signaling or the setting information may be transmitted by a physical layer signal. Although the embodiment is implemented in such a way that the uplink reference signals are located at the 4th and 11th SC-FDMA symbols 2121 and 2123, it should be understood that the uplink reference signals may also be located at any other symbols.

Referring to FIG. 21B, the uplink reference signals are located at the 1st and 8th SC-FDMA symbols 2125 and 2127, and the remaining symbols are set to TTIS of three symbols each, in order. In this case, the 1st, 2nd, and 3rd SC-FDMA symbols (TTI 1; 2109), 5th, 6th, and 7th SC-FDMA symbols (TTI 2; 2111), 8th, 9th, and 10th SC-FDMA symbols (TTI 3; 2113), and 12th, 13th, and 14th SC-FDMA symbols (TTI 4; 2115), in individual sub-frames, are shortened-TTIs, respectively. Although the embodiment of FIGS. 21A and 21B are described using a term 'three-symbol TTI,' since UE actually transmits four symbols including an uplink reference signal, uplink may also be called four-symbol TTI. For example, as shown in FIGS. 21A and 21B, four symbols, reference numbers 2101 to 2121, may be defined as TTI 1; four symbols, reference numbers 2121 to 2103, may be defined as TTI2; four symbols, reference numbers 2105 to 2123, may be defined as TTI3; and four symbols, reference numbers 2123 and 2107, may be defined as TTI 4.

Although embodiment 3-2, with reference to FIGS. 20, 21A and 21B, describe downlink and uplink TTIs using three symbols at a preset location, it should be understood that the present disclosure is not limited thereto. Embodiment 3-2 may be modified in such a way that the transmission of data or downlink control signals uses transmission start locations of three-symbol TTIs according to the settings transmitted from an eNB by a physical layer signal or via higher signaling.

Alternatively, embodiment 3-2 may also be modified in such a way that the transmission of data or uplink control signals uses: transmission start locations of three-symbol TTIs: sequences and symbol locations of uplink reference signals to be used; and cyclic shift values, according to the settings transmitted from an eNB by a physical layer signal or via higher signaling. In the embodiment and modifications, not both of downlink and uplink need to use three-symbol TTIs. That is, downlink uses a two-symbol TTI; however uplink corresponding to the downlink may use a three-symbol TTI. The expression 'uplink corresponding to downlink' may be referred to 'uplink data transmission,' according to uplink scheduling information transmitted in the downlink or HARQ feedback in response to downlink data.

Embodiment 3-3

Embodiment 3-3 is a method of performing the transmission/reception of uplink and downlink control information and data for shortened-TTI UE transmitting/receiving 4 OFDM symbols in a TTI. More specifically, embodiment 3 provides a method for shortened-TTI UE to determine shortened-TTI mode and normal-TTI mode and a method for shortened-TTI UE to perform the transmission/reception of a shortened-TTI control signal and data, which are described, in detail, with reference to FIGS. 8 and 9.

Figure 22:
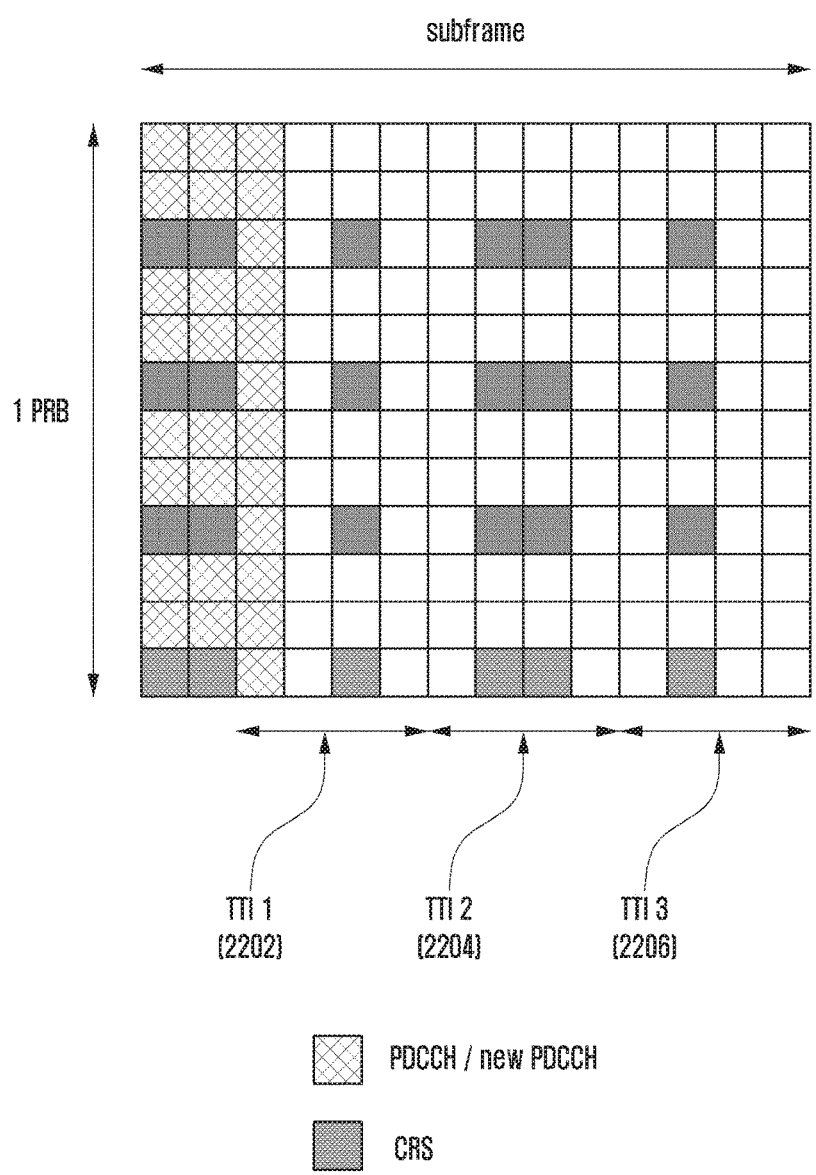
FIG. 22 is a diagram showing transmission structure of a downlink in a transmission time interval transmission method using 4 OFDM symbols according to an embodiment of the present disclosure.

FIG. 22 is a diagram showing transmission structure of a downlink in a transmission time interval transmission method using 4 OFDM symbols according to an embodiment of the present disclosure.

Referring to FIG. 22, a diagram is provided showing a basic structure of 1 PRB in the frequency domain of the time-frequency domain, as a wireless resource area, transmitting a data or control channel in the downlink in an LTE system, i.e., a shortened-TTI used in a shortened-TTI mode where four symbols are set as a TTI. If four symbols are set as a TTI, the 3rd, 4th, 5th, and 6th OFDM symbols (TTI 1; 2202), 7th, 8th, 9th, and 10th OFDM symbols (TTI 2; 2204), and 11th, 12th, 13th, and 14th OFDM symbols (TTI 3; 2206), in individual sub-frames, are shortened-TTIs, respectively. An eNB maps a control signal and a data signal, which need to be transmitted to shortened-TTI UE, to corresponding TTIs, and transmits the signals to the UE. The shortened-TTI UE decodes the control signal or data signal in individual shortened-TTIs.

FIGS. 23A and 23B are diagrams showing transmission structure of an uplink in a transmission time interval transmission method using 4 SC-FDMA symbols according to various embodiments of the present disclosure.

Referring to FIGS. 23A and 23B, diagrams are provided showing a basic structure of 1 PRB in the frequency domain of the time-frequency domain, as a wireless resource area, transmitting a uplink data or uplink control channel in the uplink in an LTE system, i.e., a resource used for the transmission of an uplink reference signal and a shortened-TTI used in a shortened-TTI mode where four symbols are set as a TTI.

Referring to FIG. 23A, in one sub-frame, the 1st and 8th SC-FDMA symbols 2321 and 2323 are used as uplink reference signals and the remaining symbols are set to TTIs of four symbols each. In this case, the 2nd, 3rd, 4th, and 5th SC-FDMA symbols (TTI 1; 2301), 6th, 7th, 9th, and 10th SC-FDMA symbols (TTI 2; 2303), and 11th, 12th, 13th, and 14th SC-FDMA symbols (TTI 3; 2305), in individual sub-frames, are shortened-TTIs, respectively. UE maps a control signal and a data signal, which need to be transmitted to a shortened-TTI eNB, to corresponding TTIs, and transmits the signals to the eNB. The shortened-TTI eNB decodes the control signal or data signal in individual shortened-TTIs. In the embodiment, only one UE transmits an uplink reference signal via one SC-FDMA symbol or a number of UEs simultaneously transmit an uplink reference signal via the same SC-FDMA symbol. Although the embodiment is implemented in such a way that the uplink reference signals are located at the 1st and 8th SC-FDMA symbols 2321 and 2323, it should be understood that the uplink reference signals may also be located at any other symbols.

Referring to FIG. 23B, the uplink reference signals are located at the 5th and 10th SC-FDMA symbols 2325 and 2327, and the remaining symbols are set to TTIS of four symbols each, in order. In this case, the 2nd, 3rd, 4th, and 5th SC-FDMA symbols (TTI 1; 2307), 6th, 7th, 9th, and 10th SC-FDMA symbols (TTI 2; 2309), and 11th, 12th, 13th, and 14th SC-FDMA symbols (TTI 3; 2311), in individual sub-frames, are shortened-TTIs, respectively.

Although embodiment 3-3, with reference to FIGS. 22, 23A and 23B, describes downlink and uplink TTIs using four symbols at a preset location, it should be understood that the present disclosure is not limited thereto. Embodiment 3-3 may be modified in such a way that the transmission of data or downlink control signals uses transmission start locations of four-symbol TTIs according to the settings transmitted from an eNB by a physical layer signal or via higher signaling.

Alternatively, embodiment 3-3 may also be modified in such a way that the transmission of data or uplink control signals uses: transmission start locations of four-symbol TTIs: sequences and symbol locations of uplink reference signals to be used; and cyclic shift values, according to the settings transmitted from an eNB by a physical layer signal or via higher signaling. In the embodiment and modifications, not both of downlink and uplink need to use four-symbol TTIs. That is, downlink uses a two-symbol TTI; however uplink corresponding to the downlink may use a four-symbol TTI. The expression 'uplink corresponding to downlink' may be referred to 'uplink data transmission,' according to uplink scheduling information transmitted in the downlink or HARQ feedback in response to downlink data.

Embodiment 3-4

Embodiment 3-4 provides methods of determining transmission timing of HARQ ACK/NACK feedback in shortened-TTI transmission as described above in embodiments 3-1, 3-2 and 3-3. More specifically, embodiment 4 provides a method of determining an uplink resource for the transmission of an HARQ ACK/NACK signal in response to the transmission of data for downlink shortened-TTI and a method of determining a downlink resource for the transmission of an HARQ ACK/NACK signal in response to the transmission of data for uplink shortened-TTI.

The number of shortened TT in one sub-frame, in embodiments 3-1, 3-2 and 3-3, is 6, 4, and 3, according to the length of TTI, respectively. In the following description, the $m^{th}$ TTI of sub-frame n is expressed as TTI n_m. HARQ ACK/NACK feedback of data for downlink shortened-TTI, transmitted in a TTI n_m, is transmitted in the uplink in the $m^{th}$ TTI of the $(n+1)^{th}$ sub-frame, i.e., a TTI (n+1)_m. HARQ ACK/NACK feedback of data for uplink shortened-TTI, transmitted in a TTI n_m, is transmitted in the downlink in a TTI (n+1)_m.

Transmission timing of HARQ ACK/NACK feedback of data for shortened-TTI corresponding to the TTI n_m is set to TTI (n+1)_m, and may be easily set to TTI (n+2)_m, TTI (n+3)_m, etc. If MBSFN sub-frame is set or a TDD system is used, HARQ ACK/NACK feedback may not be transmitted in a TTI (n+1)_m. In this case, the transmission timing of HARQ ACK/NACK feedback may be determined as follows. HARQ ACK/NACK of data for downlink shortened-TTI transmitted in a TTI n_m uses a TTI corresponding to the smallest value of k, among the TTI (n+k)_m which can be transmitted in uplink wherein k={1, 2, 3, . . . }.

Alternatively, HARQ ACK/NACK of data for uplink shortened-TTI transmitted in a TTI n_m uses a TTI corresponding to the smallest value of k, among the TTI (n+k)_m which can be transmitted in downlink wherein k={1, 2, 3, . . . }. For example, in a state where an FDD LTE system transmits uplink data for shortened-TTI in a TTI n_m, if the $(n+1)^{th}$ sub-frame is set to an MBSFN sub-frame and $(n+2)^{th}$ sub-frame is not set to an MBSFN sub-frame, HARQ ACK/NACK feedback of uplink data for shortened-TTI that has been transmitted in a TTI n_m is transmitted in the downlink in a TTI (n+2)_m.

Alternatively, in a state where a TDD LTE system uses uplink-downlink configuration 0, if a TTI n_m corresponds to sub-frame 2 in one frame, HARQ ACK/NACK of uplink data for shortened-TTI that has been transmitted in a TTI n_m is transmitted in the downlink in a TTI (n+3)_m. This is because a TTI (n+1)_m and a TTI (n+2)_m are set to uplink.

Embodiment 3-5

Embodiment 3-5 provides a method of designing and transmitting a downlink control signal in shortened-TTI downlink transmission described above in embodiments 3-1, 3-2 and 3-3. More specifically, embodiment 5 provides a method for an eNB to transmit, to shortened-TTI UE, a control signal for the shortened-TTI transmission and a method for UE to receive the control signal and to perform the shortened-TTI operation, which are described, in detail, with reference to FIGS. 10 and 11.

An eNB divides a control channel for corresponding data into two types of channel and transmits data for shortened-TTI. A first control channel for shortened-TTI (or a first shorter-TTI control channel) is mapped to an existing PDCCH region and then is used for the transmission. Therefore, the first control channel for shortened-TTI performs the transmission only once in one sub-frame. To this end, downlink control information (DCI) transmitted via the first control channel for shortened-TTI may contain the following information.

Resource allocation type 0/1 flag: notify that a resource allocation scheme is type 0 or type 1.

Type 0 indicates that resources are allocated in a unit of resource block group (RBG) by using a bitmap scheme. In LTE systems, a basic unit of scheduling is a RB expressed by time and frequency domain resources, and one RBG is configured to include a number of RBs and is a basic unit of scheduling in the scheme of type 0. Type 1 indicates that a specified RB is allocated in an RBG.

Resource block assignment: notify RBs allocated for the transmission of data for shortened-TTI.

Resources are determined according to a system bandwidth and a resource allocation scheme. If a first control channel for shortened-TTI contains resource block assignment information, the assigned resource block is used to transmit data for shortened-TTI in a corresponding sub-frame.

MCS: notify a modulation scheme used for the data transmission and the size of transport block as data to be transmitted.

TPC command for the transmission of uplink control channel for shortened-TTI: notify a TPC command for an uplink control channel.

The first control channel for shortened-TTI is transmitted from an existing PDCCH region and the second control channel for shortened-TTI is transmitted in each shortened-TTI.

Figure 24:
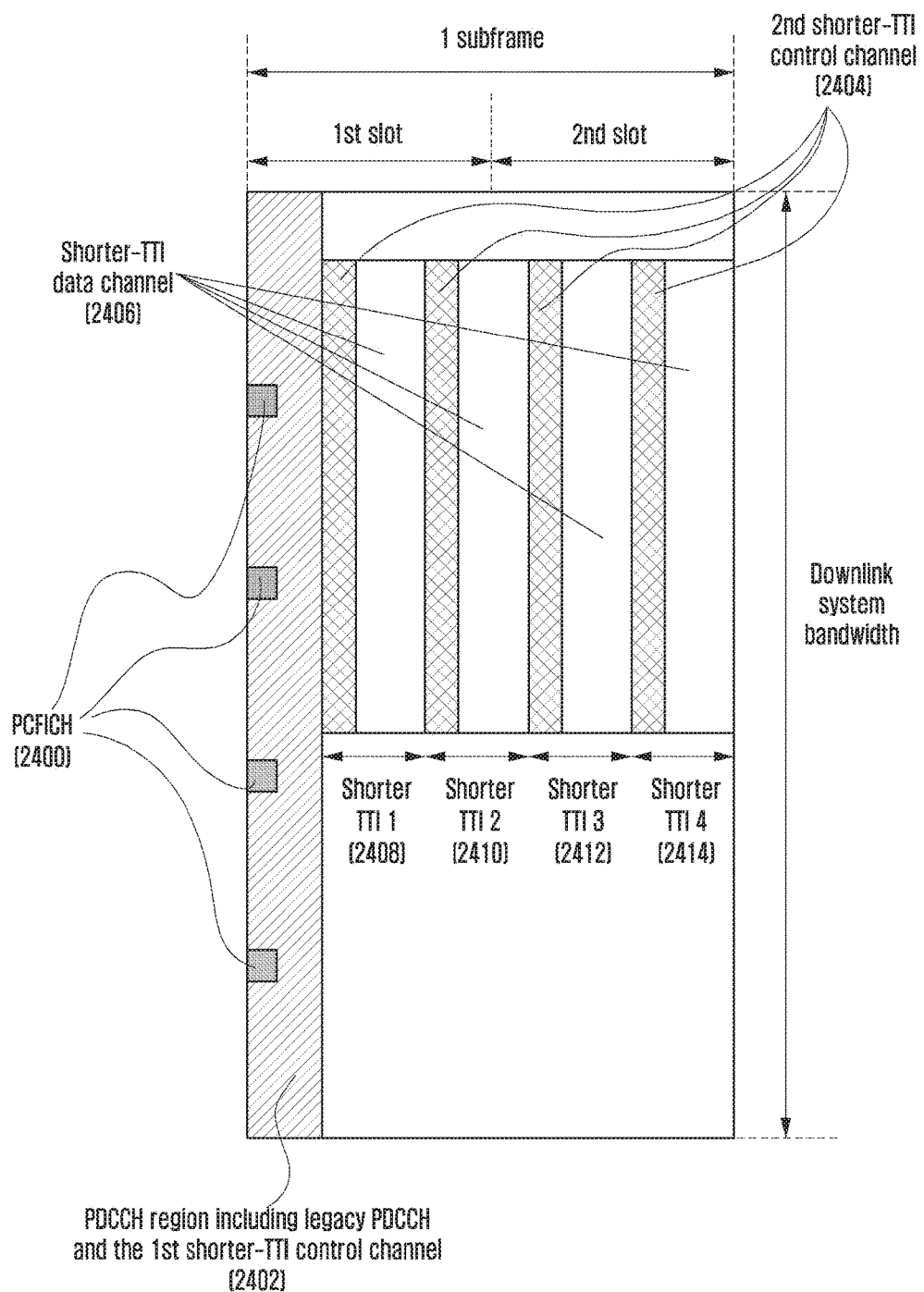
FIG. 24 is a diagram that describes a method of allocating a downlink control channel resource in a transmission time interval less than a sub-frame according to an embodiment of the present disclosure.

FIG. 24 is a diagram that describes a method of allocating a downlink control channel resource in a transmission time interval less than a sub-frame, according to an embodiment of the present disclosure.

Referring to FIG. 24, a diagram is provided of an embodiment when one sub-frame contains 4 shortened-TTIs and a second control channel for shortened-TTI exists in the first OFDM symbol of each shortened-TTI. Although the embodiment shown in FIG. 24 is implemented in such a way that only a second control channel for shortened-TTI is transmitted via the first OFDM in each shortened-TTI, it should be understood that data for shortened-TTI may also be transmitted via the first OFDM symbol. The second control channel for shortened-TTI may contain downlink control information as follows.

HARQ process number: notify an HARQ process number.
New data indicator: notify whether transmission is HARQ initial transmission or re-transmission.
Redundancy version: notify a redundancy version of HARQ.
MCS: notify a modulation scheme used for the data transmission and the size of transport block as data to be transmitted.

MCS information may be contained in a first control channel for shortened-TTI. Alternatively, MCS information may also be contained in a second control channel for shortened-TTI.

Similar to a legacy LTE and LTE-A system, UE supporting the shortened-TTI transmission decodes PCFICH 2400 and PHICH in the first OFDM symbol of each sub-frame. After that, UE decodes the first control channel for shortened-TTI in an existing PDCCH region 2402. If UE succeeds in decoding the first control channel for shortened-TTI and obtains control information for shortened-TTI, it decodes a second control channel for shortened-TTI 2404 in individual shortened-TTIs 2408, 2410, 2412, and 2414 of a corresponding sub-frame. If UE fails in decoding the first control channel for shortened-TTI 2402, it ascertains that no shortened-TTI operation exists in a corresponding sub-frame and decodes a control channel for normal-TTI in an existing PDCCH region. If UE decodes the second control channel for shortened-TTI 2404 and obtains the second control information for shortened-TTI, it receives data for shortened-TTI 2406 according to control information obtained in a corresponding shortened-TTI.

FIG. 24 is a diagram that describes a method of allocating a downlink control channel resource in a transmission time interval less than a sub-frame, according to an embodiment of the present disclosure. Specifically, FIG. 24 is a diagram when a second shortened-TTI control channel 2404 is mapped to an OFDM symbol in the front part of each of the shorter-TTIs 2408, 2410, 2412 and 2414.

Figure 25:
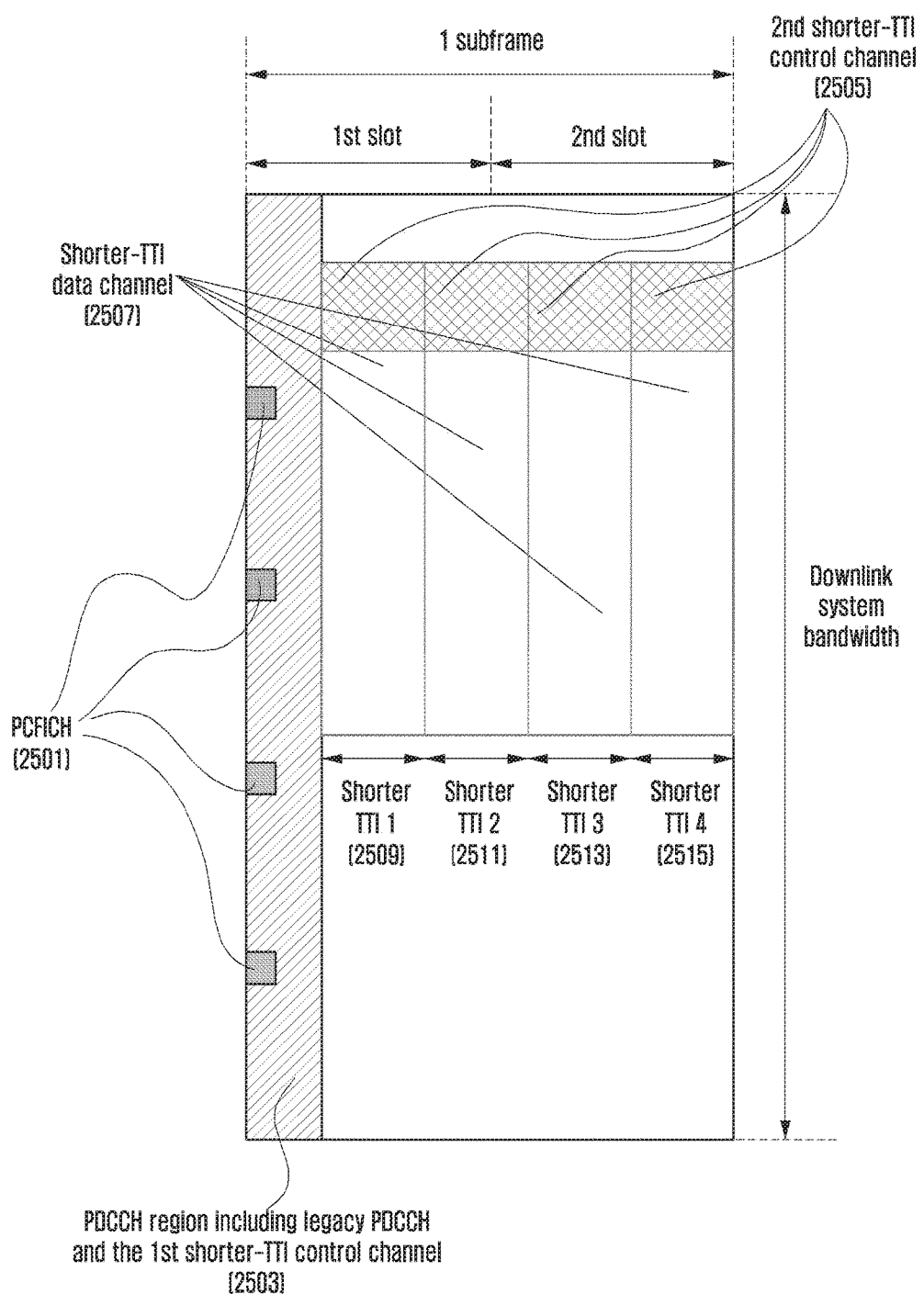
FIG. 25 is a diagram that describes a method of allocating a downlink control channel resource in a transmission time interval less than a sub-frame according to an embodiment of the present disclosure.

FIG. 25 is also a diagram that describes a method of allocating a downlink control channel resource in a transmission time interval less than a sub-frame, according to an embodiment of the present disclosure.

Referring to FIG. 25, a diagram describes when a second shortened-TTI control channel 2505 is mapped to a specified frequency band in each of shorter-TTIs 2509, 2511, 2513, and 2515 according to an embodiment of the present disclosure.

The shortened-TTI UE decodes downlink control information in common search space and UE-specific search space in an existing PDCCH region, shortened-TTI control channels for the respective spaces, or a shortened-TTI control channel only in UE-specific search space. UE supporting the shortened-TTI transmission decodes PCFICH 2501. After that, UE decodes the first control channel for shortened-TTI in an existing PDCCH region 2503. If UE decodes the second control channel for shortened-TTI 2505 and obtains the second control information for shortened-TTI, it receives data for shortened-TTI 2507.

Embodiment 3-6

Embodiment 6 provides a method related to the reception of downlink control signals of UE and an eNB for the shortened-TTI transmission. More specifically, embodiment 6 provides a method for an eNB to transmit, to shortened-TTI UE, a control signal for the shortened-TTI transmission, and a method for UE to receive the control signal and to perform the shortened-TTI operation, which are described, in detail, with reference to FIGS. 12 and 13.

Figure 26:
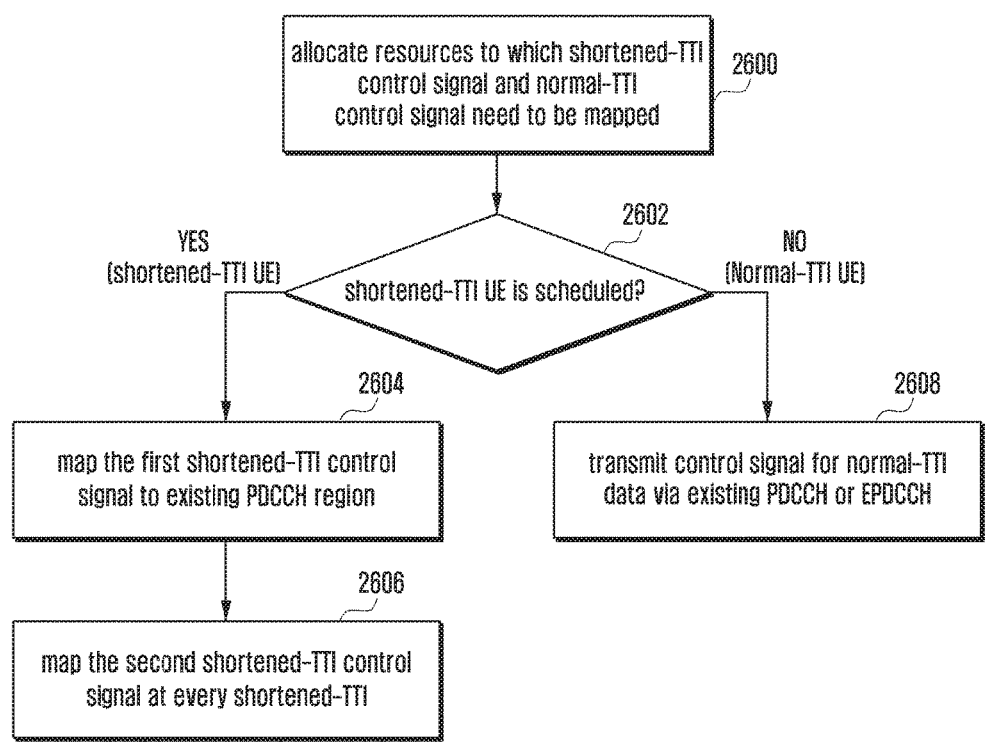
FIG. 26 is a flowchart that describes a method of mapping control signals by an eNB supporting shortened-TTI transmission according to an embodiment of the present disclosure.

FIG. 26 is a flowchart that describes a method of mapping control signals by an eNB supporting shortened-TTI transmission according to an embodiment of the present disclosure.

Referring to FIG. 26, the eNB allocates resources for shortened-TTI transmission and normal-TTI transmission in operation 2600, and determines whether a corresponding control signal is a signal for shortened-TTI in operation 2602. If a corresponding control signal is a signal for shortened-TTI in operation 2602, the eNB maps the first shortened-TTI control signal to an existing PDCCH region and transmits the result in operation 2604. The eNB maps a second shortened-TTI control signal to every short transmission time interval that is created after operation 2604 in the same sub-frame, and transmits the result in operation 2606. If a corresponding control signal is a signal for normal-TTI in operation 2602, the eNB transmits the signal to UE using an existing PDCCH or EPDCCH in operation 2608. The first shortened-TTI control signal may be transmitted via one or more of the following: common cells that all UE can perform reception from; a group that only specified UEs can perform reception from; and a specified UE that can perform reception.

Figure 27:
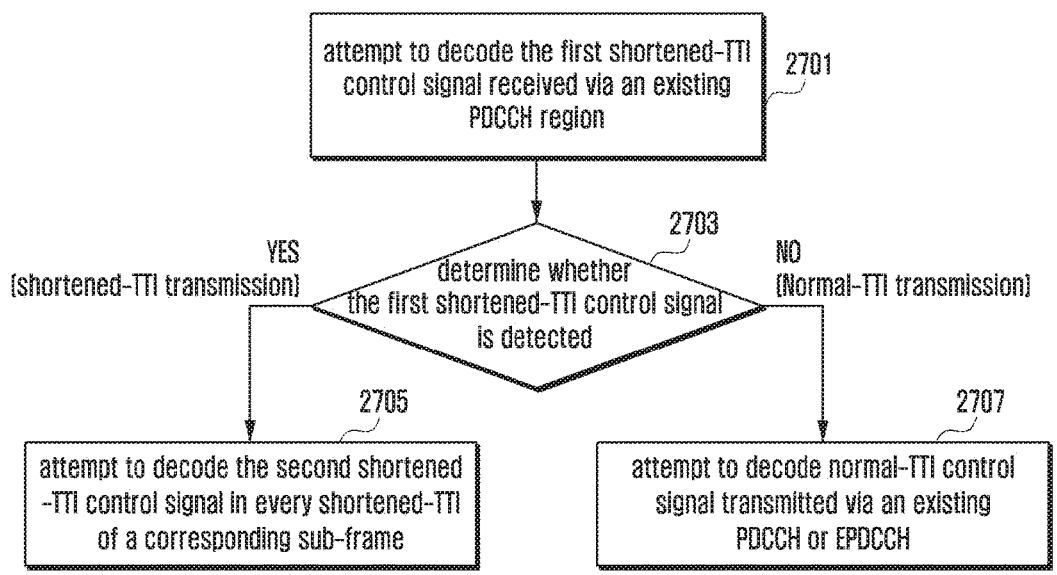
FIG. 27 is a flowchart that describes a method of receiving control signals by UE supporting shortened-TTI transmission according to an embodiment of the present disclosure.

FIG. 27 is a flowchart that describes a method of receiving control signals by UE supporting shortened-TTI transmission according to an embodiment of the present disclosure.

Referring to FIG. 27, UE supporting shortened-TTI transmission decodes the first shortened-TTI control signal in a PDCCH region of every sub-frame in operation 2701. UE determines whether it detects the first shortened-TTI control signal in operation 2703. If UE detects the first shortened-TTI control signal in operation 2703, it decodes the second shortened-TTI control signal in part or all of the shortened-TTI in a corresponding sub-frame in operation 2705. If UE does not detect the first shortened-TTI control signal in an existing PDCCH region in operation 2703, it decodes a normal-TTI control signal transmitted via an existing PDCCH or EPDCCH in operation 2707.

Embodiment 3-7

Embodiment 7 is a method of calculating transport block size (TBS), the number of bits in information included in one code word, when an eNB and UE transmits data to each other. Embodiment 3-7 is described with reference to FIGS. 16 and 17.

FIG. 30 is a table for determining TBS indexes set according to MCS values in a LTE system according to an embodiment of the present disclosure.

Referring to FIG. 30, if MCS index is 10, a corresponding TBS index is 9.

FIGS. 31A and 31B is a table for determining TBS according to TBS indexes and a number of PRBs allocated to UE in an LTE system according to an embodiment of the present disclosure.

Referring to FIGS. 31A and 31B, for example, if the number of PRBs allocated to a specified UE is 25 and the used MCS index is 9, TBS is 4008.

Tables of FIGS. 31A and 31B are related to a method of calculating TSB when data is transmitted in a unit of sub-frame. A method needs to be newly defined that calculates TBS when data is transmitted in a shortened-TTI mode. If a unit of TTI is a slot, 2 OFDM symbols, one OFDM symbol, etc., instead of a sub-frame, and has a length of less than a sub-frame, a value of the number of PRBs is calculated by the following Equation 3, and used for a TBS.

$$N_{PRB} = \max\{\lfloor N_{PRB}' \times \alpha \rfloor, 1\} \quad \text{Equation 3}$$

In Equation 3, NPRB' denotes the number of PRBs actually allocated to UE. NPRB denotes a value which is calculated by Equation 3 and is used to obtain a TBS. For example, NPRB is used to find a TBS, referring to Tables shown in FIGS. 30, 31A and 31B.

In Equation 3, max {a, b} is the larger one of a and b. $\lfloor \alpha \rfloor$ is a maximum integer less than or equal to a value of a. $\lceil \alpha \rceil$ is a minimum integer greater than or equal to a value of a. In Equation 3, $\lfloor \alpha \rfloor$ may be replaced with $\lceil \alpha \rceil$. In Equation 3, $\alpha$ may be a real number which is greater than 0 and less than 1. For example, if a shortened-TTI transmission mode uses a TTI of 0.5 ms, a TBS may be determined by setting α to: 0.3, 0.4 or 4/14 in a first slot; and to 0.7, 0.6 or 7/14 in a second slot. In this case, UE and eNB may set information, included in one code word, based on the number of bits using the determined TBS.

Equation 3 used to determine TSB does not need to be limited to a shortened-TTI mode where a slot of 0.5 ms is transmitted in a unit of TTI. For example, Equation 3 may also be applied to a shortened-TTI mode where various lengths of symbol, e.g., one OFDM symbol, two OFDM symbols, etc., is transmitted in a unit of TTI.

In Equation 3 used to determine TSB, constant 'α' may vary according to the length of a TTI or the number of CRS RE of a corresponding TTI. For example, if transmission using a two-symbol TTI is performed, a value of α when the number of REs used for CRS is 0 in 1 PRB and one TTI may be greater than that of α when the number of REs is 8. This is to maintain an effective code rate to a similar level. Alternatively, α may be set to different values according to uplink and downlink.

When an eNB needs to transmit downlink data using a TBS calculated by the method according to embodiment 7, the eNB encodes and transmits data bits by the TBS. In this case, UE may perform the channel decoding for discovering data bits corresponding to TBS. In the uplink data transmission, UE encodes and transmits data bits in TBS, and the eNB may perform the channel decoding for discovering data bits corresponding to the TBS.

In order to perform the embodiments of the present disclosure described above, UE and an eNB include a transmitter, a receiver, and processor as shown in FIGS. 30, 31A and 31B, respectively. Embodiments 3-1 to 3-6 describe the resource structures of signals that an eNB and UE need to transmit/receive to perform shortened-TTI downlink and uplink transmission. To this end, the receivers, processors, and transmitters of an eNB and UE perform corresponding operations.

Figure 28:
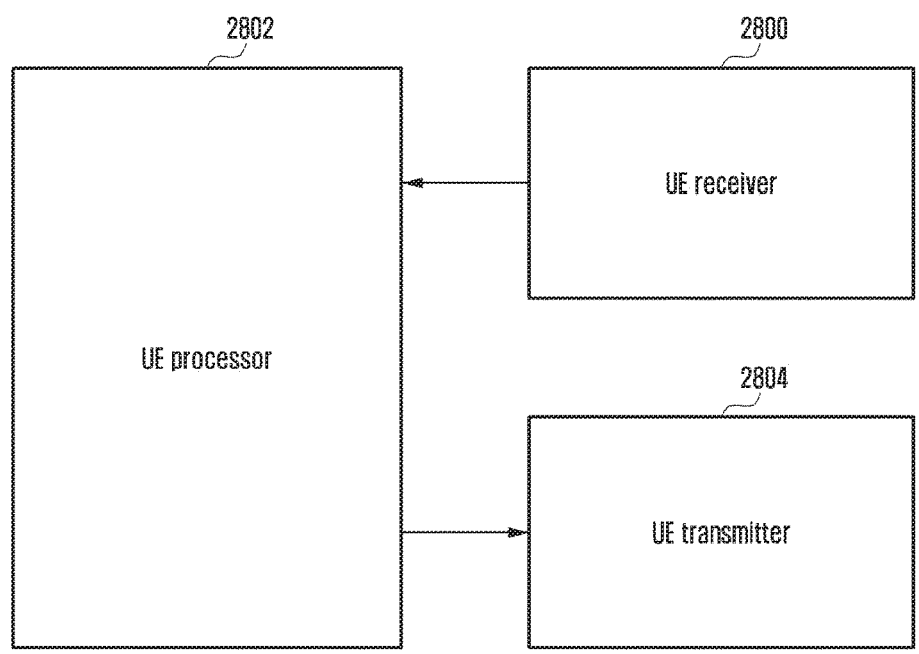
FIG. 28 is a block diagram showing UE according to various embodiments of the present disclosure.

FIG. 28 is a block diagram showing UE according to an embodiment of the present disclosure.

Referring to FIG. 28, UE is capable of including a UE receiver 2800, a UE transmitter 2804, and a UE processor 2802. In the embodiment, the UE receiver 2800 and the UE transmitter 2804 may be commonly called a transceiver. The transceiver is capable of transmitting/receiving signals to/from an eNB. Examples of the signals between the UE and the eNB are control information and data. The transceiver includes an RF transmitter for up-converting the frequency of signals to be transmitted and amplifying the signals, and an RF receiver for low-noise amplifying received RF signals and down-converting the frequency of the received RF signals. The transceiver receives signals via a wireless channel and transfers the received signals to the UE processor 2802. The transceiver transmits signals, output from the UE processor 2802, via a wireless channel. The UE processor 2802 controls operations/functions of UE according to embodiments of the present disclosure described above.

Figure 29:
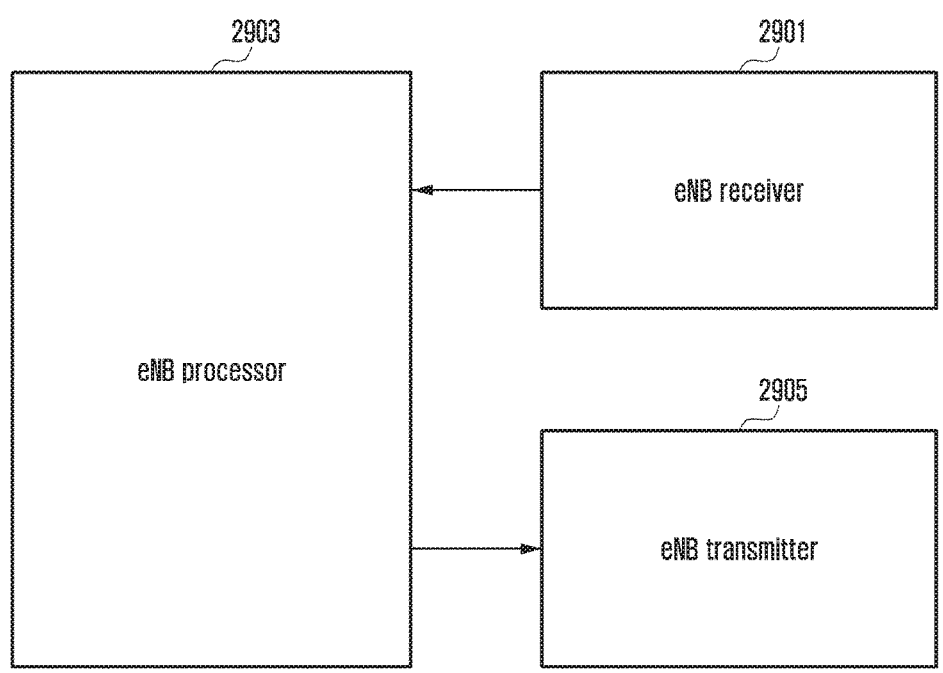
FIG. 29 is a block diagram showing an eNB according to various embodiments of the present disclosure.

FIG. 29 is a block diagram showing an eNB according to various embodiments of the present disclosure.

Referring to FIG. 29, an eNB is capable of including an eNB receiver 2901, an eNB transmitter 2905, and an eNB processor 2903. In the embodiment, the eNB receiver 2901 and the eNB transmitter 2905 may be commonly called a transceiver. The transceiver is capable of transmitting/receiving signals to/from UE. Examples of the signals between the UE and the eNB are control information and data. The transceiver includes: an RF transmitter for up-converting the frequency of signals to be transmitted and amplifying the signals; and an RF receiver for low-noise amplifying received RF signals and down-converting the frequency of the received RF signals. The transceiver receives signals via a wireless channel and transfers the received signals to the eNB processor 2903. The transceiver transmits signals, output from the eNB processor 3103, via a wireless channel. The eNB processor 2903 controls operations/functions of an eNB according to embodiments of the present disclosure described above. For example, the eNB processor 2903 determines whether UE to be scheduled is first type UE or second type UE, and creates, when UE to be scheduled is first type UE, control information based on control information for the first type UE. The first type UE has a transmission time interval less than that of the second type UE.

In an embodiment of the present disclosure, the eNB processor 2903 is capable of controlling the creation of DCI for the first type UE. In this case, the DCI may be control information indicating the first type UE. In another embodiment, the eNB processor 2903 is capable of controlling the creation of DCI for the first type UE, based on a UE identifier for the first type UE. In another embodiment, the eNB processor 2903 is capable of mapping DCI for the first type UE to the search space for the first type UE. In another embodiment, the eNB processor 2903 is capable of controlling the creation of DCI containing resource allocation information regarding a data channel for the first type UE. In another embodiment, the eNB processor 2903 is capable of mapping advanced control information for the first type UE to a resource block to which advanced control information for the first type UE can be mapped.

In an embodiment of the present disclosure, the eNB processor 3103: sets the number of resource blocks which are used in uplink control information format for the first type UE, and transmits the set number of resources; allocates resources for the first type UE to each UE within the set number of resource blocks and transmits the allocated resources; and transmits control information and data corresponding to the control information, according to the resources allocated to each UE.

The embodiments of the present disclosure described in the description and drawings along with particular terms are merely provided to assist in a comprehensive understanding of the disclosure and are not suggestive of limitation. It should be understood that the present disclosure includes various modifications, equivalents and/or alternatives from the embodiments. It should also be understood that the embodiments may also be combined with each other. For example, embodiments 4, 5, and 6 are combined with each other, and the eNB and UE thus perform corresponding operations/functions. In addition, embodiments 4 and 7 are combined with each other, and the eNB and UE thus perform corresponding operations/functions.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting control information by a user equipment (UE), the method comprising:
generating uplink control information (UCI) including hybrid automatic repeat request (HARQ) acknowledgement (ACK) and periodic channel state information (CSI);
identifying that a physical uplink shared channel (PUSCH) transmission of the UE is configured;
transmitting, to a base station, the HARQ ACK on a physical uplink control channel (PUCCH) and transmitting, to the base station, the periodic CSI on a PUSCH of at least one secondary cell (SCell) for a licensed band in case that the PUSCH transmission is not configured on a primary cell (PCell) and the PUSCH transmission is configured on the at least one SCell for the licensed band; and
transmitting, to the base station, the HARQ ACK and the periodic CSI on the PUCCH in case that the PUSCH transmission is not configured on the PCell and the PUSCH transmission is configured only on the at least one SCell for an unlicensed band.

2. The method of claim 1,
wherein the periodic CSI is transmitted on the PUSCH of the at least one SCell with a smallest SCell index in case that the PUSCH transmission is not configured on the PCell and the PUSCH transmission is configured on the at least one SCell for the licensed band, and
wherein the at least one SCell has the smallest SCell index among the at least one SCell for the licensed band.

3. A method for receiving control information by a base station, the method comprising:
identifying that a physical uplink shared channel (PUSCH) transmission of a user equipment (UE) is configured;
receiving, from the UE, hybrid automatic repeat request (HARQ) acknowledgement (ACK) on a physical uplink control channel (PUCCH) and receiving, from the UE, periodic channel state information (CSI) on the PUSCH of at least one secondary cell (SCell) for a licensed band in case that the PUSCH transmission is not configured on a primary cell (PCell) and the PUSCH transmission is configured on the at least one SCell for the licensed band; and
receiving, from the UE, the HARQ ACK and the periodic CSI on the PUCCH in case that the PUSCH transmission is not configured on the PCell and the PUSCH transmission is configured only on the at least one SCell for an unlicensed band.

4. The method of claim 3,
wherein the periodic CSI is received on the PUSCH of the at least one SCell with a smallest SCell index in case that the PUSCH transmission is not configured on a primary cell (PCell) and the PUSCH transmission is configured on the at least one SCell for the licensed band, and
wherein the at least one SCell has the smallest SCell index among the at least one SCell for the licensed band.

5. A user equipment (UE) for transmitting control information, the UE comprising:
a transceiver; and
a controller coupled with the transceiver and configured to control to:
generate uplink control information (UCI) including hybrid automatic repeat request (HARQ) acknowledgement (ACK) and periodic channel state information (CSI),
identify that a physical uplink shared channel (PUSCH) transmission of the UE is configured,
transmit, to a base station, the HARQ ACK on a physical uplink control channel (PUCCH) and transmit, to the base station, the periodic CSI on a PUSCH of at least one secondary cell (SCell) for a licensed band in case that the PUSCH transmission is not configured on a primary cell (PCell) and the PUSCH transmission is configured on the at least one SCell for the licensed band, and
transmit, to the base station, the HARQ ACK and the periodic CSI on the PUCCH in case that the PUSCH transmission is not configured on the PCell and the PUSCH transmission is configured only on the at least one SCell for unlicensed band.

6. The UE of claim 5,
wherein the controller is further configured to control transmitting of the periodic CSI on the PUSCH of the at least one SCell with a smallest SCell index in case that the PUSCH transmission is not configured on the PCell and the PUSCH transmission is configured on the at least one SCell for the licensed band, and
wherein the at least one SCell has the smallest SCell index among the at least one SCell for the licensed band.

7. A base station for receiving control information, the base station comprising:
a transceiver; and
a controller coupled with the transceiver and configured to control to:
identify that a physical uplink shared channel (PUSCH) transmission of a user equipment (UE) is configured,
receive, from the UE, hybrid automatic repeat request (HARQ) acknowledgement (ACK) on a physical uplink control channel (PUCCH) and receive, from the UE, periodic channel state information (CSI) on the PUSCH of at least one secondary cell (SCell) for a licensed band in case that the PUSCH transmission is not configured on a primary cell (PCell) and the PUSCH transmission is configured on the at least one SCell for the licensed band, and
receive, from the UE, the HARQ ACK and periodic CSI on the PUCCH in case that the PUSCH transmission is not configured on the PCell and the PUSCH transmission is configured only on the at least one SCell for unlicensed band.

8. The base station of claim 7,
wherein the controller is further configured to control receiving of the periodic CSI on the PUSCH of the at least one SCell with a smallest SCell index in case that the PUSCH transmission is not configured on the PCell and the PUSCH transmission is configured on the at least one SCell for the licensed band, and
wherein the at least one SCell has the smallest SCell index among the at least one SCell for the licensed band.

* * * * *